United States Patent Office 3,551,475
Patented Dec. 29, 1970

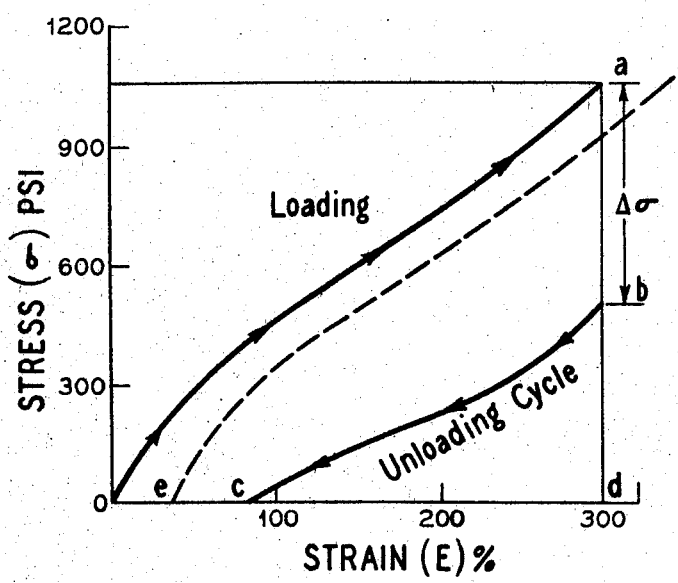

3,551,475
POLYISOCYANATES AND REACTION
PRODUCTS OF THE SAME
Thomas K. Brotherton and John W. Lynn, Charleston, and Robert J. Knopf, St. Albans, W. Va., assignors to Union Carbide Corporation, a corporation of New York
Continuation-in-part of applications Ser. No. 256,495, Jan. 25, 1963, and Ser. No. 256,548, Feb. 6, 1963. This application Sept. 7, 1965, Ser. No. 485,285
Int. Cl. C07c 69/74
U.S. Cl. 260—468
10 Claims

ABSTRACT OF THE DISCLOSURE

Polyisocyanates and reaction products thereof having the following structural formula:

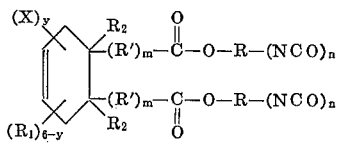

This application is a continuation-in-part of application Ser. No. 256,495 now U.S. Pat. 3,275,679 entitled "Novel Ester Isocyanates and Process for Preparation," by T. K. Brotherton, J. W. Lynn, and R. J. Knopf, filed Jan. 25, 1963, and application Ser. No. 256,548, now abandoned, entitled "Novel Halogenated Ester Isocyanates and Process for Preparation," by T. K. Brotherton, J. W. Lynn, and R. J. Knopf, filed Feb. 6, 1963, both of said continuation-in-part applications being assigned to the same assignee as the instant application.

This invention relates to novel polyisocyanate compositions and to processes for preparing the same. In one aspect, the invention relates to novel polymers of the above-said polyisocyanate compositions which polymers contain a plurality of ethylenic bonds, i.e., $>C=C<$. In another aspect, the invention relates to novel polymers of several of the above-said polyisocyanate compositions, said polymers containing a plurality of pendant isocyanato groups, i.e., —NCO. In a further aspect, the invention relates to novel compositions which result from the reaction of novel polyisocyanates with active hydrogen compounds. In various other aspects, the invention relates to the preparation of novel cast resins, thermoplastic resins, milliable gum stocks and the cured products therefrom, prepolymers, elastomers, elastic and relatively non-elastic fibers, urethane foams, adhesives, coatings, reinforced plastics, and the like.

The novel ester polyisocyanates which are contemplated can be represented by Formula I infra.

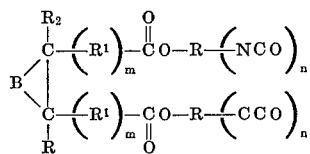

wherein B is a divalent ethylenically unsaturated aliphatic group which together with the vicinal carbon atoms (those carbon atoms which are identified by the $R_2$ variables thereon) forms a monoethylenically unsaturated cycloaliphatic nucleus which is derived from cyclohexene; wherein R represents a polyvalent aliphatic, cycloaliphatic, or aromatic group; wherein $R^1$ represents a divalent aliphatic group; wherein $R_2$ represents hydrogen or alkyl; wherein $m$ is an integer having a value of zero or one; and wherein $n$ is an integer having a value of from 1 to 3.

With reference to Formula I supra, it is preferred that R represent a divalent hydrocarbon radical having up to 24 carbon atoms, more preferably up to 12 carbon atoms, such as alkylene, alkenylene, cycloalkylene, cycloalkenylene, alkylcycloalkylene, alkylcycloalkenylene, alkylenecycloalkyl, alkylenecycloalkenyl, arylene, alkarylene, alkylenearyl and alkenylenearyl, and the like. It is further preferred that $R^1$ represent alkenylene or alkylene; that $R_2$ represent hydrogen. It is highly preferred that $m$ equal zero and $n$ equal one.

In one embodiment, highly useful polyisocyanates include those represented by Formula II below:

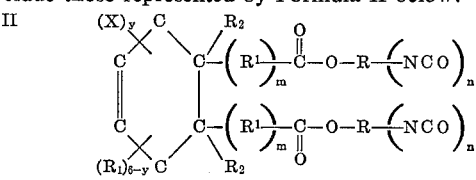

wherein R, $R^1$, $R_2$, $m$, and $n$ have the significance expressed in Formula I supra; wherein X represents hydrogen, halogen, such as chloro, fluoro, bromo, etc., or a monovalent hydrocarbon group, preferably hydrogen, chloro, or $C_1$–$C_4$ alkyl; wherein $R_1$ represents hydrogen, alkoxy, acetoxy, or a monovalent hydrocarbon group, preferably hydrogen or $C_1$–$C_4$ alkyl; and wherein $y$ is an integer having a value of from zero to two inclusive.

Various attractive subclasses of novel isocyanate compositions which can be expressed in natural chemical nomenclature and which fall within the metes and bounds of Formula I supra are as follows:

the bis(isocyanatoalkyl) halocyclohex-4-ene-1,2-dicarboxylates;
the bis(isocyanatoalkenyl) halocyclohex-4-ene-1,2-dicarboxylates;
the bis(isocyanatocycloalkyl) halocyclohex-4-ene-1,2-dicarboxylates;
the bis(isocyanatocycloalkenyl) halocyclohex-4-ene-1,2-dicarboxylates;
the bis(isocyanatoalkylcycloalkyl) halocyclohex-4-ene-1,2-dicarboxylates;
the bis(isocyanatoalkenylcycloalkyl) halocyclohex-4-ene-1,2-dicarboxylates;
the bis(isocyanatoaryl) halocyclohex-4-ene-1,2-dicarboxylates;
the 1,2-bis(isocyanatohydrocarbyloxycarbonylalkyl)-halocyclohex-4-enes;
the bis(isocyanatoalkyl) 4-cyclohexene-1,2-dicarboxylates;
the bis(isocyanatoalkenyl) 4-cyclohexene-1,2-dicarboxylates;
the bis(isocyanatocycloalkyl) 4-cyclohexene-1,2-dicarboxylates;
the bis(isocyanatocycloalkenyl) 4-cyclohexene-1,2-dicarboxylates;
the bis(isocyanatoaryl) 4-cyclohexene-1,2-dicarboxylates;
the 1,2-bis(isocyanatohydrocarbyloxycarbonylalkyl)-cyclohex-4-enes;

and the like.

Specific novel isocyanate compounds would include, among others:

bis(2-isocyanatoethyl) 4-chlorocyclohex-4-ene-1,2-dicarboxylate,
bis(4-isocyanatobutyl) 4-chlorocyclohex-4-ene-1,2-dicarboxylate,
bis(2-isocyanato-1-methylethyl) 4-chlorocyclohex-4-ene-1,2-dicarboxylate,
bis(10-isocyanatodecyl) 4-chlorocyclohex-4-ene-1,2-dicarboxylate,
bis(24-isocyanatotetracosyl) 4-chlorocyclohex-4-ene-1,2-dicarboxylate, bis(2,4-diisocyanatobutyl) 4-bromocyclohex-4-ene-1,2-dicarboxylate,
bis(6,10-diisocyanatodecyl) 4-chlorocyclohex-4-ene-1,2-dicarboxylate,
bis(6,12,18-triisocyanatooctadecyl) 5-chlorocyclohex-4-ene-1,2-dicarboxylate,
bis(4-isocyanatobut-2-enyl) 4-chlorocyclohex-4-ene-1,2-dicarboxylate,
bis(12-isocyanatododec-5-enyl) 4-fluorocyclohex-4-ene-1,2-dicarboxylate,
bis(10,15,24-triisocyanatotetracos-8-enyl) 4-chlorocyclohex-4-ene-1,2-dicarboxylate,
bis(4-isocyanatocyclohexyl) 4-chlorocyclohex-4-ene-1,2-dicarboxylate,
bis(3,5-diisocyanatocyclohexyl) 4-chlorocyclohex-4-ene-1,2-dicarboxylate,
bis(2,4,6-triisocyanatocyclohexyl) 4-bromocyclohex-4-ene-1,2-dicarboxylate,
bis(4-isocyanatocyclohex-2-enyl) 4-chlorocyclohex-4-ene-1,2-dicarboxylate,
bis(3,5-diisocyanatocyclohex-2-enyl) 4-chlorocyclohex-4-ene-1,2-dicarboxylate,
bis[4-(3-isocyanatopropyl)cyclohexyl] 4-chlorocyclohex-4-ene-1,2-dicarboxylate,
bis[4-(5-isocyanatopent-3-enyl)cyclohexyl] 4-chlorocyclohex-4-ene-1,2-dicarboxylate,
bis(3-methyl-4-isocyanatocyclohexyl) 4-chlorocyclohex-4-ene-1,2-dicarboxylate,
bis(2,6-dimethyl-4-isocyanatocyclohexyl) 4-bromocyclohex-4-ene-1,2-dicarboxylate,
bis(4-isocyanatophenyl) 4-chlorocyclohex-4-ene-1,2-dicarboxylate,
bis(2,6-diisocyanatophenyl) 4-bromocyclohex-4-ene-1,2-dicarboxylate,
bis(4-isocyanato-2,6-dimethylphenyl) 4-chlorocyclohex-4-ene-1,2-dicarboxylate,
bis(4-isocyanatophenyl) 4-chloro-5-methylcyclohex-4-ene-1,2-dicarboxylate,
bis(2-isocyanatoethyl) 4-chloro-4-ethylcyclohex-4-ene-1,2-dicarboxylate,
1,2-bis(3-isocyanatopropoxycarbonylmethyl)-4-chlorohex-4-ene,
bis(2-isocyanatoethyl) 4,5-dichlorocyclohex-4-ene-1,2-dicarboxylate,
bis(4-isocyanatobutyl) 3,6-dichlorocyclohex-4-ene-1,2-dicarboxylate,
bis(2-isocyanatoethyl) 4,5-dibromocyclohex-4-ene-1,2-dicarboxylate,
bis(3-isocyanatopropyl) 4,5-difluorocyclohex-4-ene-1,2-dicarboxylate,
bis(2-isocyanatoethyl) 4-cyclohexene-1,2-dicarboxylate,
bis(2-isocyanato-1-methylethyl) 4-cyclohexene-1,2-dicarboxylate,
bis(18-isocyanatooctadecyl) 4-cyclohexene-1,2-dicarboxylate,
bis(24-isocyanatotetracosyl) 4-cyclohexene-1,2-dicarboxylate,
bis(2,4-diisocyanatobutyl) 4-cyclohexene-1,2-dicarboxylate,
bis(6,12,18-triisocyanatooctadecyl) 4-cyclohexene-1,2-dicarboxylate,
bis(4-isocyanatobut-2-enyl) 4-cyclohexene-1,2-dicarboxylate,
bis(19-isocyanatononadec-10-enyl) 4-cyclohexene-1,2-dicarboxylate,
bis(4-isocyanatocyclohexyl) 4-cyclohexene-1,2-dicarboxylate,
bis(3,5-diisocyanatocyclohexyl) 4-cyclohexene-1,2-dicarboxylate,
bis(2,4,6-triisocyanatocyclohexyl) 4-cyclohexene-1,2-dicarboxylate,
bis(4-isocyanatocyclohex-2-enyl) 4-cyclohexene-1,2-dicarboxylate,
bis(3,5-diisocyanatocyclohex-2-enyl) 4-cyclohexene-1,2-dicarboxylate,
bis[4-(3-isocyanatopropyl)cyclohexyl] 4-cyclohexene-1,2-dicarboxylate,
bis(3-methyl-4-isocyanatocyclohexyl) 4-cyclohexene-1,2-dicarboxylate,
bis(2,6-dimethyl-4-isocyanattocyclohexyl) 4-cyclohexene-1,2-dicarboxylate,
bis(4-isocyanatophenyl) 4-cyclohexene-1,2-dicarboxylate,
bis(2,6-diisocyanatophenyl) 4-cyclohexene-1,2-dicarboxylate,
bis(4-isocyanato-2,6-dimethylphenyl) 4-cyclohexene-1,2-dicarboxylate,
bis(4-isocyanatophenyl) 5-methylcyclohex-4-ene-1,2-dicarboxylate,
bis(2-isocyanatoethyl) 4-ethylcyclohex-4-ene-1,2-dicarboxylate,
1,2-bis(3-isocyanatopropoxycarbonylmethyl) cyclohex-4-ene,
bis(isocyanatoethyl) cyclohexa-1,4-diene-1,2-dicarboxylate, and the like.

In a second embodiment, the novel ester isocyanates which are contemplated are those which are derived by the Diels-Alder reaction of a drying oil with an ethylenically unsaturated ester isocyanate. Thus, the variable B of Formula I supra represents a portion of a triglyceride of unsaturated fatty acids and can contain one or more of the ester isocyanate groups indicated. Hence, the novel compositions of this embodiment are mixed triglycerides of unsaturated fatty acids wherein at least one conjugated system in the acid moiety or the drying oil moiety, i.e. —CH=CH—CH=CH—, has been converted to Unit II–A below:

II-A

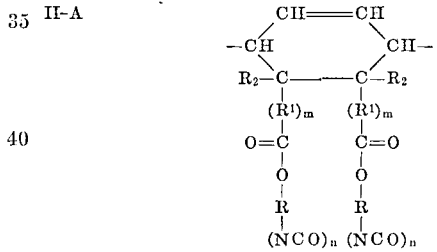

wherein $R_2$, $R^1$, R, $m$, and $n$ have the same values as indicated in Formula I supra.

Although the preferred isocyanates of this invention contain no elements other than carbon, hydrogen, oxygen, nitrogen with/without halogen, e.g., chlorine, the molecule can be substituted with various organic and inorganic radicals containing such groups as ether, sulfide, polysulfide, sulfone, sulfoxide, ester, nitro, nitrile, and carbonate moities.

The novel ester isocyanates of the aforementioned embodiments can be conveniently prepared by the Diels-Alder reaction of an appropriate conjugated diene and an olefinically unsaturated ester isocyanate compound. Illustrative of one class of dienes which can be employed in the preparation of the novel isocyanate compositions, especially those encompassed within Formula II supra, are represented by Formula III below.

III

wherein X, $R_1$, and $y$ have the meanings set out in Formula II supra. Illustrative dienes include, among others, 1,3-butadiene, 2-methyl-1,3-butadiene, 2,3-dimethyl-1,3-butadiene, 1,3-pentadiene, 2-methyl-1,3-pentadiene, 2,4-hexadiene, 2,3-dimethyl-2,4-hexadiene, 1,3-hexadiene, 1,3-octadiene, 3,5-octadiene, 2-methyl-3,4-octadiene, 4,6-nonadiene, 5,6-dimethyl-4,6-nonadiene, 1,3-decadiene, 3,5-decadiene, 1,3-tetradecadiene, 3,5-tetradecadiene, 1,3-nonadecadiene, 10,12-tetracosadiene, 1-chloro-1,3-butadiene, 2 - chloro-1,3-butadiene (chloroprene), 2,3-dichloro-1,3-butadiene, 1,4-dichloro-1,3-butadiene, 2-chloro-3-methyl-1,3-butadiene, 1-chloro-2,3-diethyl-1,3-butadiene, 1-chloro-2 - methoxy - 1,3 - butadiene, 1 - bromo - 1,3-butadiene, 2-bromo-1,3-butadiene, 2,3-dibromo-1,3-butadiene, 1,4-dibromo-1,3-butadiene, 2-bromo - 3 - ethyl-1,3-butadiene, 1-bromo-2,3-dimethyl-1,3-butadiene, 2-bromo - 3 - methoxy-1,3-butadiene, 1-fluoro-1,3-butadiene, 2 - fluoro-1,3 - butadiene, 2,3-difluoro-1,3-butadiene, 1,4 - difluoro - 1,3-butadiene, 2-fluoro-3-ethyl-1,3-butadiene, and the like.

For the preparation of the novel polyisocyanate compositions illustrated by Unit II–A, the appropriate dienic starting material is an unsaturated aliphatic compound having a diene value, as hereinafter defined, or from 5 to 70, and more preferably from 20 to 65, and which does not contain groups whoch would adversely affect the Diels-Alder reaction. Particularly preferred dienes are the triglycerides of fatty acids having at least one conjugated system in the acid or drying oil moiety of the triglyceride. The triglycerides, or drying oils, which are suitable for use in the preparation of the novel compositions include, for instance, the marine and vegetable oils possessing conjugated unsaturation, or unsaturation capable of undergoing a Diels-Alder reaction with a dienophile, e.g., non-conjugated unsaturation which can rearrange to the conjugated form during the reaction. Hence, the term "drying oil," as employed throughout the instant disclosure and appended claims, is intended to encompass oils possessing both the conjugated and non-conjugated type of unsaturation. The natural oils which are obtained from the seeds and nuts of certain plants and trees, and from a few species of fish, are particularly suited for the preparation of the novel compositions exemplified in Unit II–A. These oils can be further defined as drying or semi-drying oils and are composed largely of triglycerides of the long-chain unsaturated fatty acids which preferably contain from 18 to 22 carbon atoms and 2 or more double bonds per chain. Eleostearic acid and licanic acid which are found in the normally abundant, natural occurring oils, e.g., tung oil (china wood) and oiticica oil, are typical acids having double bonds in a conjugated position. Typical drying oils which can be conveniently employed in the preparation of the novel curable compositions include, among others, corn oil, linseed oil, perilla oil, poppyseed oil, safflower seed oil, soybean oil, sunflower seed oil, tall oil, tung oil, herring oil, menhaden oil, sardine oil, oiticica oil, dehydrated castor oil and the like.

The unsaturated ester isocyanates which can be employed as the dienophilic component in the Diels-Alder reaction can be conveniently represented by Formula III–A below.

III–A
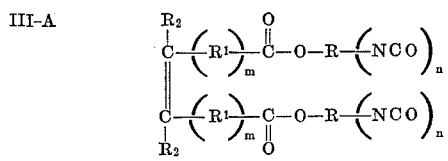

wherein $R^1$, $R_2$, $n$, and $m$ have the meanings set out in Formula I supra. Illustrative compounds embraced by the Formula III–A above include:

bis(2-isocyanatoethyl)fumarate,
bis(3-isocyanatopropyl) glutaconate,
bis(4-isocyanatobutyl) alpha-hydromuconate,
bis(5-isocyanatopentyl) beta-hydromuconate,
bis(7-isocyanathopentyl) itaconate,
bis(2-isocyanato-1-methylethyl) fumarate,
bis(3-ethyl-5-isocyanatopentyl) glutaconate,
bis(4,4-dimethyl-6-isocyanatohexyl) beta-hydromuconate,
bis(2-methyl-4-ethyl-6-isocyanatohexyl) itaconate,
bis(5,6,7-triethyl-9-isocyanatononyl) fumarate,
2-isocyanatoethyl 3-isocyanatopropyl glutaconate,
3-isocyanatopropyl 8-isocyanatooctyl beta-hydromuconate,
2-methyl-3-isocyanatopropyl 2-isocyanatoethyl fumarate,
bis(2-isocyanatoethyl) acetylenedicarboxylate,
bis(4-isocyanato-2-butenyl) glutaconate,
bis(4-isocyanato-2-butenyl) itaconate,
bis(5-isocyanato-3-pentenyl) fumarate,
bis(10-isocyanato-6-decenyl) fumarate,
bis(3-ethyl-5-isocyanato-3-pentenyl) fumarate,
bis(3,4-dimethyl-5-isocyanato-3-pentenyl) glutaconate,
bis(2-methyl-4-ethyl-6-isocyanato-2-hexenyl) itaconate,
4-isocyanato-2-butenyl 3-isocyanatopropyl fumarate,
bis(7-isocyanato-4-heptynyl) fumarate,
bis(10-isocyanato-4-decynyl) glutaconate,
bis(2-phenyl-3-isocyanatopropyl) fumarate,
bis(3-styryl-5-isocyanatopentyl) glutaconate,
bis(5-xylyl-8-isocyanatooctyl) fumarate,
bis(7-mesityl-9-isocyanatononyl) glutaconate,
bis(2-cyclohexyl-3-isocyanatopropyl) itaconate,
bis(4-isocyanatocyclohexyl) glutaconate,
bis(3-isocyanato-4-cyclopentenyl) beta-hydromuconate,
bis(6-isocyanato-7-cyclooctenyl) fumarate,
bis(3-isocyanatocyclopentylmethyl) fumarate,
bis(3-isocyanato-2-ethylcyclopentyl) glutaconate,
bis(3-isocyanato-5-methylcyclohexyl) fumarate,
bis(3-isocyanato-5,6-dimethylcyclohexyl) glutaconate,
bis(2-isocyanatophenyl) fumarate,
bis(3-isocyanatophenyl) glutaconate,
bis(7-isocyanato-2-naphthyl) alpha-hydromuconate,
bis(4'-isocyanato-4-biphenylyl) itaconate,
bis(5-isocyanato-2-indenyl) fumarate,
bis(4-isocyanato-3-cumenyl) fumarate,
bis(4-isocyanato-2-methoxyphenyl) glutaconate,
bis(4-isocyanatostyryl) itaconate, and the like.

In general, the Diels-Alder reaction can be effected at a temperature of from about 50° C. to about 250° C., and more preferably from about 75° C. to about 200° C. for a period of time sufficient to produce the novel compositions. Depending upon the choice of reactants and temperature employed, the reaction period may vary from as little as an hour, or less, to 100 hours, or longer.

The mol ratio of diene to the olefinically unsaturated ester isocyanate can vary over a considerable range. For example, a mol ratio of diene to dienophile of from about 0.1:1.0 to about 10:1.0, preferably from about 1.0 to 4.0:1.0, can be employed. The pressure employed is not necessarily critical and the reaction can be effected at atmospheric, subatmospheric or superatmospheric pressures.

In some instances, it may be desirable to conduct the Diels-Alder reaction in the presence of an inert, normally liquid organic vehicle, although the use of a vehicle is not required. Suitable media include, among others, aromatic hydrocarbons, such as toluene, xylene, benzene, naphthalene, diphenyl, amylbenzene; cycloaliphatic hydrocarbons, such as cyclohexane, heptylcyclopentane; the chlorinated aromatic hydrocarbons, such as chlorobenzene, ortho-dichlorobenzene; and the like.

The olefinically unsaturated isocyanates which are employed as precursors in the preparation of the novel compositions are prepared by the reaction of the corresponding ester diamine dihydrohalide with a carbonyl dihalide. The preparation of the olefinically unsaturated ester isocyanates such as bis(2-isocyanatoethyl) fumarate, bis(4-isocyanatophenyl) fumarate, and the like, is the subject matter of an application entitled "Novel Olefinically Unsaturated Diisocyanates and Process for Preparation" by T. K. Brotherton and J. W. Lynn, Ser. No. 212,480, now abandoned, filed July 25, 1962, and assinged to the same assignee as the instant invention.

In general, the convention of the ester diamine or ester diamine salt to the ester diisocyanate is accomplished by sparging a carbonyl dihalide, more preferably phosgene, through a slurry of the ester diamine or the ester diamine dihydrohalide contained in an inert, normally liquid reaction medium at a temperature within the range of from about 100° to about 225° C., more preferably from about 125° C. to about 170° C., and thereafter recovering the ester diisocyanate. In either instance, it appears that the intermediate carbamoyl chloride is first formed from the free amine and subsequently thermally degraded to the diisocyanate at the reaction temperature employed. The process can be conducted in either a batch type or continuous reactor.

The preparation of the olefinically unsaturated ester diamines, and their hydrohalides, such as bis(2-aminoethyl) fumarate, bis(2-aminoethyl) fumarate dihydrohalide bis-(4-aminophenyl) fumarate dihydrohalide and the like, is the subject matter of an application entitled "Novel Amino Esters of Olefinically Unsaturated Polycarboxylic Acids and Process for Preparation" by T. K. Brotherton and J. W. Lynn, Ser. No. 212,481, now abandoned, filed July 25, 1962, and assigned to the same assignee as the instant invention.

The ester diamine salts are prepared, as indicated in the examples, and in the aforementioned copending application by the reaction of an olefinically unsaturated polycarboxylic acid halide, such as fumaroyl chloride, and a hydroxy amine hydrohalide, such as monoethanolamine hydrohalide, at a temperature of from about 65° to about 95° C., for several hours. The ester diamine dihydrohalide is then isolated, as, for example, by filtration and then washed and dried. By the aforementioned process the ester diamine dihydrohalides can be obtained in high yields. For further information regarding the production of the ester diamines and their hydrohalides reference is hereby made to the disclosure of the aforementioned application.

As hereinbefore indicated, a particularly unique embodiment of the present invention is directed to the use of various drying oils as dienes in the Diels-Alder reaction with the olefinically unsaturated ester isocyanates. The compounds obtained therefrom are characterized by pendant isocyanate groups and thus provide moisture curable, oil-modified urethane coatings having outstanding physical properties. These moisture cured urethanes give clear, mar-resistant, flexible coatings which are particularly suitable in the leather industry and other places where tough flexible coatings are required.

These compositions are outstanding because they have a wide range of compatibility, impart improved caustic, water, and chemical resistance, and they impart improved flexibility and toughness. The compositions are capable of "drying" or curing to excellent protective coatings, with or without the application of heat or catalysts. However, in some instances it is desirable to employ various metallic salts of organic compounds known to the art as "driers" to accelerate the drying process. The drying can be accomplished at temperatures in the range of from about 10° to about 250° C. and for a period of time sufficient to produce the desired property in the coating. The concentration of the drier compound can range from about 0.001 to about 5.0 weight percent, and higher, based on the weight of the modified compound. Suitable driers include soluble compounds containing heavy metals, e.g., cobalt, lead, manganese, calicum, zinc, iron, and the like. Examples of such driers include cobalt naphthenate, lead octanoate, dibutyltin dilaurate, diamines, amine-tin complexes, and the like. The drying compositions can be treated in the various ways familiar to the varnish and paint industries to produce special or advantageous effects.

Several of the novel curable compositions are relatively low viscosity liquids at temperatures ranging upwards from room temperature. These compositions are compatible with a wide variety of fillers and pigments which may be employed therein, if desired, to adjust the composition viscosity and at the same time enhance the physical properties of coatings formed therefrom. These compositions can be easily handled in such resin-forming applications as coating, bonding, laminating, molding, casting, plotting and the like. Various inert normally-liquid organic vehicles or solvents which may be employed are illustrated in this specification. In casting applications, the compositions can be made to fill small intricacies of molds without applying high pressures or heating to high temperatures. In coating applications, they can be spread, brushed, or sprayed on surfaces by the many techniques available to the paint, lacquer and varnish industries. These curable compositions undergo negligible shrinkage when cured and are particularly useful in bonding, castings, molding and potting where undue shrinkage is particularly undesirable. Moreover, the compositions of this invention can be easily prepared using low temperatures at which essentially no gelation occurs during preparation. However, they can be cured rapidly at high temperatures. The pot-lives of the novel compositions can be controlled, as desired.

The novel polyisocyanates are an extremely useful class of compounds which possess exceptionally attractive and outstanding properties. The reaction products of the novel aliphatic diisocyanates are highly resistant to sunlight or ultra-violet light degradation. For example, the use of the novel aliphatic polyisocyanates as typified by Formula II supra as the isocyanate source in the preparation of, for example, polyurethane films, elastic and relatively non-elastic fibers, coatings, cast and uncast elastomers, etc., results in non-yellowing products which have strong commercial appeal as well as performance characteristics. It should be noted that non-yellowing elastomeric and non-elastomeric thread or fiber, and non-yellowing coatings, are in great demand within the industry since the commercial products based on aromatic isocyanates rapidly turn yellow in sunlight.

Many of the novel diisocyanates such as bis(2-isocyanatoethyl) cyclohex - 4 - ene - 1,2 - dicarboxylate and bis(2-isocyanatoethyl) 4-chlorocyclohex - 4 - ene-1, 2-dicarboxylate are relatively inexpensive compounds which can compete with tolylene diisocyanate on a commercial scale. Based on presently known processes for preparing vinylene diisocyanate, this latter diisocyanate is definitely not competitive (on an economic basis) with the afore-illustrated novel diisocyanates. Moreover, vinylene diisocyanate is a potent lachrymator and undoubtedly highly toxic which characteristics place severe limitations on its acceptance and applicability.

Of outstanding importance and utility with regard to the novel polyisocyanates such as those illustrated by Formula II above is their ability to undergo true vinyl polymerization and isocyanate condensation polymerization. For example, the novel polyisocyanates can be homopolymerized or copolymerized with a host of ethylenically unsaturated compounds (the so-called "vinyl monomers"), e.g., styrene, vinyl chloride, vinylidene chloride, butadiene, isoprene, chloroprene, ethyl acrylate, methyl acrylate, etc., through the ethylenic bond of the reactant(s), under conventional vinyl polymerization conditions, to give polymers of varying molecular weight which contain a plurality of pendant or free isocyanato groups. The resulting polyisocyanato-containing polymers then can be subjected to isocyanate condensation polymerization reactions with an active polyhydrogen compound, e.g., polyol, polyamine, etc., as explained hereinafter to give useful three dimensional, cross-linked solid products which can be termed poly(vinyl urethanes), poly(vinyl ureas), etc., depending on the active hydrogen compound employed. Also, the novel polyisocyanates can be admixed with an active mono- and/or polyhydrogen compound plus an ethylenically unsaturated compound, in the presence of a vinyl poymerization catalyst and/or NCO/active hydrogen catalyst, if desirable, to produce the resulting resin in "one-shot" under operative conditions readily apparent to one reading this specification.

The reaction of the novel polyisocyanates of Formula I supra, on the other hand, with an active monohydrogen compound, e.g., monoamine, alkanol, etc., results in novel ethylenically unsaturated compounds which in turn can be polymerized with an ethylenically unsaturated organic compound which contains at least one polymerizable ethylenic bond, the so-called "vinyl monomers," through the polymerizable carbon to carbon double bond, to yield a myriad of polymeric products.

Isocyanate condensation polymerization reactions involving a difunctional compound such as a diol, diamine, etc., with novel diisocyanates of Formula I can yield linear polyethylenically unsaturated polymeric products, e.g., polyurethanes, polyureas, etc., which products can be crosslinked to useful solids by reaction with diolefins, e.g., divinylbenzene, butadiene, and the like. Crosslinked poly(vinyl urethanes) can also be prepared via a "one shot" process which involves concurrent vinyl and condensation polymerization reactions.

Thus, it is apparent that the novel polyisocyanates permit the wedding of low cost vinyl monomers, i.e., ethylenically unsaturated organic monomers which contains at least one polymerizable ethylenic bond, with high performance polyurethanes, polyureas, and the like. This advantage has outstanding significance in the development of a myriad of products (based on the novel polyisocyanates) which have exceptionally strong commercial and economic attractiveness.

Of the novel diisocyanates, the bis(omega-isocyanatoalkyl) cyclohex-4-ene-1,2-dicarboxylates and the bis(omega-isocyanatoalkyl) chlorocyclohex-4-ene-1,2-dicarboxylates are of significance since products made therefrom, e.g., elastic films and fibers, thermoplastic resins, cast resins, coatings, etc., possess, among other things, outstanding and exceptional characteristics.

In one aspect, the invention is directed to the preparation of novel multifunctional polymers of the novel isocyanates of Formula I supra. In general, the novel polymers of this aspect, i.e., the homopolymers of the novel isocyanates, the copolymers of a mixture containing the novel isocyanates, and the copolymers of a mixture containing the novel isocyanate(s) and an ethylenically unsaturated organic compound(s) possessing at least one polymerizable ethylenic group, are characterized by the presence of a plurality of pendant isocyanatohydrocarbyloxycarbonyl-containing groups, i.e.,

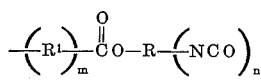

wherein $R^1$ is a divalent saturated aliphtaic hydrocarbon radical which preferably contains up to 22 carbon atoms, and wherein R, m, and n have the significance set out previously, e.g., Formulas I and II. More particularly, the novel polymers are characterized by Unit IV below.

IV

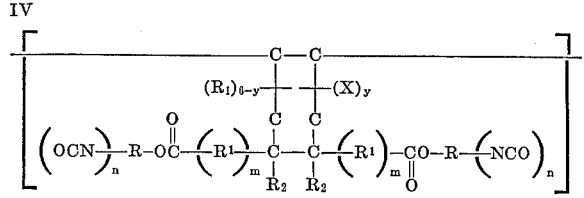

wherein the variables R, $R^1$, $R_1$, X, $R_2$, m, n, and y having the meanings discussed in connection with Formula II supra. Unit IV above occurs at least once in the novel polymers. However, for use in many applications as will become apparent from a consideration of this specification, the novel polymers preferably are characterized by a plurality of the structure identified as Unit IV above, i.e., greater than one and upwards to several hundred, for example, from two to 200, and higher.

A particular eminent class of novel polyisocyanato-containing polymers which should be highlighted in generic manner are characterized by Unit IV-A below:

IV-A

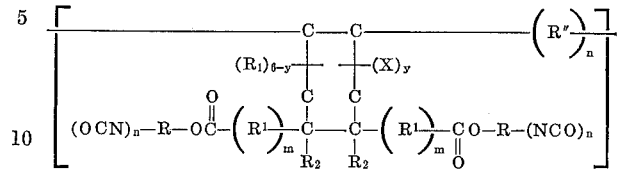

wherein the variables R, $R^1$, $R_1$, $R_2$, X, m, n, and y have the meanings set out in Unit IV supra (as well as the provisos), wherein R'' is a substituted or unsubstituted divalent radical which contains two carbon atoms in the polymeric chain (R'', in effect, is the polymerizable co-monomer which enters into chemical union with the other monomer(s) through the polymerizable ethylenic bond), and wherein x has a value of zero or one. The structure identified as Unit IV-A above occurs at least once in the novel polymers; generally said polymers will be characterized by a plurality of such units, e.g., from 2 to 200, and higher.

Those novel polyisocyanato-containing polymers which contain at least one of, preferably a plurality of, the structure defined as Unit IV-B, below, represent a significant contribution to the art, to wit:

IV-B

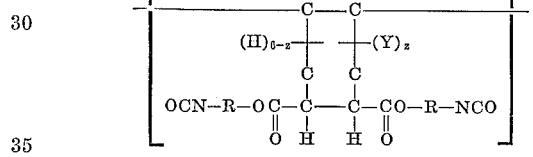

wherein R is an alkylene radical which preferably contains from 2 to 12 carbon atoms, wherein Y is hydrogen or chloro, wherein H represents hydrogen, and wherein z is zero or one. It is preferred that the structure defined as Unit IV-B represent a repeating unit such that the novel polymer is characterized by at least two and upwards to 200, and higher, of Unit IV-B therein. It is further preferrod that the R radical be ethylene, trimethylene, tetramethylene, methyl substituted ethylene, or methyl substituted trimethylene.

Novel polymers characterized by one or more (and upwards to 200, and higher) of Unit IV-C below represent a highly important embodiment of the invention, that is:

IV-C

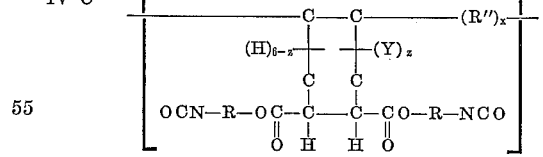

wherein R, Y, H, and z have the values set out in Unit IX-B supra, and wherein R' and x have the values noted in Unit IV-A.

Illustrated polymers characterized by the presence of the aforesaid recurring unit include the homopolymers of the halogenated and non-halogenated bis(isocyanatohydrocarbyl)cyclohex-4-ene - 1,2 - dicarboxylates as exemplified by the poly[bis(omega-isocyanatoalkyl) cyclohex-4-ene-1,2-dicarboxylates] and poly[bis(omega-isocyanatoalkyl)chlorocyclohex-4-ene-1,2-dicarboxylates] such as poly[bis(2 - isocyanatoethyl)cyclohex-4-ene-1,2-dicarboxylate], poly[bis(2-isocyanato-1-methylethyl)cyclohex- 4-ene-1,2-dicarboxylate], poly[bis(2 - isocyanatoethyl)4-chlorocyclohex-4-ene-1,2-dicarboxylate], poly [bis(3-isocyanato-n-propyl)cyclohex-4-ene - 2 - dicarboxylate], and the like; the copolymers of the aforesaid halogenated and non-halogenated bis(isocyanatohydrocarbyl) cyclohex-4-ene-1,2-dicarboxylates with other ethylenically unsaturated organic compounds as illustrated by the copolymers of (1) the bis(omega-isocyanatoalkyl) cyclohex-4-ene-1,2-dicarboxylate, the bis(omega-isocyanatoalkyl) chlorocyclohex-4-ene-1,2-dicarboxylates and the like; and (2) other ethylenically unsaturated organic compounds such as styrene, ethylene, propylene, vinyl chloride, vinylidene chloride, methyl acrylate, vinyl methyl ether, methyl methacrylate, 2-ethylhexyl acrylate, vinyl acetate, and/or the isocyanates of Formula I supra, and the like.

As hereinbefore indicated, the novel polymers of the instant invention are obtained by effecting polymerization of the novel isocyanate through an ethylenic group. As a result, each of the polymers obtained is characterized by pendant isocyanato-terminated ester groups along the polymer chain. Depending upon the amount of polymerizable novel polyisocyanate employed with other vinyl monomers, the copolymers obtained in accordance with the teachings of this aspect have a wide variety of useful properties and applications. In addition, by virtue of the highly reactive pendant isocyanato groups, the polymers can be further reacted with active hydrogen-containing compounds to form other novel products useful as coatings, adhesives, castings, foams, and the like.

It is pointed out at this time that the term "polymer(s)" is used in its generic sense, i.e., this term encompasses within its scope polymers prepared from a sole novel isocyanate as well as a mixture containing two, three, four, etc., polymerizable monomers, at least one of which is a novel isocyanate. Thus, homopolymers and copolymers are encompassed within the term "polymer." Each of the polymerizable monomers entering into the copolymerization reaction do so in significant quantities. As such, the resulting copolymeric products can be chemically distinguishable from the homopolymeric products which would result from the homopolymerization of the monomers separately.

A distinguishing feature of the copolymeric materials is that at least one of the monomers from which the copolymers are made has both an isocyanate portion and an olefinically unsaturated portion. In addition, the polymers can contain one or more vinyl monomers chemically combined therein. In general, the concentration of the polymerizable monomers chemically combined in the novel polymers can vary over the entire range e.g., from about 0.5, and lower, to about 99.5 weight percent and higher of the polymerizable reactants chemically combined therein, based on the total weight of said reactants. Those copolymers which contain at least 50 weight percent of vinyl monomer, based on the weight of said polymer, are highly preferred. These copolymers which contain at least about 50 to about 97 weight percent vinyl monomer, and from about 50 to about 3 weight percent ester isocyanate are eminently preferred.

The novel polymers can be prepared by reacting an admixture comprising novel isocyanate(s) with/without a vinyl monomer(s) preferably in the presence of a catalytically significant quantity of a vinyl polymerization catalyst, particularly the free radical producing catalysts, under conventional vinyl polymerization conditions.

The free radical producing catalysts are voluminously documented in the art and well known to those skilled in the vinyl polymerization art. Illustrative thereof are those compounds which contain the divalent —O—O— unit as exemplified by (1) R—O—O—R wherein R is alkyl, aryl, haloaryl, acyl, etc.; (2) R'—O—O—H wherein R' is a monoacyl radical such as hydrogen, alkyl, etc.; (3) R"—O—OH wherein R" is acyl; (4) the azo-compounds; and the like. Specific illustrations include, among others, hydrogen peroxide, dibenzoyl peroxide, acetyl peroxide, benzoyl hydroperoxide, t-butyl hydroperoxide, di-t-butyl peroxide, lauroyl peroxide, butyryl peroxide, dicumyl peroxide, azo-bis - isobutyronitrile, the persulfates, the percarbonates, the perborates, the peracids, etc., such as persuccinic acid, diisopropyl peroxydicarbonate, t-butyl perbenzoate, di-t-butyl diperphthalate, peracetic acid, and the like. Ionic catalysts such as boron trifluoride and anionic catalysts such as phenyl sodium may also be employed in certain cases.

The catalysts are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. For optimum results, the particular catalyst employed if any, the nature of the monomeric reagent(s), the operative conditions under which the polymerization reaction is conducted, and other factors will largely determine the desired catalyst concentration.

The vinyl polymerization reaction can be conducted at a temperature in the range of from about 0° C., and lower, to about 200° C., and higher, preferably from about 20° C. to about 150° C. As a practical matter, the choice of the particular temperature at which to effect the polymerization reaction depends, to an extent, on the variable illustrated above. The reaction time can vary from several seconds to several days. A feasible reaction period is from about a couple of hours, and lower, to about 100 hours, and longer. Preferably, the reaction takes place in the liquid phase.

The vinyl polymerization can, if desired, be carried out in an inert normally liquid organic vehicle. The suitable inert vehicles are preferably those which do not react with either the polymerizable monomer or the ester isocyanate. In view of the reactivity of isocyanato groups with labile hydrogen-containing materials, the preferred vehicles for the polymerization are those which do not possess active hydrogens or contain impurities which possess active hydrogen substituents. Illustrative vehicles which may be satisfactorily used are the aromatic hydrocarbons such as toluene, xylene, naphthalene, tetrahydronaphthalene, benzene, biphenyl, cymene, amylbenzene; the cycloaliphatic hydrocarbons such as cyclohexane, cyclopentane, decahydronaphthalene; the dialkyl ketones such as acetone, diisobutyl ketone, methyl isobutyl ketone, diisopropyl ketone; the organic esters such as ethyl acetate, and other inert normally-liquid, organic vehicles.

The molar ratio of polymerizable reactants to vehicle does not appear to be critical, and it can vary, for example, from about 1:1, and lower, to about 1:1000, and higher. In general, it is desirable to employ a molar excess of organic vehicle.

The polymerizable monomers used in the copolymerization reaction with the novel ester isocyanates are preferably the ethylenically unsaturated organic compounds which are free of reactive hydrogen atoms as determined according to the Zerewitinoff test and which will not react with the isocyanato group. These compounds can be used singly or in combinations of two or more and are characterized by the presence therein of at least one polymerizable ethylenic group of the type >C=C<. These compounds are well known in the art an include, for example, the alkenes, alkadienes, and the styrenes such as ethylene, propylene, 1-butylene, 2-butylene, isobutylene, 1-octene, butadiene, isoprene, 1,4-pentadiene, 1,6-hexadiene, 1,7-octadiene, styrene, alphamethylstyrene, vinyltoluene, vinylxylene, ethylvinylbenzene, chlorostyrene, bromostyrene, fluorostyrene, trifluoromethylstyrene, iodostyrene, cyanostyrene, nitrostyrene, N,N-dimethylaminostyrene, acetoxystyrene, methyl 4-vinylbenzoate, phenoxystyrene, p-vinylphenyl ethyl ether, and the like; the acrylic and substituted acrylic monomers such as methyl acrylate, ethyl acrylate, methyl methacrylate, methacrylic anhydride, acrylic anhydride, cyclohexyl methacrylate, benzyl methacrylate, isopropyl methacrylate, octyl methacrylate, acrylonitrile, methacrylonitrile, methyl alpha-chloroacrylate, ethyl alpha-ethoxyacrylate, methyl alpha-acetamidoacrylate, butyl acrylate, ethyl alpha-cyanoacrylate, 2-ethylhexyl acrylate, phenyl acrylate, phenyl methacrylate, alpha-chloroacrylonitrile, N,N - dimethylacrylamide, N,N - dibenzylacrylamide, N - butylacrylamide, methacryl formamide, and the like, the vinyl esters, the vinyl halides, the vinyl ethers, the vinyl ketones, etc., such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl chloride, vinyl bromide, vinyl fluoride, vinylidene chloride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-methoxyethyl ether, vinyl 2-butoxyethyl ether, 3,4-dihydro-1,2-pyran, vinyl methyl ketone, vinyl ethyl ketone, vinyl phenyl ketone, vinyl ethyl sulfide, vinyl ethyl sulfone, N-vinyloxazolidinone, N-methyl-N-vinyl acetamide, N-vinylpyrrolidone, divinyl sulfide, divinyl sulfoxide, divinyl sulfone, sodium vinyl sulfonate, methyl vinyl sulfonate, N-vinyl pyrrole, and the like; dimethyl fumarate; vinyl isocyanate; tetrafluoroethylene; chlorotrifluoroethylene; nitroethylene; and the like.

As indicated previously, the novel polyisocyanato-containing polymers can contain as many as 200, or more, of the units designated as Units IV through IV–C supra. In general, these polymers are in the solid range, and they are essentially non-crosslinked.

In one aspect, the invention is directed to the preparation of novel products which result from the reaction of the novel polyisocyanates such as those exemplified by Formulas I and II and Units IV through IV–C supra and other novel polyisocyanates exemplified hereinafter, with compounds which contain at least one reactive hydrogen as determined according to the Zerewitinoff test described by Wohler in the Journal of the American Chemical Society, vol. 48, page 3181 (1927). Illustrative classes of compounds which contain at least one active hydrogen include, for instance, alcohols, amines, carboxylic acids, phenols, ureas, urethanes, hydrazines, water, ammonia, hydrogen sulfide, imines, thioureas, sulfimides, amides, thiols, amino alcohols, sulfonamides, hydrazones, semicarbazones, oximes, hydroxycarboxylic acids, aminocarboxylic acids, vinyl polymers which contain a plurality of pendant active hydrogen substituents such as hydroxyl or amino, and the like. In addition, the hydrogen substituent may be activated by proximity to a carbonyl group. The active hydrogen organic compounds represent a preferred class.

Illustrative of the aforesaid active hydrogen compounds are the hydroxyl-containing compounds, especially those which possess at least one alocholic hydroxyl group and preferably at least two alcoholic hydroxyl groups. Typical compounds include, for instance, the monohydride alcohols such as methanol, ethanol, propanol, isopropanol, 1-butanol, allyl alcohol, 2-butanol, tert-butanol, 3-butenol, 1-pentanol, 3-pentanol, 1-hexanol, hex-5-en-1-ol, 3-heptanol, 2-ethyl-1-hexanol, 4-nonanol, propargyl alcohol, benzyl alcohol, cyclohexanol, cyclopentanol, cycloheptanol, and trimethylcyclohexanol. Further alcohols contemplated include the monoesterified diols such as those prepared by the reaction of equimolar amounts of an organic monocarboxylic acid, its ester, or its halide, with a diol such as alkylene glycols, mono- and polyether diols, mono- and polyester diols, etc., e.g.,

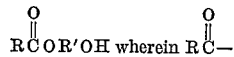

is acyl and R' is a divalent organic radical containing at least two carbon atoms in the divalent chain; the monoesterified diols such as those represented by the formula R₁OR'OH wherein R₁ represents a monovalent organic radical such as a hydrocarbyl or oxahydrocarbyl radical and R' has the aforesaid value; the mono-ols produce by the partial esterification reaction of a polyol containing at least three hydroxyl groups, e.g., glycerine, with a stoichiometric deficiency of an organic monocarboxylic acid, its ester, or acyl halide; and the like. The aforesaid reactions are well documented in the literature.

Polyhydric alcohols can be exemplified by polyols of the formula HO—R—OH wherein R is a divalent hydrocarbyl radical or a mono- or polyhydroxy substituted hydrocarbyl radical, the aforesaid formula hereinafter being referred to as "alkylene polyols" (when they possess two or more hydroxy groups) or "alkylene glycols" (when they possess two hydroxy groups). Other polyhydric alcohols can be represented by the formula HO—R¹—OH wherein R¹ is a substituted or unsubstituted (alkyleneoxy)ₙ alkylene radical with n being an integer of at least one. This latter formula will hereinafter be referred to as "polyether polyols" (when they contain at least two hydroxy groups) or "polyether glycols" (when they contain two hydroxy groups). The variables R and R¹ have at least two carbon atoms in the linear chain, and the substitutents or pendent groups on these variables can be, for example, lower alkyl, halo, lower alkoxy, etc., such as methyl, ethyl, n-propyl, isopropyl, chloro, methoxy, ethoxy, and the like. Illustrative alkylene polyols and polyether polyols include ethylene glycol; butyene glycol; 2,2-diethy-1,3-propanediol; 3-methyl-1,5-pentanediol; 2-butene-1,4 - diol; the polyoxyalkylene glycols such as diethylene glycol, dipropylene glycol, dibutylene glycol, polyoxytetramethylene glycol, and the like; the mixed mono- and polyoxyalkylene glycols such as the mono- and polyoxyethyleneoxypropylene glycols, the mono- and polyoxyethyleneoxybutylene glycols, and the like; polydioxolane and polyformals prepared by reacting formaldehyde with other glycols or mixtures of glycols, such as tetramethylene glycol and pentamethylene glycol; and the like. Other polyols include the N-methyl- and N-ethyl-diethanolamines; 4,4' - methylenebiscyclohexanol; 4,4' - isopropylidenebiscyclohexanol; butyne-1, 4-diol; the hydroxymethyl substituted phenethyl alcohols; the ortho-, meta-, and para-hydroxymethylphenylpropanols; the various phenylenediethanols, the various phenylenedipropanols; the various heterocyclic diols such as 1,4-piperazinediethanol; and the like. The polyhydroxyl-containing esterification products which range from liquid to non-crosslinked solids, i.e., solids which are soluble in many of the more common inert normally liquid organic media, and which are prepared by the reaction of monocarboxylic acids and/or polycarboxylic acids, their anhydrides, their esters, or their halides, with a stoichiometric excess of a polyol such as the various diols, triols, etc., illustrated previously, are highly preferred. The aforesaid polyhydroxyl-containing esterification products will hereinafter be referred to as "polyester polyols." Those polyester polyols which contain two alcoholic hydroxyl groups will hereinafter be termed "polyester diols." Illustrative of the polycarboxylic acids which can be employed to prepare the polyester polyols preferably include the dicarboxylic acids, tricarboxylic acids, etc., such as maleic acid, succinic acid, glutaric acid, adipic acid, pimelic acid, suberic acid, azelaic acid, sebacic acid, chlorendic acid, 1,2-4-butanetricarboxylic acid, phthalic acid, etc. This esterification reaction is well documented in the literature.

Higher functional alcohols suitable for reaction with the novel isocyanates include the triols such as glycerol, 1,1,1-trimethylolpropane, 1,2,4-butanetriol, 1,2,6-hexanetriol, triethanolamine, triisopropanolamine, and the like; the tetrols such as erythritol, pentaerythritol, N,N,N',N'-tetrakis(2 - hydroxyethyl)ethylenediamine, N,N,N',N'-tetrakis(2-hydroxypropyl)ethylenediamine, and the like; the pentols; the hexols such as dipentaerythritol, sorbitol, and the like; the alkyl glycosides such as the methyl glucosides; the carbohydrates such as glucose, sucrose, starch, cellulose, and the like.

Other suitable hydroxyl-containing compounds include the mono- and the polyoxyalkylated derivatives of mono- and polyfunctional compounds having at least one reactive hydrogen atom. These functional compounds may contain primary or secondary hydroxyls, phenolic hydroxyls, primary or secondary amino groups, amide, hydrazino, guanido, ureido, mercapto, sulfino, sulfonamido, or carboxyl groups. They can be obtained by reacting (1) monohydric compounds such as aliphatic and cycloaliphatic alcohols, e.g., alkanol, alkenol, methanol, ethanol, allyl alcohol, 3-buten-1-ol, 2-ethylhexanol, etc.; diols of the class $HO(R)_nOH$ and $HO(RORO)_nH$ wherein R is alkylene of 2 to 4 carbon atoms and wherein $n$ equals 1 to 10 such as ethylene glycol, propylene glycol, diethylene glycol, dipropylene glycol, and the like; thiodiethanol; the xylenediols; 4,4'-methylenediphenol; 4,4'-isopropylidenediphenol; resorcinol; catechol, etc.; the mercapto alcohols such as mercaptoethanol; the dibasic acids such as maleic, succinic, glutaric, adipic, pimelic, sebacic, phthalic, tetrahydrophthalic, and hexahydrophthalic acids; the phosphorous acids; the phosphoric acids; the aliphatic, aromatic, and cycloaliphatic primary monoamines like methylamine, ethylamine, propylamine, butylamine, aniline, and cyclohexylamine; the secondary diamines like N,N'-dimethylethylenediamine; and the amino alcohols containing a secondary amino group such as N-methylethanolamine; with (2) vicinal monoepoxides as exemplified by ethylene oxide, 1,2-epoxypropane, 1,2-epoxybutane, 2,3-epoxybutane isobutylene oxide, butadiene monoxide, allyl glycidyl ether, 1,2-epoxyoctene-7, styrene oxide and mixtures thereof.

Further examples of polyols are the polyoxyalkylated derivatives of polyfunctional compounds having three or more reactive hydrogen atoms such as, for example, the reaction products (adducts) of 1,1,1-trimethylolpropane with a lower vicinal-epoxyalkane, e.g., ethylene oxide, propylene oxide, butylene oxide, and mixtures thereof, in accordance with the reaction:

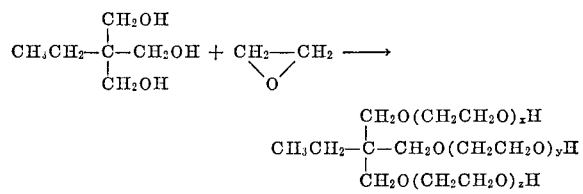

wherein the sum of $x+y+z$ is a number having a value of at least 3 and upwards to 50, and higher.

In addition to the polyoxyalkylated derivatives of 1,1,1-trimethylolpropane, the following illustrative compounds are likewise suitable: 1,1,1-trimethylolethane; glycerol; 1,2,4-butanetriol; 1,2,6-hexanetriol; erythritol; pentaerythritol; sorbitol; the alkyl glycosides such as the methyl glucosides; glucose; sucrose; the diamines of the general formula $H_2N(CH_2)_nNH_2$, where $n$ equals 2 to 12; 2-(methylamino)-ethylamine; the various phenylene- and toluenediamines; benzidine; 3,3'-dimethyl-4,4'-biphenyldiamine; 4,4' - methylenedianiline; 4,4',4''-methylidynetrianide, the cycloaliphatic diamines such as 2,4-cyclohexanediamine, and the like; the amino alcohols of the general formula $HO(CH_2)_nNH_2$, where $n$ equals 2 to 10; the polyalkylenepolyamines such as diethylenetriamine; triethylenetetramine, tetraethylenepentamine, and the like; the polycarboxylic acids such as citric acid, aconitic acid, mellitic acid, pyromellitic acid, and the like; and polyfunctional inorganic acids like phosphoric acid. The aforesaid polyfunctional polyoxyalkylated compounds will be referred to hereinafter as "polyoxyalkylated polyols." The polyoxyalkylated polyols which contain two alcoholic hydroxyl groups will be termed "polyoxyalkylated diols" whereas those which contain a sole alcoholic hydroxyl group will be referred to as "polyoxyalkylated mono-ols."

Ilustrative amino-containing compounds which are contemplated are those which contain at least one primary amino group (—NH₂), or secondary amino group (—NHR wherein R is hydrocarbyl such as alkyl, aryl, cycloalkyl, alkaryl, aralkyl, etc.), or mixtures of such groups. Preferred amino-containing compounds are those which contain at least two of the above groups.

Illustrative of the higher functional amino-containing compounds which can be employed include, for example, higher polyalkylenepolyamines such as diethylenetriamine, triethylenetetramine, tetraethylenepentamine, dipropylenetriamine, tripropylenetetramine, tetrapropylenepentamine, and the like; 1,2,5-benzenetriamine; toluene-2,4,6-triamine; 4,4',4''-methylidynetrianiline; and the like; the polyamines obtained by interaction of aromatic monoamines with formaldehyde or other aldehydes, for example:

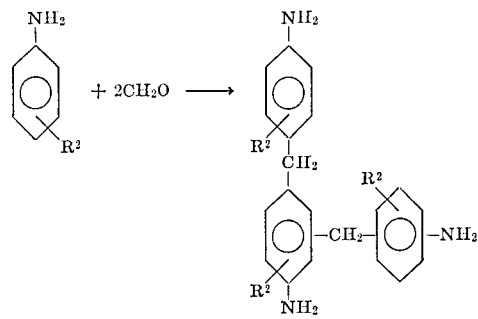

and other reaction products of the above general type, where $R^2$ is, for example, hydrogen or alkyl.

Illustrative of the carboxyl-containing compounds include those organic compounds which contain at least one carboxyl group (—COOH) as exemplified by the monocarboxyl-containing compounds such as alkanoic acids; the cycloalkanecarboxylic acids; the monoesterified dicarboxylic acids, e.g.,

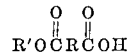

wherein R' is an organic radical such as oxahydrocarbyl, hydrocarbyl, etc., and R is the divalent residue of a dicarboxylic acid after removal of the two carboxyl groups; the polycarboxylic acids, e.g., the aliphatic, cycloaliphatic, and aromatic dicarboxylic acids; and the like. Specific examples include propionic acid, butyric acid, valeric acid, dodecanoic acid, acrylic acid, cyclohexanecarboxylic acid, the mono-2-ethylhexyl ester of adipic acid, succinic acid, maleic acid, glutaric acid, adipic acid, pimelic acid, suberic acid, azelaic acid, sebacic acid, chlorendic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, the tetrachlorophthalic acids, 1,5-naphthoic acid, 2,7-naphthoic acid, 2,6-naphthoic acid, 3,3'-methylenedibenzoic acid, 4,4' - (ethylenedioxy)dibenzoic acid, 4,4'-biphenyldicarboxylic acid, 4,4' - sulfonyldibenzoic acid, 4,4'-oxydibenzoic acid, the various tetrahydrophthalic acids, the various hexahydrophthalic acids, tricarballylic acid, aconitic acid, citric acid, hemimellitic acid, trimellitic acid, trimesic acid, pyromellitic acid, 1,2,3,4-butanetetracarboxylic acid, and the like. The polycarboxyl-containing esterification products which range from liquid to non-crosslinked solids and which are prepared by the reaction of polycarboxylic acids, their anhydride, their esters, or their halides, with a stoichiometric deficiency of a polyol such as diols, triols, etc., can also be employed. These polycarboxyl-containing esterification products will hereinafter be referred to as "polycarboxy polyesters."

Compounds which contain at least two different groups of the class of amino (primary or secondary), carboxyl, and hydroxyl, and preferably those which contain at least one amino group and at least one hydroxyl group, can be exemplified by the hydroxycarboxylic acids, the aminocarboxylic acids, the amino alcohols, and the like. Illustrative examples include 2-hydroxypropionic acid, 6-hydroxycaproic acid, 11-hydroxyundecanoic acid, salicyclic acid, para-hydroxybenzoic acid, beta-alanine, 6-aminocaproic acid, 7-aminoheptanoic acid, 11-aminoundecanoic acid, para-aminobenzoic acid, and the like; the amino alcohols of the general formula $HO(CH_2)_nNH_2$, where $n$ equals 2 to 10; other hydroxyalkylamines such as N-methylethanolamine, isopropanolamine, N-methylisopropanolamine, and the like; the aromatic amino alcohols like para-amino-phenethyl alcohol, para-amino-alpha-methylbenzyl alcohol, and the like; the various cycloaliphatic amino alcohols such as 4-aminocyclohexanol, and the like; the higher functional amino alcohols having a total of at least three hydroxy and primary or secondary amino groups such as the dihydroxyalkylamines, e.g., diethanolamine, diisopropanol amine, and the like; 2-(2-aminoethylamino)ethanol; 2 - amino-2-(hydroxymethyl)- 1,3-propanediol; and the like.

The initiated lactone polyesters which contain free hydroxyl group(s) and/or carboxyl group(s) represent extremely preferred active hydrogen containing compounds. These initiated lactone polyesters are formed by reacting, at an elevated temperature, for example, at a temperature of from about 50° C. to about 250° C., an admixture containing a lactone and an organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least one reactive hydrogen substituent preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. The aforesaid polyesters will hereinafter be referred to, in the generic sense, as "initiated lactone polyesters" which term will also include the various "copolymers" such as lactone copolyesters, lactone polyester/polycarbonates, lactone polyester/polyethers, lactone polyester/polyether/polycarbonates, lactone polyester/polyester, etc. These initiated lactone polyesters will contain at least one hydroxyl group and/or at least one carboxyl group depending, of course, on the initiator and reactants employed. Those initiated lactone polyesters which contain at least three alcoholic hydroxyl groups will be referred to as "initiated lactone polyester polyols"; those with two alcoholic hydroxyl groups will be termed "initiated lactone polyester diols." On the other hand, the initiated lactone polyesters which contain at least two carboxyl groups will be referred to as "initiated polycarboxy lactone polyesters."

The preparation of the aforesaid hydroxyl-containing and/or carboxyl-containing initiated lactone polyesters can be effected in the absence or presence of an ester interchange catalyst to give initiated lactone polyesters of widely varying and readily controllable molecular weights without forming water of condensation. These lactone polyesters so obtained are characterized by the presence of recurring linear lactone units, that is, carbonylalkyleneoxy

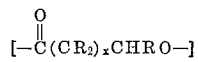

wherein $x$ is from 4 to 6, and wherein the R variables have the values set out in the next paragraph.

The lactone used in the preparation of the initiated lactone polyesters may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

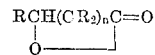

in which $n$ is at least four, for example, from four to six, at least $n+2$ Rs are hydrogen, and the remaining Rs are substituents selected from the group consisting of hydrogen, alkyl, cycloalkyl, alkoxy and single ring aromatic hydrocarbon radicals. Lactones having greater number of substituents other than hydrogen on the ring, and lactones having four carbon atoms in the ring, are considered unsuitable because of the tendency that polymers thereof have to revert to the monomer, particularly at elevated temperatures.

The lactones which are preferred in the preparation of the hydroxyl-containing and/or carboxyl-containing initiated lactone polyesters are the epsilon-caprolactones having the general formula:

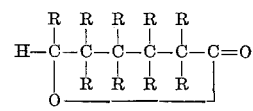

wherein at least six of the R variables are hydrogen and the remainder are hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve.

Among the substituted epsilon-caprolactones considered most suitable are the various monoalkyl epsilon-caprolactones such as the monomethyl-, monoethyl-, monopropyl, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone can be employed as starting material. Mixtures comprising the $C_6$ to $C_8$ lactones illustrated previously, with/without, for instance, the alpha, alpha-disubstituted-beta-propiolactones, e.g., alpha, alpha-dimethyl-beta-propiolactone, alpha, alpha-dichloromethyl-beta-propiolactone, etc.; with/without, for instance, oxirane compounds, e.g., ethylene oxide, propylene oxide, etc.; with/without, for instance, a cyclic carbonate, e.g., 4,4-dimethyl-2,6-dioxacyclohexanone, etc.; are also contemplated.

Among the organic initiators that can be employed to prepare the initiated lactone polyesters include the carboxyl-containing, hydroxyl-containing, and/or amino-containing compounds illustrated previously, e.g., those compounds which have at least one reactive hydrogen substituent as determined according to the Zerewitinoff method.

The initiator is believed to open the lactone ring to produce an ester or amide having one or more terminal groups that are capable of opening further lactone rings and thereby adding more and more lactone units to the growing molecule. Thus, for example, the polymerization of epsilon-caprolactone initiated with an amino alcohol is believed to take place primarily as follows:

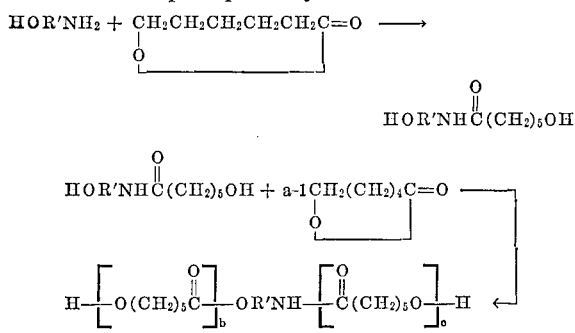

wherein R' (of the initiator and the resulting initiated lactone polyester product) is an organic radical such as an aliphatic, cycloaliphatic, aromatic, or heterocyclic radical, and wherein $a=b+c$.

The reaction of a carboxyl-containing initiator with epsilon-caprolactone is believed to proceed as follows:

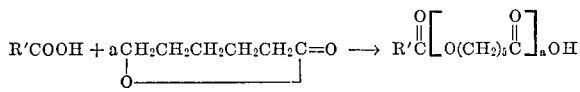

It will be appreciated from the preceding illustrative equations that where a plurality of lactone units are linked together, such linkage is effected by monovalently bonding the oxy (—O—) moiety of one unit to the carbonyl

moiety of an adjacent unit. The terminal lactone unit will have a terminal hydroxyl or carboxyl end group depending, of course, on the initiator employed.

The preparation of the initiated lactone polyester can be carried out in the absence of a catalyst though it is preferred to effect the reaction in the presence of an ester exchange catalyst. The organic titanium compounds that are especially suitable as catalysts include the tetraalkyl titanates such as tetraisopropyl titanate and tetrabutyl titanate. Additional preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates described in U.S. 2,890,208 as well as thhe metal chelates and metal acylates disclosed in U.S. 2,878,236 also represent further desirable catalysts which can be employed. The disclosure of the aforesaid patents are incorporated by reference into this specification.

The catalysts are employed in a catalytically significant concentration. In general, a catalyst concentration in the range of from about 0.0001 and lower, to about 3, and higher, weight per cent, based on the weight of total monomeric feed, is suitable. The lactone polymerization reaction is conducted at an elevated temperature. In general, a temperature in the range of from about 50° C., and lower, to about 250° C. is suitable; a range from about 100° C. to about 200° C. is preferred. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The preparation of the lactone polyesters via the preceding illustrative methods has the advantage of permitting accurate control over the average molecular weight of the lactone polyester products and further of promoting the formation of a substantially homogeneous lactone polyester in which the molecular weights of the individual molecules are reasonably close to the average molecular weight, that is, a narrow molecular weight distribution is obtained. This control is accomplished by preselecting the molar proportions of lactone and initiator in a manner that will readily be appreciated by those skilled in the art. Thus, for example, if it is desired to form a lactone polyester in which the average molecular weight is approximately fifteen times the molecular weight of the initial lactone, the molar proportions of lactone and initiator utilized in the polymerization reaction are fixed at approximately 15:1 inasmuch as it is to be expected that on the average there will be added to each molecule of initiator approximately fifteen lactone molecules.

The initiated lactone polyesters which are contemplated have average molecular weights as low as 300 to as high as about 7000, and even higher still to about 9000. With vinyl polymers containing a plurality of active hydrogen substiuents, e.g., hydroxyl, amino, etc., as initiators, the average molecular weight of the initiated lactone polyesters can easily go as high as 14,000, and higher. Generally, however, the average molecular weight of the initiated lactone polyester is from about 300 to about 9000, preferably from 600 to about 5000.

As intimated previously, also within the term and the scope of the initiated lactone polyesters are those in which the linear lactone units need not necessarily be connected directly to one another. This is readily accomplished, for example, by reacting lactone(s) with combinations of initiators such as dibasic acid(s) plus glycol(s), diamine(s) or amino alcohol(s) such as those exemplified previously. This reaction can be effected at an elevated temperature, e.g., about 100° C. to about 200° C., with all the reactants present, or the reaction of the dibasic acid with the glycol, diamine, or amino alcohol can be accomplished first, and then the resulting amino-, hydroxy-, or carboxy-containing products (depending on the reactants and the concentration of same) can be reacted with the lactone to yield hydroxyl-terminated and/or carboxyl-terminated initiated lactone polyesters. Moreover, as also indicated previously, the term and the scope of the hydroxy- and/or carboxyl-containing initiated lactone polyesters includes the "oxyalkylene-carboxy-alkylenes" such as described in U.S. Pat. No. 2,962,524 which are incorporated by reference into this disclosure. In addition the term and scope of the hydroxyl-containing initiated lactone polyesters also includes the reaction of an admixture comprising a $C_6$-$C_8$ lactone(s), a cyclic carbonate(s), and an initiator having at least one group, preferably at least two groups, of the class of hydroxyl, primary amino, or secondary amino, or mixtures thereof, under the operative conditions discussed above. Exemplary cyclic carbonates include 4,4-dimethyl-2,6-dioxacyclohexanone, 4,4-dichloromethyl-2,6-dioxacyclohexanone, 4,4-dicyanomethyl-2,6-dioxacyclohexanone, 4,4 - diethyl-2,6-dioxacyclohexanone, 4,4-dimethoxymethyl-2,6 - dioxacyclohexanone; and the like. Consequently, where a mixture of linear acetone units (i.e.,

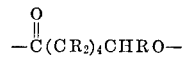

units which are properly termed carbonylalkyleneoxy) and linear carbonate units (i.e.

units which can be termed carbonyloxyalkyleneoxy) are contained in the polymer chain or backbone, the carbonyl moiety of one linear unit will be monovalently bonded to the oxy moiety of a second linear unit. The oxy moiety of a terminal linear unit will be bonded to a hydrogen substituent to thus form a hydroxyl end group. Moreover, the point of attachment of the initiator and a linear unit (lactone or carbonate) will be between the carbonyl moiety of said unit and the functional group (hydroxyl or amino) of said initiator sans the active hydrogen substituent of said group.

The preferred initiated lactone polyesters include those which contain at least about 25 mol percent (and preferably at least about 50 mol percent) of carbonyl pentamethyleneoxy units therein $$[-\overset{O}{\underset{\|}{C}}(CH_2)_5O-]$$

and which possess an average molecular weight of from about 150 to about 5000, particularly from about 500 to about 4000. The remaining portion of the molecule may be comprised of in addition to the initiator, essentially linear units derived from a cyclic carbonate especially those illustrated previously; an oxirane compound especially ethylene oxide, propylene oxide, and/or the butylene oxides; a mono- and/or polyalkyl-substituted epsilon-caprolactone especially the mono- and/or polymethyl and/or ethyl-substituted epsilon-caprolactones; and/or an alpha, alpha-disubstituted-beta-propiolactone especially those exemplified previously. The so-called initiated lactone homopolyesters derived from reacting epsilon-caprolactone with an initiator are likewise included within the preferred lactone polyesters. The initiated lacetone polyester polyols, and in particular, the substantially linear initiated lactone polyester diols, are exceptionally preferred.

If desired, various compounds can be employed as catalysts in the isocynato/active hydrogen reactions. Compounds which are oftentimes useful in catalyzing said isocyanato-active hydrogen reactions include the tertiary amines, phosphines, and various organic metallic compounds in which the metal can be bonded to carbon and/or other atoms such as oxygen, sulfur, nitrogen, halo, hydrogen, and phosphorus. The metal moiety of the organic metallic compounds can be, among others, tin, titanium, lead, potassium, sodium, arsenic, antimony, bismuth, manganese, iron, cobalt, nickel, and zinc. Of those which deserve special mention are the organic metallic compounds which contain at least one oxygen to metal bond and/or at least one carbon to metal bond, especially wherein the metal moiety is tin, lead, bismuth, arsenic or antimony. The tertiary amines, the organic tin compounds (which includes the organotin compounds), and the organic lead compounds are eminently preferred. Preferred subclasses of organic metallic compounds include the acylates, particularly the alkanoates, and alkoxides of Sn(II), Sn(IV), Pb(II), Ti(IV), Zn(IV), Co(II), Mn(II), Fe(III), Ni(II), K and Na. An additional subclass which is extremely useful is the dialkyltin dialkanoates.

Inorganic metallic compounds such as the hydroxides, oxides, halides, and carbonates of metals such as the alkali metals, the alkaline earth metals, iron, zinc, and tin are also suitable.

Specific catalysts include, by way of illustration, 1,4-diazabicyclo[2.2.2]octane, N,N,N',N' - tetramethyl-1,3-butanediamine, bis[2 - (N,N-dimethylamino)ethyl]ether, bis[2 - (N,N - dimethylamino)-1-methylethyl]ether, N-methylmorpholine, sodium acetate, potassium laurate, stannous octanoate, stannous oleoate, lead octanoate, tetrabutyl titanate, ferric acetylacetonate, cobalt naphthenate, tetramethyltin, tributyltin chloride, tributyltin hydride, trimethyltin hydroxide, dibutyltin oxide, dibutyltin dioctanoate, dibutyltin dilaurate, butyltin trichloride, triethylstibine oxide, potassium hydroxide, sodium carbonate, magnesium oxide, stannous chloride, stannic chloride, bismuth nitrate. Other catalysts include those set forth in "Part IV. Kinetics and Catalysis of Reactions" of Saunders, et al. "Polyurethanes: Chemistry and Technology—Part I. Chemistry," Interscience Publishers, which is incorporated by reference into this disclosure. In many instances, it is particularly preferred to employ combinations of catalysts such as, for example, a tertiary amine plus an organic tin compound.

The isocyanato-reactive hydrogen reactions can be conducted over a wide temperature range. In general, a temperature range of from about 0° to about 250° C. can be employed. To a significant degree, the choice of the reactants and catalyst, if any, influences the reaction temperature. Of course, sterically hindered novel isocyanates or active hydrogen compounds will retard or inhibit the reaction. Thus, for example, the reaction involving isocyanato with primary amino or secondary amino can be effected from about 0° C. to about 250° C. whereas the isocyanato-phenolic hydroxyl reaction is more suitably conducted from about 30° C. to about 150° C. Reactions involving primary alcoholic hydroxyl, secondary alcoholic hydroxyl, or carboxyl with isocyanato are effectively conducted from about 20° C. to about 250° C. The upper limit of the reaction temperature is selected on the basis of the thermal stability of the reaction products and of the reactants whereas the lower limit is influenced, to a significant degree, by the rate of reaction.

The time of reaction may vary from a few minutes to several days, and longer, depending upon the reaction temperature, the identity of the particular active hydrogen compound and isocyanate as well as upon the absence or presence of an accelerator or retarder and the identity thereof, and other factors. In general the reaction is conducted for a period of time which is at least sufficient to provide the addition or attachment of the "active hydrogen" from the active hydrogen compound to the isocyanato nitrogen of the novel isocyanate. The remainder of the active hydrogen compound becomes bonded to the carbonyl carbon unless decarboxylation or further reaction occurs. The following equation illustrates the reaction involved.

V $\quad$ R—N=C=O + H—Z $\longrightarrow$ RNH—$\overset{O}{\underset{\|}{C}}$—Z wherein H-Z represents the active hydrogen compound. Thus, by way of illustrations the reaction of isocyanato (—NCO) with (a) hydroxyl (—OH) results in the $$-NH\overset{O}{\underset{\|}{C}}O-$$

group; (b) primary amino (—NH$_2$) results in the $$-NH\overset{O}{\underset{\|}{C}}NH-$$

group; (c) secondary amino (—NHR) results in the $$-NH\overset{O}{\underset{\|}{C}}NR-$$

group; (d) thiol (—SH) results in the $$-NH\overset{O}{\underset{\|}{C}}S-$$

group; (e) carboxyl (—COOH) can be considered to result in the intermediate $$[-NH\overset{O}{\underset{\|}{C}}O\overset{O}{\underset{\|}{C}}-]$$

which decarboxylates to the $$(-NH\overset{O}{\underset{\|}{C}}-)$$

group; (f) ureylene $$(-NH\overset{O}{\underset{\|}{C}}NH-)$$

results in the $$\begin{matrix} & \overset{O}{\underset{\|}{} } & H \\ -N-&C&-N- \\ & | & \\ O=&C&-NH- \end{matrix}$$

group (biuret); (g) amido $$(-\overset{O}{\underset{\|}{C}}-NHR)$$

results in the

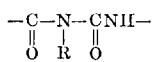

group (carbonylurea); (h) urethane

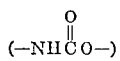

results in the

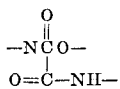

group (allophanate); (i) water (HOH) can be considered to result in the intermediate

which decarboxylates to the —NH₂ group; and the like. Most desirably, conditions are adjusted so as to achieve a practical and commercially acceptable reaction rate depending, to a significant degree, on the end use application which is contemplated. In many instances, a reaction period of less than a few hours is oftentimes sufficient for the intended use.

The isocyanato-reactive hydrogen reactions, in many instances, are preferably accomplished in the presence of a catalytically significant quantity of one or more of the catalysts illustrated previously. In general, a catalyst concentration in the range of from about 0.001 weight percent, and lower, to about 2 weight percent, and higher, based on the total weight of the reactants, has been observed to be useful.

The concentration of the reactants can be varied over a wide range. Thus, for example, one can employ the active hydrogen compound in such relative amounts that there is provided as low as about 0.1 equivalent (group) of active hydrogen, and lower, per equivalent (group) of isocyanato. In general, about 0.2 and oftentimes about 0.25 equivalent of active hydrogen represent more suitable lower limits. The upper limit can be as high as about 7 equivalents of active hydrogen, and higher, per equivalent of isocyanato. However, for many applications, a desirable upper limit is about 3.5 equivalents of active hydrogen per equivalent of isocyanato. When employing bifunctional compounds (those which contain two active hydrogen substituents such as hydroxyl, carboxyl, primary amino, secondary amino, etc.), a suitable concentration would be from about 0.25 to about 3 equivalents of active hydrogen substituent from the bifunctional compound per equivalent of isocyanate. It is readily apparent that depending upon the choice and functionality of the active hydrogen compound(s), the choice of the isocyanate(s), the proportions of the reactants, etc., there can be obtained a myriad of novel compounds and products which range from the liquid state to solids which can be fusible solids, thermoplastic solids, partially cured to essentially completely cured, thermoset solids, etc. Many of the novel liquid to non-crosslinked solid compositions contain a plurality of polymerizable ethylenic bonds which serve as vinyl polymerization sites with vinyl monomers such as those illustrated previously, e.g., styrene, butadiene, vinyl chloride, vinyl acetate, methyl acrylate, etc., under the operative conditions noted supra.

A class of novel compounds, i.e., "blocked isocyanates," which deserve special mention are those which contain the $$-\text{NHC}-\overset{\text{O}}{\underset{\|}{}}$$

grouping therein. These compounds are characterized as follows:

VI 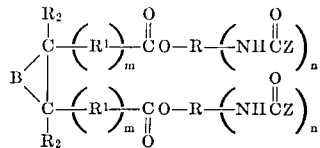

wherein B, $R_2$, R, $R^1$, $m$, and $n$ have the values set out in Formula I supra, and wherein Z is an abbreviated form for the monofunctional active organic compound sans the active hydrogen atom (or polyfunctional active organic compound, especially the bifunctional active organic compound, sans an active hydrogen atom). Illustrative Z radicals include those which result from the reaction of, for example, at least stoichiometric quantities of the functional active organic compounds with the novel ester isocyanates of Formula I. The scope of Z is readily apparent from the description re the active hydrogen compounds as well as from a consideration of Equation V supra.

Moreover, by employing, for example, less than stoichiometric quantities of monofunctional active organic compound to novel isocyanate, i.e., less than one equivalent of active hydrogen substituent per equivalent of isocyanato group, there are obtained novel "partially blocked" isocyanate compounds. These "partially blocked" compounds will contain both —NCO and $$-\text{NHCZ}\overset{\text{O}}{\underset{\|}{}}$$

groupings as illustrated by Formula VI-A:

VI-A $$B\begin{cases}\overset{R_2}{\underset{|}{C}}-(R^1)_m-\overset{O}{\underset{\|}{C}}O-R-(NCO)_n\\ \overset{|}{\underset{R_2}{C}}-(R^1)_m-\overset{O}{\underset{\|}{C}}O-R-(NHCZ)_n\overset{O}{\underset{\|}{}}\end{cases}$$

wherein the variables in Formula VI-A are the same as described in Formula VI above.

A particularly preferred class of "blocked isocyanates" are depicted by Formula VII below:

VII $$\underset{(R_1)_{6-y}}{\overset{(X)_y}{\bigotimes}}\begin{matrix}R_2 & O & O\\ -(R^1)_m-\overset{\|}{C}O-R-NHCZ\\ -(R^1)_m-\overset{\|}{C}O-R-NHCZ\\ R_2 & O & O\end{matrix}$$

wherein X, $R_1$, R, $R^1$, $R_2$, $m$, and $y$, have the significance stated with respect to Formula II supra, and wherein Z is defined as in Formula VI above.

The "partially blocked" isocyanates which are especially preferred can be illustrated with reference to Formula VII-A below:

II-A $$\underset{(R_1)_{6-y}}{\overset{(X)_y}{\bigotimes}}\begin{matrix}R_2 & O\\ -(R^1)_m-\overset{\|}{C}O-R-NCO\\ -(R^1)_m-\overset{\|}{C}O-R-NHCZ\\ R_2 & O & O\end{matrix}$$

wherein the variables in Formula VII-A are the same as described in Formula VII above.

A further class of polymeric products which deserve to be highlighted are those novel polymers which are characterized by Unit VIII below:

VIII

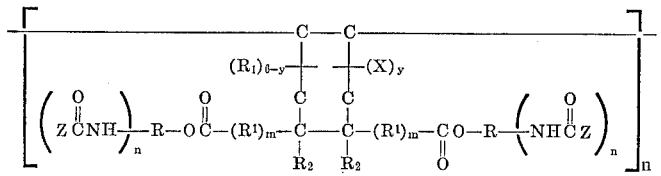

wherein the variables R, R¹, $R_1$, $R_2$, X, m, n, and y have the meanings discussed in connection with Unit IV supra, and wherein Z is described in the discussion re Formula VI supra.

A still further class of polymeric products which should be exemplified by illustration include the novel polymers which are characterized by Unit VIII-A below:

VIII-A

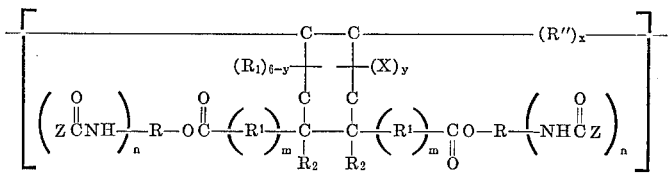

wherein the variables R, R¹, $R_1$, $R_2$, X, m, n, and y have the meanings set out in Unit IV-A supra; wherein Z has the value set out in Formula VI supra; wherein R″ is a substituted or unsubstituted divalent radical which contains two carbon atoms in the polymeric chain (R″, in effect, is the polymerizable comonomer which enters into chemical union with the other monomer(s) through the polymerizable ethylenic bond), and wherein x has a value of zero or one.

Those novel polymeric products which contain at least one of, preferably a plurality of, the structure defined as Unit VIII-B below, represent especially preferred subclasses, to wit:

VIII-B

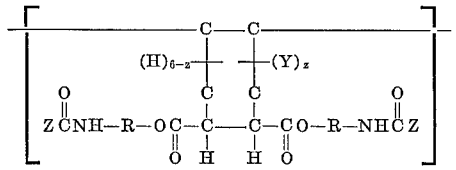

wherein H, Y, R, and z have the significance of Unit IV-B supra; and wherein Z is defined in Formula VI supra.

Novel polymers characterized by Unit VIII-C below represent a highly important embodiment of the invention, that is:

VIII-C

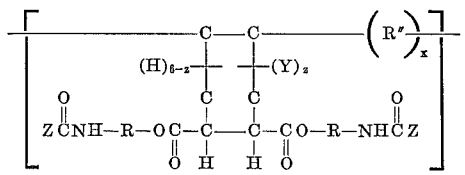

wherein R, Y, H, Z, and z have the values set out in Unit VIII-B supra, and wherein R″ and x have the values noted in Unit VIII-A.

The novel polymeric products contain at least one of the units designated as Units VIII through VIII-C, and in general, these products contain a plurality of said units, e.g., upwards to 200, and more. It is pointed out that the novel polymeric products which are characterized by one or more of Units VIII through VIII-C therein can also contain one or more of the units designated as Units IV through IV-C therein. Both types of units can occur, e.g., Unit IV and VIII, in the novel polymeric products via the vinyl polymerization of an admixture comprising an isocyanate of Formula I, a "blocked" isocyanate of Formula VI with/without an ethylenically unsaturated organic compound. In addition, useful and interesting polymeric products are obtained by the vinyl polymerization of an admixture comprising the "partially blocked" isocyanate of Formula VI-A with/without an ethylenically unsaturated organic compound.

A particular desirable class of novel polyurethane diols which are contemplated within the scope of the teachings of this specification are those which result from the reaction of a dihydroxy compound such as those illustrated previously, with a molar deficiency, i.e., a stoichiometric deficiency, of the novel diisocyanates which fall within Formula I supra, and especially those encompassed within Formula II supra. The highly preferred dihydroxy compounds are the alkylene glycols, the polyether glycols, the polyoxyalkylated diols, the polyester diols, and the initiated lactone polyester diols, especially those dihydroxy compounds which have average molecular weights as low as about 60 and as high as about 7000, and higher. A preferred average molecular weight range is from about 300 to about 5000. The initiated lactone polyester diols which have an average molecular weight of from about 600 to about 4000 are eminently preferred since within this molecular weight range there can be prepared, for example, polyurethane products such as cast resins, thermoplastic products, and elastic fibers which exhibit outstanding performance characteristics. Equation IX below illustrates the linear extension reaction involved:

IX

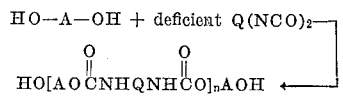

wherein HO—A—OH is an abbreviated representation of the organic dihydroxy compounds, the variable A being an organic divalent aliphatic radical such as those illustrated previously; wherein $Q(NCO)_2$ is an abbreviated representation for the novel diisocyanates encompassed within the scope of Formulas I or II supra; and wherein n is a number having an average value of at least one.

It will be noted from Equation IX that the degree of linear extension is realistically controlled by the amount of the reactants employed. If the proportions of diol and diisocyanate are chosen so that the number of reactive hydroxyl groups on the diol are equal to the number of reactive isocyanate groups on the diisocyanate, then relatively long, high molecular weight chains can be formed. In general, one can employ such relative amounts so that there is provided slightly greater than one equivalent of hydroxyl group from the diol per equivalent of isocyanato group from the diisocyanate. It is desirable, however, to employ amounts of diol and organic diisocyanate (in Equation IX) so that there is provided a ratio of from about 1.1 to about 2.2 equivalents, and higher, of hydroxyl group per equivalent of isocyanato group, and preferably from about 1.3 to about 2 equivalents of hydroxyl group per equivalent of isocyanato group.

It is to be understood that in lieu of the dihydroxy compounds employed in Equation IX one can employ higher functional polyols such as the triols, tetrols, etc., and obtain novel polyurethane triols, tetrols, etc. In addition, admixtures of dihydroxy compounds, or dihydroxy compounds plus higher functional hydroxy compounds, can be employed.

An eminently preferred class of novel polyurethane diisocyanates which are contemplated are those which result from the reaction of a dihydroxy compound exemplified previously, with a molar excess of the novel diisocyanates of Formulas I or II supra. The highly preferred dihydroxy compounds which can be employed include those illustrated in the discussion re Equation IX supra as well as the resulting polyurethane diol products (of Equation IX). Equation X below illustrates this linear extension reaction involved:

X       HO—A—OH + excess Q(NCO)$_2$ ⟶

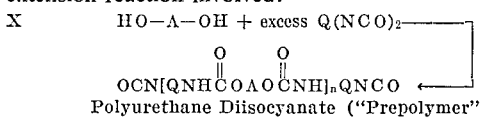

Polyurethane Diisocyanate ("Prepolymer")

wherein all the variables of Equation X have the meanings set out in Equation IX previously.

It will be noted from Equation X that the use of an excess of diisocyanate provides an efficient means of control over the degree of linear extension of the polyurethane molecule. If the proportions of diol and diisocyanate are chosen so that the number of reactive terminal hydroxyl groups on the diol are equal to the number of reactive isocyanate groups on the diisocyanate as indicated previously, relatively long, high molecular weight chains would be formed. It is desirable, for many applications, to employ amounts of diisocyanate and diol (in Equation X) so that there is provided a ratio of greater than about one equivalent of diisocyanate per equivalent of diol, preferably from about 1.05 to about 7 equivalents, and higher, of diisocyanate per equivalent of diol, and preferably still from about 1.2 to about 4 equivalents of diisocyanate per equivalent of diol.

During and after the preparation of the isocyanato-terminated reaction products it is oftentimes desirable to stabilize said reaction products by the addition of retarders to slow down subsequent further polymerization or less desirable side-reactions such as, for example, allophanate formation. Retarders may be added to the diisocyanate, diol, and/or the aforesaid reaction products. Illustrative of the retarders suitable for the diol-diisocyanate reaction are hydrochloric acid, sulfuric acid, phosphoric acid, boric acid, acetyl chloride, para-toluenesulfonyl chloride, phosphorous trichloride, phosphorous oxychloride, sulfuryl chloride, thionyl chloride, and sulfur dioxide.

In lieu of, or in conjunction with, the dihydroxy reactants of Equation X, it is oftentimes desirable to employ higher functional polyols such as the triols, tetrols, etc., and obtain novel polyurethane triisocyanates, tetraisocyanates, etc.

Another particular desirable class of novel compounds which are contemplated are the novel polyurea diamines which are prepared via the reaction of a diamino compound (which contain two groups from the class of primary amino, secondary amino, and mixtures thereof) as illustrated previously with a molar deficiency of the novel diisocyanates. Equation XI below illustrates this linear extension reaction involved:

XI       HN—D—NH + deficient Q(NCO)$_2$ ⟶
               |    |
               R″  R″

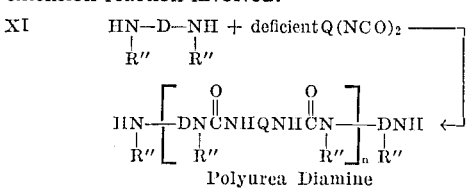

Polyurea Diamine wherein $$\text{HN—D—NH} \atop {\text{R″ \ \ R″}}$$

is an abbreviated representation of a diamine compound (the R″ variables representing hydrogen; a monovalent hydrocarbon or azahydrocarbon radical, e.g., alkyl, aryl, aralkyl, azaalkyl, and the like; and D representing a divalent organic radical, e.g., a divalent aliphatic, alicyclic, aromatic, or heterocyclic radical), and wherein Q(NCO)$_2$ and $n$ have the meanings set forth in Equation IX supra. In general, one can employ slightly greater than about one and upwards to about two, and higher, equivalents of amino group per equivalent of isocyanato group. In lieu of, or in conjunction with, the diamino reactants of Equation XI, it is oftentimes desirable to employ higher functional polyamines such as the triamines, tetraamines, etc., and obtain novel polyurea triamines, polyurea tetraamines, etc.

On the other hand, the use of a molar excess of diisocyanate with relation to the diamino compound produces novel polyurea diisocyanates as illustrated by Equation XII:

XII       HN—D—NH + excess Q(NCO)$_2$ ⟶

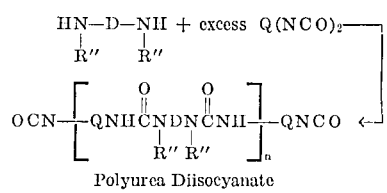

Polyurea Diisocyanate

In the reaction exemplified by Equation XII supra, there can be employed slightly greater than about one and upwards to about 3, and higher, equivalents of isocyanato group per equivalent of amino group. Higher functional polyamines can be employed instead of, or admixed with, the diamines, to thus yield novel polyurea triisocyanates, polyurea tetraisocyanates, etc.

If desired, the preceding novel linear extension reactions can be carried out in the presence of essentially inert normally-liquid organic vehicles such as various organic solvents, depending upon the further application which may be intended for said reaction products.

In another aspect, the invention is directed to the preparation of cast polyurethane systems. Highly useful rigid to flexible, polyurethane resins which can range from slightly crosslinked products to highly crosslinked products can be prepared by the novel polyisocyanates of Formulas I or II supra and/or the novel polyisocyanato-containing polymers exemplified by Units IV to IV-C supra and/or the polyurethane polyisocyanato reaction products discussed in the section re Equation X with a polyfunctional chain extender which contains at least two functional groups that are primary amino (—NH$_2$), secondary amino (—NHR), hydroxyl (—OH), or mixtures thereof. The polyisocyanate and polyfunctional chain extender are employed in such relative amounts that there is provided at least about one equivalent (group) of isocyanato (—NCO) from the polyisocyanate per equivalent (group) of functional group (hydroxyl and/or amino) from the polyfunctional compounds. When employing solely difunctional compounds as the chain extender(s), it is desirable to employ such relative amounts that result in greater than about one equivalent of —NCO, e.g., at least about 1.02 equivalents of —NCO, from the polyisocyanate per functional group from the difunctional compound. However, it is oftentimes highly satisfactory when employing polyfunctional chain extenders which contain 3 or more functional groups, alone or in admixture with difunctional chain extenders, to employ such relative amounts so that there is provided at least about one equivalent of —NCO from the polyisocyanate per equivalent of functional group from the chain extender(s). Cast polyurethane resins having special utility as printing ink rollers, cast solid urethane industrial tires, mechanical goods such as seals, O-rings, gears, etc., ladies shoe heels, and the like, can be prepared from castable formulations which provide from about 1.02 to about 1.6 equivalents of —NCO from the polyisocyanate per equivalent of functional group from the polyfunctional chain extender. Optimum properties result from the highly preferred castable formulations which provide from about 1.05 to about 1.4 equivalents of —NCO per equivalent of functional group.

It is further highly desirable that the aforesaid polyisocyanate be a prepolymer as defined in Equation X supra which has an average molecular weight of at least 550 in the preparation of cast polyurethane resins. The upper limit can be as high as 8000 and higher. For many applications, a practical molecular weight range is from about 750 to about 5000. It is observed that within the aforesaid molecular weight limits there can be produced cast polyurethane resins which vary from extremely soft flexible products to relatively hard plastic products. Prepolymers which result from the reaction of diisocyanate and the initiated lactone polyester polyols are eminently suitable since cast resins which possess high performance characteristics can be obtained.

Among the polyfunctional chain extenders which can be employed in the castable formulations are those organic compounds exemplified previously which have two or more hydroxyl or amino (primary and secondary) groups including mixtures of such groups such as the polyols, (diols, triols, tetrols, etc.), the polyamines (diamines, triamines, etc.), amino alcohols, and the like. Among the polyfunctional chain extenders which deserve special mention because they result in especially useful cast polyurethane resins of high strength, high tear resistance, relatively low permanent set, good solvent resistance, and/or excellent abrasion resistance can be listed the following: 1,4-butanediol, 1,5-pentanediol, 1,6-hexanediol, quinitol, 1,4-bis(2-hydroxyethoxy)benzene, 4,4'-bis [(2 - hydroxyethoxy)phenyl]isopropylidene, trimethylolpropane, triisopropanolamine, ethanolamine, p-aminophenylethyl alcohol, 2,4- and 2,6-toluenediamines, 3,3'-dichloro-4,4'-diphenylenediamine, and 4,4'-methylene bis (o-chloroaniline).

The preparation of the cast polyurethane products can take place over a wide temperature range, e.g., from about room temperature to about 200° C., and higher. The preferred temperature is in the range of from about 50° C. to about 150° C. A highly preferred temperature range is from about 60° C. to about 105° C. The upper limit of the reaction temperature, as indicated previously, is realistically controlled by the thermal stability of the reactants and reaction products whereas the lower limit is regulated, to a significant degree, by the reaction rate.

A valuable modification of the cast polyurethane aspect is the use of an admixture containing the polyols exemplified previously with/without the novel polyurethane diols (of Equation IX) plus the novel polyisocyanates (of Formula I) instead of, or in conjunction with, the prepolymer (of Equation X). It is preferred that the previously exemplified polyols be substantially linear hydroxyl-terminated polymers. It is highly preferred that these polymers have an average molecular weight of at least about 60 and upwards to 6000, and higher, and preferably from about 300 to about 5000. The hydroxyl-terminated polymers which are eminently suitable include the alkylene glycols, the polyether glycols, the polyester diols, the polyoxyalkylated diols, and the initiated lactone polyester dols. In this modification, the ratios of the equivalents of —NCO and the equivalents of functional groups are the same as set forth above. It is understood, of course, that these ratios will include all the —NCO groups and all the functional groups in the castable formulation regardless of the source. Thus, for example, if the formulation comprises novel polyurethane diol, novel diisocyanate, and alkanediol, one must take into consideration when computing the equivalents ratio of said formulation, the equivalents of —NCO from the diisocyanate with relation to the sum of the equivalents of the hydroxyl groups from the polyurethane diol plus alkanediol.

A further desirable modification of the cast polyurethane aspect is directed to the partial or incomplete reaction of the cast formulation to thus produce a thermoplastic reaction product mass which contains unreacted or free isocyanato groups. The aforesaid thermoplastic mass is relatively stable or non-reactive at room temperature, e.g., about 20° C., but possesses the characteristic of being further cured as, for example, by curing same at an elevated temperature for a sufficient period of time. This curable, isocyanato-containing mass can be prepared by heating the cast formulation or system, e.g., to about 100° C., and higher, and thereafter quenching the resulting partial reaction products (which contain a minor proportion of unreacted isocyanato groups) with an inert fluid in which said reaction products are insoluble, e.g., an inert normally liquid organic non-solvent. The aforesaid curable, isocyanato-containing thermoplastic mass can be stored for relatively long periods of time or shipped to customers over great distances without undergoing any appreciable reaction at ambient conditions, e.g., about 20° C.

An extremely significant aspect is directed to the preparation of thermoplastic polyurethane resins including curable polyurethane systems. Such useful systems and/or resins can be prepared from formulations (which include the reactants, especially the difunctional reactants, reaction conditions, and modifications thereof) as set out in the preceding aspect (re the cast polyurethanes) with the exception that there is employed at least about one equivalent of functional group, e.g., hydroxyl, primary amino, secondary amino, or mixtures thereof, from the polyfunctional chain extender per equivalent of isocyanato (—NCO) from the isocyanate source. In general, a practical upper limit would be about 1.5 equivalents of functional group per equivalent of —NCO. Preferred formulations contain from about 1.02 to about 1.3 equivalents of functional group per equivalent of —NCO, preferably still from about 1.05 to about 1.15 equivalents of functional group per equivalent of —NCO. In other modifications, it is eminently preferred that the thermoplastic formulation contain about one equivalent of functional group per equivalent of isocyanato, especially to prepare thermoplastic elastomers which exhibit high performance characteristics.

The thermoplastic and curable polyurethane resins can be cured or crosslinked with an organic polyisocyanate. In this respect the novel polyisocyanates of Formula I supra, the novel polyisocyanato-containing polymers exemplied previously, and/or polyisocyanates well known in the literature can be employed, e.g., publication by Siefken [Annalen, 562, pages 122-135 (1949)]. Polyisocyanates such as those produced by the phosgenation of the reaction products of aniline and formaldehyde, or p,p',p''-triphenylmethane triisocyanate, represent further illustrations.

In general, the cure can be effected by using an amount of polyisocyanate which is in stoichiometric excess necessary to react with any free or unreacted functional group from the polyfunctional chain extender. In general, from about 1 to about 10 parts by weight of additional polyisocyanate per 100 parts by weight of curable polyurethane resin is adequate to accomplish the cure for most applications. A preferred range is from about 2.5 to about 6 parts by weight of polyisocyanate per 100 parts by weight of curable stock. The additional polyisocyanate can be admixed with the curable polyurethane stock on a conventional rubber mill or in any suitable mixing device and the resulting admixture is cured in the mold at an elevated temperature, e.g., from about 125°-160° C., in a relatively short period, e.g., a few minutes, or longer. In the mold, the cure is accomplished apparently by a reaction of excess amino or hydroxyl groups with the newly admixed polyisocyanate, and secondly by reaction of the remaining free terminal isocyanato groups with hydrogen atoms of the urea and urethane groups to form a cross-linked resin. By this procedure, there can be obtained cured polyurethane products which range from highly elastomeric materials possessing excellent tensile strength and exceptional low brittle temperature to tough, rigid rubbery materials.

Various modifying agents can be added to the castable or curable formulations among which can be listed fillers such as carbon blacks, various clays, zinc oxide, titanium dioxide, and the like; various dyes; plasticizers such as polyesters which do not contain any reactive end-groups, organic esters of stearic and other fatty acids, metal salts of fatty acids, dioctyl phthalate, tetrabutylthiodisuccinate; glass; asbestos; and the like.

A modification of the thermoplastic and curable polyurethane resins is the preparation of formulations using diisocyanates which are well known in the literature, and subsequently effecting the cure with the novel polyisocyanates of Formulas I or X or the polyisocyanato-containing polymers characterized by Units IV to IV–C supra.

A particularly preferred aspect is directed to the preparation of elastomeric and relatively non-elastomeric products, especially elastomeric films and elastic fibers. It has been discovered quite surprising, indeed, that there can be prepared excellent elastic polyurethane films and fibers which are derived from substantially linear hydroxyl terminated polymers having an average molecular weight greater than about 500 and the novel diisocyanates of Formula I supra. The elastic films and fibers of this aspect are characterized by outstanding resistance to sunlight degradation, outstanding elongation, high resistance to fume aging, i.e., resistance to breakdown caused by nitrous oxide which is commonly found as an impurity in the atmosphere, high tensile and modulus properties, and/or good stability to oxidizing agents such as chlorine bleach.

These novel elastomeric and relatively non-elastomeric films and fibers can be prepared by first reacting the aforesaid substantially linear hydroxyl-terminated polymer with a molar excess of the novel diisocyanate (of Formula I) to produce a substantially linear isocyanato-terminated polyurethane product (known as a "prepolymer"). The chain extension reaction of said prepolymer with a bifunctional curing compound in accordance with, for instance, well known cast or spinning techniques results in films or fibers as may be the case. In a useful embodiment, the aforesaid substantially linear hydroxyl-terminated polymers can be linearly extended by reaction with a molar deficiency of an organic diisocyanate to yield substantially linear hydroxyl-terminated polyurethane products which products then can be reacted with a molar excess of the novel diisocyanates to obtain the prepolymer.

The substantially linear hydroxyl-terminated polymer possesses an average molecular weight of at least about 500, more suitably at least about 700, and preferably at least about 1500. The upper average molecular weight can be as high as 5000, and higher, a more suitable upper limit being about 4000. For many of the novel elastic fibers and films which exhibited a myriad of excellent characteristics, the average molecular weight of the starting hydroxyl terminal polymer did not exceed about 3800. In addition, the hydroxyl-terminated polymers possess a hydroxyl number below about 170, for example, from about 20 to about 170; and a melting point below about 70° C., and preferably below about 50° C.

Exemplary of the substantially linear hydroxyl-terminated polymers which are contemplated include the alkylene glycols, the polyether glycols, the polyoxyalkylated diols, the polyester diols, and the initiated lactone polyester diols. The initiated lactone polyester diols are eminently preferred since elastomeric films and elastic fibers exhibiting outstanding performance characteristics can be obtained. Of the highly preferred initiated lactone poly-ester diols are included those which are characterized by at least about 50 mol percent of carbonylpentamethyleneoxy units therein

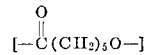

and which possess an average molecular weight of from about 500 to about 5000, particularly from about 600 to about 4000. The remaining portion of the molecule can be comprised of, in addition to the initiator, essentially linear units derived from a cyclic carbonate such as those illustrated previously, e.g., 4,4-dimethyl-2,6-dioxycyclohexanone, 4,4-dicyanomethyl - 2,6 - dioxacyclohexanone, 4,4-dichloromethyl-2,6-dioxacyclohexanone, 4,4-di-(methoxymethyl)-2,6-dioxacyclohexanone, and the like; an oxirane compound especially ethylene oxide, 1,2-epoxypropane, the epoxybutanes, etc.; a mono-, di-, and/or trialkyl-epsiloncaprolactone such as the monomethyl-, dimethyl-, trimethyl-, monoethyl-, diethyl-, triethyl-epsilon-caprolactones, and other exemplified supra; an alpha, alpha-dialkyl-beta-propiolactone such as alpha, alpha-dimethyl-beta-propiolactone; an alpha, alpha-dihaloalkyl-beta-propiolactone as illustrated by alpha, alpha-dichloromethyl-beta-propiolactone; and others. Also highly preferred polymeric diols include the so-called initiated lactone homopolyester diols which are prepared via the reaction of an admixture of epsilon-caprolactone and an initiator which contains two groups from the class of hydroxyl, primary amino, secondary amino, and mixtures thereof, in the presence of a catalyst such as stannous dioctanoate or stannic tetraoctanoate.

Illustrative of the polyether glycols which are contemplated include those illustrated previously as well as those illustrated in column 7, lines 19 through 70 of U.S. Pat. No. 2,929,804 which patent is incorporated by reference into this disclosure. Many of the polyester diols which are encompassed have been exemplified previously. Others are set forth in columns 4–5 of U.S. Pat. No. 3,097,192 which patent is incorporated by reference into this disclosure. The initiated lactone polyester diols have been thoroughly illustrated previously; others are disclosed in U.S. Pat. Nos. 2,878,236, 2,890,208, 2,914,556, and 2,962,524 which patents are incorporated by reference into this disclosure. The polyurethane diols of Equation IX also represent a preferred group of substantially linear hydroxyl-terminated polymers.

The minimization or elimination of crystallinity, if present in the hydroxyl-terminated polymer, can be achieved, as oftentimes is desired, by introducing pendant groups and/or unsymmetrical groups in the polymeric chain as illustrated by lower alkyl groups, e.g., methyl, ethyl, isopropyl, etc.; halo, e.g., chloro, bromo, etc.; orthotolylene; and similar groups which do not interfere with the subsequent polymerization under the conditions used. As is readily apparent to those skilled in the art, the choice of the proper reactants will readily yield hydroxyl-terminated polymers with the desired quantity and type of pendant and/or unsymmetrical groups. Along this vein, polymers of desired molecular weight and melting point can thus be obtained. In addition, the polymer chain can be interrupted with divalent keto, urea, urethane, etc. groups.

The hydroxyl-terminated polymer and diisocyanate can be reacted in such proportions so as to produce either a hydroxyl-terminated polyurethane product or an isocyanato-terminated polyurethane product (prepolymer). A molar ratio of diol to diisocyanate greater than one will yield the hydroxyl-terminated polyurethane whereas a molar ratio less than one will result in the prepolymer.

As indicated previously, in a particularly useful embodiment, there is employed a sufficient molar excess of hydroxyl-terminated polymer, in particular, the initiated lactone polyester diols, with relation to the organic diisocyanate so that there results substantially linear hydroxyl-terminated polyurethane products which have average molecular weights of from about 1200 to about 5000, and preferably from about 1500 to about 3800.

The hydroxyl-terminated polymers or the above-said hydroxyl-terminated polyurethane products then are linearly extended preferably with the non-halogenated diisocyanates of Formula I. This reaction can be carried out by employing a molar ratio of diisocyanate to hydroxyl-terminated compound of from about 1.1:1 to about 5:1, preferably from about 1.5:1 to about 3.5:1, and more preferably from about 2:1 to about 2.5:1.

In the preparation of the hydroxyl-terminated polyurethane products or the prepolymer, the reaction temperature can vary over a broad range such as noted for the isocyanato/active hydrogen (hydroxyl in this instance) section disscused previously. Of course, the optimum reaction temperature will depend, to a significant degree, upon several variables such as the choice of reactants, the use of a catalyst, the concentration of the reactants, etc. A suitable temperature range is from about 20° C. to about 125° C., and preferably from about 50° C. to about 100° C. The reaction time likewise is largely influenced by the correlation of the variable involved, and can vary from a few minutes to several hours, e.g., from about 0.5 to about 5 hours, and longer. The tertiary amine compounds and/or the organic metal compounds disclosed in the section which discusses the isocyanato/active hydrogen reaction can be employed as catalysts, if desired. The isocyanato/hydroxyl reactions are suitable carried out in the absence of an inert normally liquid organic vehicle, though one can be employed, if desired.

In the next step, the prepolymer which results from the above discussed iscyanato/hydroxyl reaction is reacted with a bifunctional curing compound which possesses two groups that are reactive with isocyanato groups. Examples of such curing compounds include diamines, diols, amino alcohols, hydazino compounds. e.g., hydrazine, water, and the like. It is preferred that said curing compound have two reactive groups from the class of alcoholic hydroxyl, primary amino, and secondary amino. The most preferred reactive group is primary amino. It is to be understood that primary amino (—$NH_2$) and secondary amino (—NHR) include those compounds in which the nitrogen of these amino groups is bonded to a carbon atom as in, for example, ethylenediamine, as well as those compounds in which said nitrogen (of these amino groups) is bonded to another nitrogen atom as in, for instance, hydrazine.

The bifunctional curing compounds have been illustrated previously in the discussion of the active hydrogen compounds. Among the more desirable diamines (which term includes the mono- and polyalkylene polyamines which have two and only two primary and/or secondary amino groups) are such compounds as ethylenediamine, 1,2- and 1,3 - propylenediamine, tetramethylenediamine, pentamethylenediamine, hexamethylenediamine, the cyclohexylenediamines, the phenylenediamines, the tolylenediamines, 4,4′-diaminodiphenylmethane, m- and p-xylylenediamine, 3,3′-dichloro - 4,4′ - diaminophenylmethane, benzidine, 1,5-diaminonaphthalene, piperazine, 1,4-bis(3-aminopropyl)piperazine, trans - 2,5 - dimethylpiperazine, and the like.

It is preferred that the diamine contain no groups other than the two reactive amino groups that are reactive with isocyanato. The said diamine can have various substituent groups including chloro, bromo, alkoxy, alkyl, and the like. Generally it is also preferred that the diamine have not more than 15 carbon atoms.

Illustrative of the various diols and amino alcohols include those exemplified previously and, in particular, ethylene glycol, propylene glycol, 2,2-dimethyl-1,3-propanediol, paradibenzyl alcohol, 1,4-butanediol, ethanolamine, isopropanolamine, and the like. Water and hydrazine are also useful bifunctional curing agents. The organic diamines are the preferred curing compounds, with the alkylenediamines being more preferred, and ethylenediamine being most preferred.

The ratio of reactants in the curing step can vary from about 0.8 to about 1.5 equivalents of isocyanato from the prepolymer per equivalent of functional group from the bifunctional curing compound. In many cases, it is desirable to employ approximate stoichiometric proportions of prepolymer and curing compound, i.e., in proportions such that there is present approximately one isocyanato group from the prepolymer per reactive group from the difunctional curing compound. Oftentimes, it is desirable to employ a slight stoichiometric deficiency or excess of prepolymer, e.g., slightly less than about or slightly greater than about one equivalent (and upwards to about 1.4 equivalents) of isocyanato per equivalent of functional group (from the bifunctional curing compound), and preferably from about one to about 1.2 equivalents of isocyanato per equivalent of functional group.

A preferred method for carrying out the reaction of prepolymer with curing compound is to effect the reaction to an inert normally liquid organic solvent and thus form a solution from which the fibers and films of the invention can be produced by conventional solution spinning and casting techniques. This can be done by dissolving the prepolymer in a solvent to make, for example, from about 5 to about 40 weight percent solid solution (percent based on total solution weight), and then adding the bifuntional curing compound to this solution. The addition will be facilitated if the curing compound is also dissolved in the same solvent. Many solvents can be used for this purpose. The essential requirement is that the solvent be nonreactive with the prepolymer and with the curing compound. Examples of useful solvents include acetone, dimethyl sulfoxide, N,N-dimethylformamide, N,N-dimethylacetamide, tetrahydrofuran, and the like. N,N-dimethylformamide is a preferred solvent. Acetone alone or in admixture with other organic vehicles such as those illustrated above represent the preferred solvents from commercial and economic standpoints. In this respect, it should be noted that commercial polyurethane fibers prepared from aromatic diisocyanates, e.g., bis(4 - isocyanatophenyl)methane (MDI), as far as is known, are not spun or cast from an acetone system. In lieu thereof, a universal solvent utilized in the preparation of the aforesaid commercial polyurethane fibers is the expensive dimethylformamide.

The reaction between the prepolymer and the curing compound can take place readily at room temperature. Therefore, the solution can be spun into a fiber or cast into a film within a relatively short period, e.g., a few minutes, after the curing compound has been added. For example, the solution can usually be cast or spun within 10 minutes after the addition of a diamine to the prepolymer when the reactants are at a temparture of about 25° C. In making fibers, the polymer solution can be wet spun into an aqueous bath, or dry spun, via conventional techniques. Liquids other than water can be employed in the bath, if desired, but water is generally preferred for economic reasons. Ethylene glycol, glycerol, dimethylformamide, and the like, alone or in admixture, with/without water, are illustrative of such other liquids. The temperature of the bath can be varied over a range of, for instance, 25° C. to 150° C. The fiber is recovered from the bath by conventional techniques, and can be given a post-cure to oftentimes enhance certain of the properties. A cure at elevated temperatures, for example, up to about 125° C., and higher, for periods ranging from several minutes to several hours may be desirable in many instances. For the preparation of fibers, the cure can be conducted for a period, for example, as long as five hours, and longer, whereas the cure can be increased to 16 hours, and longer, for the preparation of films. In any event, the cure, if desired, can be varied in duration to obtain the desired and optimum properties in the final product. Conventional solution casting techniques can be employed in making films.

If gelation should occur during the reaction between the prepolymer and the curing compound in the solvent, it is oftentimes desirable to add a small amount of acid to the prepolymer solution preferably before the curing compound is added. By so doing, the storage life of the solution containing the reaction product of prepolymer and curing compound can be increased significantly, for example, from a storage life in some cases of only a few minutes without the acid to a storage life of up to about several days with the acid. The acid is used in small amounts. For instance, from about 0.005, and lower, weight percent to about 0.6 weight percent of acid, and higher, based on the weight of the prepolymer, has been found to be suitable.

Among the acids and acid-forming compounds which are oftentimes useful for the purpose described in the preceding paragraph can be listed the following: phosphoric acid, phosphorous acid, hydrochloric acid, nitric acid, sulfuric acid, benzoyl chloride, benzene sulfonyl chloride, benzenesulfonic acid, dichloroacetic acid, octylphenyl acid phosphate, stearyl acid phosphate, and boron trifluoride-etherate. It is to be noted that the $pK_A'$ of each of the above mention acids is less than about 2.5. (The term "$pK_A'$" refers to the negative of the $\log_{10}$ of the hydrogen ion ionization constant in aqueous solution.) The strong mineral acids which have a $pK_A'$ less than about 2.5 represent a preferred subclass. Phosphoric acid is the preferred species.

The characteristics of the novel fibers and films can be varied over a wide range depending, to a significant degree, on the choice and proportion of the hydroxyl terminated polymers (diol), the diisocyanate source, and bifunctional curing compound, the reaction conditions, etc. The novel fibers and films can range from relatively semi-elastic to highly elastic. A uniqueness which should be stressed is the over-all combination of properties which oftentimes can be obtained such as are exhibited by fibers prepared via the reaction of, for example, lactone polyester diol, bis(2-isocyanatoethyl) cyclohex-4-ene-1,2-dicarboxylate (CEDI), and piperazine. Such properties include tensile strength, elongation, modulus, stress decay, work recovery, tension set, stability in the fadeometer test, etc. The molecular weights of the resulting novel elastomeric fibers and films are somewhat difficult to ascertain with exactness. Nevertheless, they are sufficiently high enough so that significant semi-elastic and elastic properties in the film- and fiber-forming ranges result.

The novel elastic and semi-elastic polymers are highly useful compositions. For instance, in the form of fibers, the polymers can be used to make foundation garments, bathing suits, sporting clothes, elastic waist bands, hose, and the like. In the form of films, the polymers can be employed as elastic sheeting, as "rubber bands," and the like.

Another highly significant aspect of the invention is the use of the novel polyisocyanates of Formula I, and/or the novel prepolymers, and/or the novel polyisocyanato-containing polymers as illustrated by Units IV to IV-C, to prepare foams, e.g., polyurethane foams, which can range from the extremely flexible to the highly rigid state. The prepolymers which are contemplated in this aspect are the polyisocyanato-containing reaction products which result from the reaction of polyfunctional compounds which contain two or more active hydrogen substituents as described previously, e.g., diols, triols, tetrols, diamines, triamines, amino alcohols, etc., with the novel diisocyanates of Formula I, and especially Formula II. The proportions of the reactants are such that a sufficient stoichiometric excess of diisocyanates with relation to the polyfunctional compound is employed, i.e., the equivalents of —NCO from the diisocyanate with relation to the equivalents of active hydrogen substituent from the polyfunctional compound is greater than one to thus give non-crosslinked polyisocyanato-containing reaction products (containing at least two —NCO groups) which are soluble in various common organic vehicles, e.g., benzene. Eminently desirable, non-yellowing flexible foams can be prepared via the so-called "one step" method which involves reacting a polyhydroxy compound, preferably one that contains at least three alcoholic hydroxyl groups, with the above-illustrated novel polyisocyanates, especially the novel low molecular weight polymeric aliphatic multiisocyanates, in the presence of a blowing agent such as water, a liquefied gas, and the like. It is desirable to conduct the reaction in the presence of a catalyst and surfactant. The preparation of the flexible foams differs from the preparation of the rigid foams in that it is generally preferred to first prepare what is oftentimes referred to as a "quasi prepolymer," and subsequently add thereto the remainder of the polyhydroxy compound, blowing agent, and other ingredients, if employed, e.g., catalyst, surfactant, etc.

A wide scope of polyhydroxy compounds can be employed in the preparation of the novel foams. The preferred polyhydroxy compounds are those which contain three or more hydroxy groups. Illustrative polyhydroxy compounds include the following classes of compounds (as well as those illustrated previously in this specification):

(a) The polyhydroxy initiated lactone polyesters, and the alkylene oxide adducts thereof;

(b) The polyester polyols (including the polyester diols), and the alkylene oxide adducts thereof;

(c) The polyhydroxyalkanes and polyhydroxycycloalkanes, and the alkylene oxide adducts thereof;

(d) The trialkanolamines, and the alkylene oxide adducts thereof;

(e) The polyols derived from polyamines by the addition of alkylene oxide thereto;

(f) The non-reducing sugars and sugar derivatives, and the alkylene oxide adducts thereof;

(g) The alkylene oxide adducts of aromatic amine/phenol/aldehyde ternary condensation products;

(h) The alkylene oxide adducts of phosphorus and polyphosphorus acids, and various hydroxyl-terminated phosphites and phosphonates;

(i) The alkylene oxide adducts of polyphenols;

(j) The polytetramethylene glycols;

(k) The functional glycerides, such as castor oil;

(l) The polyhydroxyl-containing vinyl polymers; and the like.

The "preferred alkylene oxides" which term will be employed hereinafter include ethylene oxide, 1,2-epoxypropane, 1,2-epoxybutane, 2,3-epoxybutane, isobutylene oxide, epichlorohydrin, and mixtures thereof.

Illustrative polyhydroxyalkanes and polyhydroxycycloalkanes include, among others, ethylene glycol, propylene glycol, 1,3-dihydroxypropane, 1,3-dihydroxybutane, 1,4-dihydroxybutane, 1,4-, and 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6,-trihydroxyhexane, 1,1,1-trimethylolethane, 1,1,1-trimethylolpropane, pentaerythritol, xylitol, arabitol, sorbitol, mannitol, and the preferred alkylene oxide adducts thereof.

Exemplary trialkanolamines include triethanolamine, triisopropanolamine, and the tributanolamines, and the preferred alkylene oxide adducts thereof.

Among the alkylene oxide adducts of polyamines can be listed the adducts of the preferred alkylene oxide with ethylenediamine, diethylenetriamine, triethylenetetramine, 1,3-butanediamine, 1,3 - propanediamine, 1,4 - butanediamine, 1,2-, 1,3-, 1,4-, 1,5-, and 1,6-hexanediamine, phenlyenediamines, toluenediamine, naphthalendiamines, and the like. Illustrative of the resulting adducts which are of particular interest include N,N,N',N'-tetrakis(2-hydroxyethyl)ethylenediamine, N,N,N',N' - tetrakis(2 - hydroxypropyl)ethylenediamine, N,N,N',N',N" - pentakis(2-hydroxypropyl)diethylenetriamine, phenyldiisopropanolamine, and the like. Others which deserve particular mention are the preferred alkylene adducts of aniline/formaldehyde or substituted-aniline/formaldehyde condensation products.

Illustrative of the non-reducing sugars and sugar derivatives contemplated are sucrose; the alkyl glycosides such as methyl glucoside, ethyl glucoside, and the like; the polyol glycosides such as ethylene glycol glucoside, propylene glycol glucoside, glycerol glucoside, 1,2,6-hexanetriol glucoside, and the like; and the preferred alkylene oxide adducts thereof.

Preferred alkylene oxide adducts of polyphenols include those in which the polyphenol can be bisphenol A; bisphenol F; the condensation products of phenol and formaldehyde, more particularly the novolac resins; the condensation products of various phenolic compounds and acrolein, the simplest members of this class being the 1,1,3-tris(hydroxyphenyl)propanes; the condensation products of various phenolic compounds and glyoxal, glutaraldehyde, and other dialdehydes, the simplest members of this class being the 1,1,2,2-tetrakis(hydroxyphenyl)-ethanes, and the like.

Another suitable class of polyhydroxy compounds include the preferred alkylene oxide adducts of aromatic amine/phenol/aldehyde ternary condensation products. The ternary condensation products are prepared by condensing an aromatic amine, for instance, aniline, toluidine, or the like; a phenol such as phenol, cresol, or the like; and an aldehyde preferably formaldehyde; at elevated temperatures in the range of, for example, from about 60° C. to 180° C. The condensation products are then recovered and reacted with said preferred alkylene oxide, using a basic catalyst (e.g., potassium hydroxide), if desired, to produce the polyols. The propylene oxide and mixed propylene-ethylene oxides adducts of aniline/phenol/formaldehyde ternary condensation products deserve particular mention.

The preferred alkylene oxide adducts of phosphorus and polyphosphorus acids are another useful class of polyols. Phosphoric acid, phosphorous acid, the polyphosphoric acids such as tripolyphosphoric acid, and the like, are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydroxyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol [for instance, 2,2-bis(4-hydroxyphenyl)-propane] with epichlorohydrin in the presence of sodium hydroxide, such as the polymers disclosed in U.S. Pat. No. 2,602,075.

The polyhydroxy compound, including mixtures thereof, employed in the foam formulation can have hydroxyl numbers which vary over a wide range. In general, the hydroxyl numbers of these polyols can range from about 20, and lower, to about 1000, and higher, preferably from about 30 to about 600, and more preferably from about 35 to about 450.

The functionality and the hydroxyl number of the polyhydroxy compound are significant factors which enter into consideration in the preparation of foams. Thus, the polyol preferably possesses a hydroxyl number of from about 200 to about 800 when employed in rigid foam formulations, from about 50 to about 250 for semi-flexible foams, and from about 20 to about 70, or more, when employed in flexible foam formulations. Such limits are not intended to be restrictive, but are merely illustrative of the large number of possible combinations.

In general, it is desirable to employ at least about one —NCO equivalent (group) per hydroxyl equivalent (group) in the preparation of the urethane foamed product. As a practical matter, a slight excess of —NCO equivalents with relation to the hydroxyl equivalents if often times employed. For optimum properties, those skilled in the art can readily determine the desired concentration of the reactants. Factors which will influence the concentration are the choice and functionality of the reactants, the end product—whether flexible or rigid, the choice of the blowing agent, the use of a catalyst and/or surfactant, and other considerations.

As indicated previously, various blowing agents such as water and halogenated hydrocarbons can be employed in the preparation of the foams. The preferred blowing agents are water and certain halogen-substituted aliphatic hydrocarbons which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1 - dichloro - 1 - fluoroethane, 1,1 - difluoro - 1,2,2 - trichloroethane, chloropentafluoroethane, 1-chloro-1-fluoroethane, 1-chloro-2-fluoroethane, 1,1,2-trichloro-1,2,2-trifluoroethane, 1,1,1 - trichloro - 2,2,2-trifluoroethane, 2 - chloro-1,1,1,2,3,3,4,4,4-nonafluorobutane, hexafluorocyclobutane, and octafluorocyclobutane. Other useful blowing agents include low-boiling hydrocarbons such as butane, pentane, hexane, cyclohexane, and the like. Many other compounds easily volatilized by the exotherm of the isocyanato-hydroxyl reaction also can be employed. A further class of blowing agents includes thermally-unstable compounds which liberate gases upon heating, such as N,N'-dimethyl-dinitrosoterephthalamide.

The amount of blowing agent used will vary with the density desired in the foamed product. In general, it may be stated that for 100 grams of reaction mixture containing an average isocyanato/reactive hydrogen ratio of about 1:1, about 0.005 to 0.3 mol of gas are used to provide densities ranging from 30 to 1 pounds per cubic foot, respectively.

In producing foamed reaction products, it is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymers and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers, such as those described in U.S. 2,846,458. This class of compounds differs from the above-mentioned polysiloxane - polyol - oxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicon oil, polyethoxylated vegetable oils commercially available as "Selectrofoam 6903," Emulphor EL-720," and others. Although the use of an emulsifier is desirable to influence the type of foam structure that is formed, the foam products of the invention can be prepared without emulsifiers in some cases.

The use of catalysts is generally desirable in the preparation of the novel foamed compositions. Among the catalysts which are contemplated include the tertiary amines, the phosphines, the organic metal compounds, and mixtures thereof, discussed supra with regard to the catalysts of the isocyanato/active hydrogen reactions. It is extremely advantageous to employ a combination of the tertiary amine compound and the organic tin compound as catalysts in the foam formulation. The catalyst is used in catalytically significant quantities. For instance, concentrations in the range of from about 0.001 weight percent, and lower, to about 2 weight percent, and higher, based on the total foam ingredients, have been found useful.

The techniques for producing polyurethane foams by the one shot, prepolymer, or semi-prepolymer methods are well known in the art, as is exemplified by the Saunders, et al. text, cited above.

In some cases it is desirable to add a small quantity, e.g., up to 5 parts per 100 parts by weight of polyol, of a dipolar aprotic solvent such as formamide, N,N-dimethyl-formamide, or dimethyl sulfoxide to the foaming formulation. This serves to "open up" the cell structure when there is an undesired tendency to form closed-cell foams.

A particularly useful embodiment is directed to the preparation of so-called "vinyl foams." In this embodiment, an ethylenically unsaturated organic compound plus a catalytically effective amount of a vinyl polymerization catalyst, if desired, both of which have been illustrated previously, e.g., ethylene, vinyl chloride, benzoyl peroxide, etc., can be employed in the foam formulations and techniques described above. If desired, an ethylenically unsaturated polyol can be used which polyol can serve as the reactant in both the vinyl polymerization and the isocyanate condensation polymerization reactions. This embodiment opens up a new avenue in the preparation of polyurethane products, that is, "vinyl foams." Various commercial advantages are apparent in that the vinyl foam can be "tailor-made" by regulating the vinyl and isocyanate serving ingredients of the foam formulation. The formulation, also, can be made more fluid by the incorporation therein of mobile vinyl monomers such as styrene which, incidentally, lend to decreasing the cost of the formulation.

A further aspect of the invention is directed to the preparation of novel laminates and/or reinforced plastic materials which exhibit outstanding and extraordinary characteristics. The novel laminates and reinforced plastic materials exhibit high impact resistance, superior weathering properties, good dye receptivity, etc. Moreover, the novel laminates, in many respects, exhibit superior properties at elevated temperatures than those prepared from conventional polyesters. Though reinforced plastics prepared from such conventional polyesters enjoy commercial success, the use of polyurethane and/or polyurea systems in the subject field represents relatively new technology that does not appear to have been successfully commercialized to any noticeable extent.

The most common reinforcing material is glass, generally in the form of chopped fibers or as a woven glass cloth. The invention pertains, also, to other reinforcing material which are set forth in the well documented polyester laminating art. In general, a glass fiber or mat is placed in the reinforcing formulation explained hereinafter in such a manner as to essentially eliminate all trapped gases. The glass mat is often placed layer upon layer whereas the glass fiber can be dispersed in a predetermined set pattern, if desired. The formulation then can be cured in a heated mold, generally at superatmospheric pressure.

The reinforcing formulation can comprise (1) the novel polyisocyanates illustrated in Formula I, Unit IV through IV–C, Formula X and/or Formula XII, (2) a polyfunctional active hydrogen compound (especially those which contain at least two groups from the class of hydroxyl, primary amino, and secondary amino, or mixture of such groups), with/without (3) an ethylenically unsaturated organic compound, and if desired (4) a vinyl polymerization catalyst, as illustrated previously. The proportions of the ingredients are such that the formulation will result in a crosslinked resin under the curing conditions. The conditions and techniques employed in the conventional polyester laminating art are translatable in this respect. The above ingredients as well as the proportions of the ingredients have been illustrated throughout the specification.

The reinforcing formulation offers an additional advantage in that the ethylenically unsaturated organic compound, if employed, becomes a chemical part of the cured system during the vinyl polymerization and cure, instead of being simply a homopolymeric "filler" as is the case in various conventional polyester systems.

The afore-described novel reinforcing formulation is, of course, useful per se, that is, without the incorporation of the filler such as glass, stone, cork, carbon black, lamp black, sand, titanium dioxide, metal turnings, ceramic, various colored pigments, and a host of other essentially inert material. Curing the reinforcing formulation results in novel urea and/or urethane products. When employing an ethylenically unsaturated organic compound the products can be termed "poly(vinyl urethanes)" or "poly(vinyl ureas)" which terms include the "copoly(vinyl urethanes)" and the "copoly(vinyl ureas)." These products (depending upon whether or not and what kind of filler is employed) can be used as sealants, gaskets, O-ring, floor and wall tile, ceramic facing on the exterior of buildings, etc. They can be machined, molded, extruded, fabricated, etc., into various shapes depending upon the type of ingredients employed. As discussed previously, the use of a blowing agent would result in the production of a "vinyl foam." The curing of the novel "reinforcing formulation" can be conducted over a wide temperature range. Thus, dual polymerization can be effected, i.e., isocyanato/active hydrogen polymerization and vinyl polymerization, by employing the operative conditions noted in the discussions re the active hydrogen and vinyl polymerization sections supra. The ratio of the NCO/active hydrogen can be varied as discussed previously in the NCO/active hydrogen section. The ratio of ethylenic bonds from the isocyanate source to ethylenic bonds from the ethylenically unsaturated organic compound can be varied over an extremely wide range, e.g., from 1:99 to 99:1.

Another aspect of the invention is directed to the preparation of novel adhesive formulations which exhibit superior bond strength, no discernible "creeping," etc. These adhesive formulations can be used to bond metal to metal surfaces, fiber to rubber surfaces (such as in tire cords), cellulosic (such as wood) to cellulosic surfaces, cellulosic to metal surfaces, cellulosic to rubber surfaces, and others.

Chemically speaking, the novel adhesive formulations can comprise the novel polyisocyanates, e.g., the polyisocyanates exemplified by Formulas I or II, Unit IV through IV–C, Formula X, and/or Formula XII, with/without synthetic or natural rubber admixed therewith. Useful modifications of novel adhesive formulations are those which contain any of the novel ethylenically unsaturated polyisocyanates described supra, an ethylenically unsaturated organic compound, with/without a vinyl polymerization catalyst, with/without synthetic or natural rubber. Further desirable novel adhesive formulations comprise the novel blocked products illustrated by Formulas VI and/or VI–A and/or Units VIII through VIII–C supra with/without an ethylenically unsaturated organic compound with/without a vinyl polymerization catalyst.

In general, it should be noted that practically all of the novel aspects or embodiments described herein can be employed as adhesives when properly applied. The application of adhesive formulations is adequately covered in the literature; however, illustrative general procedures are as follows: (1) a solution compising the novel polyisocyanate with/without rubber in an inert normally-liquid organic vehicle is coated on the metal, fabric, wood, etc. surface. Curing is then effected at room temperature. (2) A solution comprising the prepolymers polyisocyanato polymeric products, etc. in an inert normaly-liquid organic vehicle is applied to the surface to be bonded and then exposed to air for several minutes, e.g., 10 to 15 minutes. The vehicle thus evaporates and moisture from the air initiates the cure. The surfaces then are joined under moderate pressure and cured at room temperature or temperatures up to 200° C. (3) A solution comprising the novel polyisocyantes and/or the novel "partially block" or essentially completely "blocked" polyisocyanates contained in an inert normally liquid organic vehicle are supplied to the surface(s) to be bonded. The solvent is allowed to evaporate to form a slight tacky surface. Thereafter the cure is effected under pressure and/or elevated temperatures.

Extremely useful aspects of the invention are directed to the preparation of novel coatings. Such coatings include the one package moisture cure, the two package heat cure, the blocked isocyanates, and isocyanate modified drying oils.

In the one package moisture cure, there is dissolved in an inert normally-liquid organic vehicle a novel polyisocyanate such as illustrated by Formula I, Units IV through IV–C, Formula X, and/or Formula XII. The resulting solution then is painted on the substrate to be coated. Curing is effected by reaction of the isocyanate group with moisture from the air to form urea linkages. The carbon dioxide which is formed is diffused through the thin coating. The coating can be either tightly or loosely crosslinked, depending on the mechanical properties desired. The quantity of polyisocyanate in the vehicle is readily controlled by the formulator. A prepolymer system is preferred. As initiated above, the mould polyisocyanates of Formulas I, X, and/or XII can be used "as is," or they may be reacted with ethlenically unsaturated organic compounds beforehand (note Units IV through IV–C), or in situ, that is, during the coating preparation to form "poly(vinyl isocyanates)."

In the two-package heat cure, the novel polyisocyanates described throughout this specification are reacted, either in an inert normally-liquid organic vehicle or neat, with a poly-functional compound which preferably contains hydroxyl, primary amino, and/or secondary amino groups. The polyfunctional compounds which contain at least two hydroxyl groups are preferred. Such compounds encompass, for example, the polyols exemplified previously including the initiated lactone polyester polyols, the polyester polyols, the polyoxyalkylated polyols, the polyether polyols, the alklene polyols, castor oil, etc. The ratio of NCO/active hydrogen is generally about one, although it can be greater than or less than one, e.g., about 0.8 and lower, to about 1.2, and higher. When the NCO/active hydrogen ration is greater than one, the excess NCO reacts, especially at elevated temperatures, or in the presence of a catalyst such as dibutyltin dilaurate, with the urethane or urea groups in the molecule to form allophanate or biuret groups, respectively. The characteristics of the ultimate coating or film depend, to a significant degree, on (1) the ratio of NCO/OH, (2) the cure temperature, (3) the use of catalysts, if any, (4) the characteristics of the polyisocyanate source and the polyfunctional compound, e.g., molecular weight, functionality, etc., (5) the quantity of urethane and urea groups in the polymer chain as well as the distribution of said groups, and the like.

The two package heat cure systems get their name from the obvious fact that the art employs two packages. Thus, one package can comprise the polyisocyanate source, such as the novel prepolymers, generally contained in an inert normally liquid organic vehicle, whereas the second package can contain, for example, the polyol source in the inert vehicle. Either package could contain other ingredients such as catalysts, etc. Any of the novel polyisocyanates described previously can be employed in the two package coating systems. The polyfunctional compounds, especially the preferred polyhydroxy compounds, have been adequately illustrated supra. In addition, ethylenically unsaturated organic compounds can be employed. In such cases, the vinyl polymerization can be effected during the isocyanato/active hydrogen reaction or cure. Alternatively, the vinyl polymerization can be conducted first, followed by reacting the resultant poly(vinyl isocyanate) with the polyfunctional compounds. Of course, typical vinyl polymerization catalysts are employed, if desired.

In the so-called "blocked isocyanate" systems, a "blocked isocyanate" as illustrated previously, is admixed with a polyfunctional compound as illustrated in the two package system to form a solution which is stable at room temperature or slightly higher than room temperature. At elevated temperatures, e.g., about 165° C., the blocked isocyanate can be visualized as "unblocking" itself and reacting with the polyfunctional compound to thus form the coating.

The novel polyisocyanates are extremely valuable in the preparation of oil-modified polyurethanes. These systems can be prepared by reacting the novel polyisocyanates, e.g., CEDI, with hydroxyl-containing drying oil derivatives or esters. The hydroxyl bearing compounds which contain at least one drying oil moiety (an ethylenically unsaturated fatty acid group sans the carboxyl hydrogen) can be prepared via several routes, e.g., alcoholysis, transesterification, direct esterification, etc. For instance, the transesterification of an ethylenically unsaturated glyceride with a polyol such as those illustrated previously, e.g., glycerol, 1,2,6-hexanetriol, pentaerythritol, erythritol, 1,2,4-butanetriol, sorbitol, etc., will result in a mixture of hydroxy esters. Of course, the glyceride/polyol ratio will realistically control the average number of hydroxyl groups per molecule in the resulting mixed hydroxy esters. A base, e.g., NaOH, is oftentimes used to catalyze the transesterification reaction. The mixed hydroxy esters, i.e., the hydroxy containing oil derivatives, are neutralized with a base, e.g., NaOH, prior to reaction with the novel polyisocyanates. Another route involves the direct esterification of an ethylenically unsaturated monocarboxylic acid especially those derived from natural sources with a polyol as exemplified previously. Again the proportions are such that a compound containing both hydroxyl group(s) and drying oil group(s) will result.

In general, the oil-modified polyurethanes (known also as urethane oils) are prepared by employing an NCO/OH ratio of about one, or lower. Of course, an NCO/OH ratio greater than one results in an urethane-ester drying oil which contains isocyanato groups as well as drying oil groups. The urethane-ester drying oil can be moisture-cured through the isocyanato group(s) and/or cured with well known metal driers such as the lead, manganese, and cobalt naphthenates. It is preferred that the NCO/OH ratio be about one, or slightly lower. Apparently, the final cure centers about an oxidative mechanism or polymerization which involves the double bond(s) or the methylene group(s) adjacent to the double bond(s) of the dry oil fatty acid moiety.

The operative conditions for the preparation of the oil-modified polyurethanes as well as the numerous driers that can be employed are well documented in the literature. The arithmetical calculations involved in the determination of the aforesaid proportions are readily apparent to the routineer having ordinary skill in this art. The oil-modified urethane, contained as a solution in an inert normally liquid organic vehicle as illustrated previously, generally with a catalyst such as the well known metallic driers included therein, is applied as the coating to the surface.

Illustrative of the ethylenically unsaturated aliphatic monocarboxylic acids which can be employed include, for example, oleic acid, linoleic acid, licanic acid, ricinoleic acid, hexenoic acid, hexadienoic acid, octenoic acid. Acids derived from natural sources such as, for example, castor oil, dehydrated castor oil, coconut oil, cottonseed oil, oiticica oil, perilla oil, olive oil, safflower oil, sardine oil, soyabean oil, tall oil, linseed oil, sunflower seed oil, walnut oil, menhaden oil, poppyseed oil, tung oil, and mixtures thereof, are advantageous both from an economy standpoint and since highly useful oil modified polyurethanes result therefrom. Illustrative esters would include the esters of the preceding exemplified acids especially the glycerides of the same. Additional fatty acids and fatty oils which are contemplated are set forth in the text "Encyclopedia of Chemical Technology," Kirk-Othmer, vol. 6, pages 140–298 (1951), The Interscience Encyclopedia, Inc., New York, N.Y., the appropriate portions of said text being incorporated into this specification.

In various aspects, the novel polyisocyanate compounds as well as the novel "blocked isocyanates" and the "partially blocked isocyanates" with/without active hydrogen-containing compounds can be employed to treat textiles. Such treatment imparts to the treated textile a host of desirable characteristics among which the following should be noted: (1) water repellency, (2) improve wet strength, (3) reduce shrinkage, (4) improve dye-receptivity, (5) induce flame-proofing, (6) modification of cellulose and cellulosic derivatives (a) to improve water resistance, and (b) to raise softening point, and/or (7) improve resistance.

Two methods can be employed in the treatment of textiles, namely the so-called "emulsion" treatment and the "solution" treatment. In the "emulsion" method, the isocyanate-containing compound, an emulsifier, and water are mixed to form an emulsion. The textile to be treated is immersed in this emulsion, excess emulsion is then squeezed out, and the treated textile cured at elevated temperatures. In the "solution" method the textile is immersed in a solution of the isocyanate containing compound in an inert normally liquid organic vehicle, e.g., toluene, followed by air drying and curing at elevated temperatures, e.g., about 100° to 150° C. If it is desired to use an active hydrogen compound, the textile is usually impregnated with said compound prior to immersion in the isocyanate-containing bath. In the case of monomeric isocyanates such as those exemplified by Formula I supra, the "solution" method is preferred. Flame proofing of the textile fabric can be induced through the use of the novel polyisocyanates and hydroxyl-containing phosphorus compound.

Improvement of abrasion resistance can be accomplished by the use of novel "blocked isocyanates" supra. The textile (e.g., fabric or yarn) to be treated is dipped into an inert solution containing the "blocked isocyanate" which can be maintained, for example, at temperatures in excess of unblocking temperature. The unblocked isocyanate then reacts with active hydrogen-containing material within the fabric or yarn, or else an active hydrogen-containing material can be included in the solution and the unblocked isocyanate reacts with it to form a coating. Of course, the novel polyisocyanates with/without an active hydrogen compound contained in an inert normally-liquid organic vehicle can be employed in this respect.

Various terms, abbreviations, designations, properties, etc., used in this specification are explained hereinbelow:

CEDI represents bis(2-isocyanatoethyl) cyclohex-4-ene-1,2-dicarboxylate.
MOCA represents 4,4'-methylene-bis(2-chloroaniline).
$BF_3$-MEA represents boron trifluoride-monoethanolamine complex.
TDI represents an 80/20 mixture (by weight) of 2,4- and 2,6-tolylenediisocyanate.
DMF represents N,N-dimethylformamide.
EDA represents ethylenediamine.
Shore D hardness Shore A–2 hardness—Determined according to ASTM D1706–59T. Instruments were Shore Durometers D and A–2.
Impact Resistance was determined by the Gardner Bump Test Method.

The Gardner Bump Tester consists of a weight which can be dropped onto a plunger from a measured height. The plunger rest on the material to be tested—the test sample being placed over a circular opening.

Samples were tested at about 26° C. and were generally ¼" in thickness. The test was repeated, at a different point on the sample each time, until the sample either cracked, broke into pieces, or the limits of the weights were attained.

Impact resistance was calculated by multiplying the weight by the distance dropped and recorded in "inch pounds."

Stiffness modulus.—A secant modulus measure determined in the following manner. A sample in an Instron at 26° C. is extended to one percent of its original length at 0.1 inch/min. for 1 inch gauge length. The stress in p.s.i. necessary to extend the sample one percent is determined and the Stiffness Modulus determined by dividing this stress in p.s.i. by 0.01, to wit:

$$\frac{\text{P.s.i. at 1\% extension}}{0.01} = \text{Stiffness modulus, p.s.i.}$$

In reporting the physical properties of coatings prepared from the olefinically unsaturated ester isocyanates and various drying oils certain terms and tests were employed. These terms and tests are defined as follows:

ASTM method.—American Society for Testing Materials.

Diene value.—A measure of the degree of conjugation of unsaturated linkages in drying oils expressed in terms of the number of centigrams of iodine equivalent to the maleic anhydride used per gram of sample. Determined in accordance with the Method of Test for Maleic Diene Value of Drying Oils (ASTM D–1961–61).

Sward hardness.—A measure of the hardness of coatings. Determined in accordance with the procedure disclosed on page 432 of "Physical and Chemical Examination of Paints, Varnishes, Lacquers and Colors," Gardner-Sward 12th Edition, 1962.

The sole figure represents stress-strain curves which were obtained in the following manner:

(a) ASTM D–412–62t die C tensile dog bones, bench marked for one inch gauge lengths, were extended at an Instrom crosshead rate of 20 inches per minute to a strain of 300 percent (as measured by the relative displacement of the bench marks); the loading portion of the loading-unloading cycle is indicated by line o–a in the figure.

(b) The samples were held at 300 percent elongation for 1 minute, during this time stress due to extension "decays" as bonds between molecules breakdown and the molecular chains orient themselves in the direction of extension, this phenomenon is indicated by the line a–b.

(c) The crosshead of the tensile tester was returned to its original position at a rate of 20 inches per minute, note that the stress response of the samples to extension becomes zero before the specimen returns to the state of zero elongation (line b–c).

(d) After allowing one minute for the samples to "recover" they were strained at a rate of 20 inches per minute to rupture (line e–f). This measures tensile strength.

"Stress decay" is defined as the absolute decrease in stress (Δσ) divided by the original stress at point (a). This ratio is most often expressed as a percentage. Stress decay and creep, extension of a sample with time when subjected to a constant load, are functionally related. A material exhibiting a large amount of stress decay will also exhibit a large amount of creep. A girdle made from yarn exhibiting a large amount of creep would expand with time upon wearing and provide less and less support as the period of wearing increased.

The areas encompassed by the points *oad* and *cbd* are proportional, respectively, to the work done on the sample when extending it and the work given back by the sample when it is released. The ratio of the work returned by the sample to the work done on the sample is defined as "work recovery." This parameter is a measure of how "snappy" the material is. High work recovery values are associated with materials of high snap.

"Tension set" is the amount of permanent increase in length due to holding a specimen at an elongation of 400 percent for 16 hours at 21° C. The strain level (400%) and the amount of permanent increase in length are determined by the relative displacement of gauge marks initially placed 1 inch apart. Tension set is measured 10 minutes after the strained sample is released.

Fadeometer test.—Light source is a violet Carbon Arc Lamp which produces a spectrum from 270mμ through 2000 mμ. Sample is rotated in the presence of said light source at 63° C. and 35 percent relative humidity. Exposed sample is compared with unexposed sample.

Standard amine analysis for isocyanate.—The isocyanato-containing compound to be analyzed is weighed into a measured amount (excess) of di-n-butylamine solution in dry toluene (in solution), and allowed to stand for 30 minutes at about 26° C. with occasional swirling. Isopropanol then is added and the excess amine is titrated with standard HCl to the bromophenol blue end point.

Hydroxyl number.—The minimum number of milligrams of KOH that is required to neutralize the acid which is generated by the reaction of one gram of the hydroxyl-containing compound with anhydride, e.g., acetic anhydride, or its halide. The following equation illustrates the foregoing:

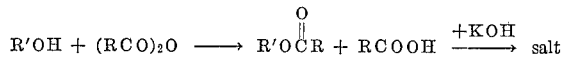

The hydroxyl number is also determined by the following equation:

$$OH = \frac{56.1 \times 1000 \times F}{M.W.}$$

wherein OH is the hydroxyl number, wherein F is the functionality, i.e., number of hydroxyl groups, of the hydroxyl-containing compound, and wherein M.W. is the molecular weight of the hydroxyl-containing compound.

EXAMPLE 1

(A) A mixture containing 97 grams (1.0 mol) of monoethanolamine, 49 grams (0.5 mol) of maleic anhydride in 436 grams of xylene was maintained at refux temperature, i.e. about 138° C., while anhydrous hydrogen chloride was sparged through the mixture at a rate of 0.6 mol of hydrogen chloride per mol of anhydride per hour and by-product water was removed overhead. The theoretical quantity of water (9.0 cubic centimeters) was collected over a period of 15 hours and the residue product, bis(2-aminoethyl) fumarate dihydrochloride, was isolated by filtration, washed with ether and methanol, and finally dried. 46 grams of the refined product was obtained which represented a 33 percent yield of the theoretical value. The bis(2-aminoethyl) fumarate dihydrochloride had a melting point of 197° C. and exhibited an infrared spectrum in agreement with that of the assigned structure.

Upon basification of the bis(2-aminoethyl) fumarate dihydrochloride, the free ester diamine is obtained.

(B) In an analogous manner as above, when isopropanolamine (1 mol) is employed in lieu of monoethanolamine, there is obtained bis(2-amino-1-methylethyl) fumarate dihydrochloride.

EXAMPLE 2

(A) Phosgene was sparged through a slurry of 1067 grams (3.7 mols) of bis(2-aminoethyl) fumarate dihydrochloride in 9962 grams of ortho-dichlorobenzene at a rate of one mole per hour per mol of hydrochloride for a period of six hours. The temperature of the mixture was maintained at 140°–160° C. throughout the addition of the phosgene. Thereafter, the ortho-dichlorobenzene solvent was removed by distillation from the resultant clear solution and 937 grams of crude residue product, which represented 99 percent of the theoretical value, was further refined by distillation. 800 grams of refined bis(2-isocyanatoethyl) fumarate was recovered which represented 85 percent of the theoretical value. The product had a boiling point of 147° C. at a pressure of 0.05 millimeter of mercury. Upon analysis the product had the following properties:

Calcd. for $C_{10}H_{10}O_6N_2$ (percent): C, 47.25; H, 3.94. Found (percent) C, 46.84; H, 4.07. Infrared spectrum was in agreement with that of the assigned structure with absorption maxima at 2.87μ (overtone of 5.85μC=O), 3.25μ(=CH—), 4.4μ(N=C=O), 5.85μ (ester C=O), 6.08μ(C=C), and 7.85μ and 8.05μ (ester C=O).

(B) In an analogous manner as above, when bis(2-amino-1-methylethyl) fumarate dihydrochloride is employed in lieu of bis(2-aminoethyl) fumarate dihydrochloride, there is obtained bis(2-isocyanota-1-methylethyl) fumarate,

EXAMPLE 3

(A) To a 1-liter stainless steel rocker bomb was charged a mixture of 102 grams of bis(2-isocyanatoethyl) fumarate, 285 grams of a 50 percent solution of chloroprene in xylene and 100 grams of xylene. The charge was heated at 150° C. for 4 hours, a pressure of 10 pounds per square inch gauge being developed in the bomb. Following stripping of the solvent and by-products to a kettle temperature of 140° C. at 1 millimeter of mercury pressure, the residue was evaporatively distilled through a falling-film evaporator operated at a temperature of 200° C. and a pressure of 0.05 millimeter of mercury. The distillate (1653 grams) was subsequently purified by distallation through a goose-neck still-head at 0.15 millimeter of mercury pressure. The fraction boiling from 177–185° C. amounted to 92 grams (69.3 percent yield) and analyzed for a purity of 95.4 percent by isocyanate equivalent. Redistillation of this fraction afforded a yellow, mobile liquid having a boiling point of 178° C. at a pressure of 0.15 millimeter of mercury and a Refractive index, n30/D, 1.5000. Upon analysis the product, i.e., bis(2-isocyanatoethyl) 4-chlorocyclohex-4-ene-1,2-dicarboxylate, had the following composition:

Calcd. for $C_{14}H_{15}N_2O_6Cl$ (percent): C, 48.91; H, 4.37; N, 8.15; Cl, 10.34. Found (percent): C, 49.27; H, 4.43; N, 8.18; Cl, 10.82. Reaction of the product with n-butylamine in ether solution gave a white solid derivative which, after two recrytallizations from ethyl acetate, had a meltiang point of 116–17° C. Upon analysis the derivative had the following composition:

Calcd. for $C_{22}H_{37}N_4O_6Cl$ (percent): C, 54.00; H, 7.57; N, 11.45; Cl, 7.26. Found (percent): C, 53.98; H, 7.66; N, 11.21; Cl, 6.90.

(B) In analogous manner as above, when 1,3-octadiene is employed in lieu of chloroprene, there is obtained bis(2-isocyanatoethyl) 3-n-butylcyclohex-4-ene-1,2-dicarboxylate (C) In an analgous manner as above, when bis(2-isocyanato-1-methylethyl) fumarate is used in lieu of bis(2-isocyanatoethyl) fumarate, there is obtained bis (2 - isocyanato-1-methylethyl) 4-chlorocyclohex-4-ene-1, 2-dicarboxylate.

EXAMPLE 4

(A) To a 1000 cubic centimeter capacity stainless-steel rocker-type autoclave was charged a mixture of 140 grams of bis(2-isocyanatoethyl) fumarate, 94 grams of 1,3-butadiene, and 200 milliliters of commercial xylene (mixed isomers). The autoclave temperature was raised rapidly to 150° C. and maintained at this temperature for a period of 5 hours, rocking action being maintained throughout. Following completion of the heating period, the solvent was removed by distillation at a pressure of 50 millimeters of mercury and the residue was subsequently stripepd to a kettle temperature of 110° C. at a pressure of 1 millimeter of mercury. Evaporative distillation of the kettle residue through a falling-film evaporator operated at 190° C. at a pressure of 0.1 millimeter of mercury afforded 132 grams of straw-colored, liquid product. Subsequent refining by vacuum distillation furnished 122 grams of bis(2-isocyanatoethyl) 4-cylohexene-1,2-dicarboxylate which represented 72.0 percent of the theoretical yield of a colorless, odorless liquid having a boiling point of 146°–151° C. at a pressure of 0.12 millimeter of mercury and a refractive index, $n30/D$ 1.4864. The infrared spectrum revealed bands at $3.25\mu$ (=CH—), $4.45\mu$ (—NCO), $5.8\mu$ (ester C=O), $6.06\mu$ (aliphatic C=C), 8.0 and $8.53\mu$ (ester C—O), and $15.2\mu$ (cis-RCH=CHR).

(B) In an analogous manner as above, when bis(10-isocyanatodecyl) fumarate is employed in lieu of bis(2-isocyanatoethyl) fumarate, there is obtained bis(10-isocyanatodecyl) 4-cyclohexene-1,2-dicarboxylate.

(C) In an analoguous manner as above, when bis(4-isocyanatophenyl) fumarate is employed in lieu of bis (2-isocyanatoethyl) fumarate, there is obtained bis(4-isocyanatophenyl) 4-cyclohexene-1,2-dicarboxylate.

(D) In an analogous manner as above, when bis(3-isocyanatopropyl) 1,6-hex-3-enediotate is employed in lieu of bis(2-isocyanatoethyl) fumarate, there is obtained bis(3 - isocyanatooxycarbonylmethyl) 1,2-cyclohex-4-ene.

EXAMPLE 5

(A) To a 1000 cubic centimeter stainless-steel rocker-type autoclave was charged a mixture of 127 grams of bis(2-isocyanatoethyl) fumarate, 136 grams of isoprene and 200 milliliters of commercial xylene (mixed isomers). The autoclave temperature was raised rapidly to 150° C. and maintained at this temperature for a period of 5 hours, rocking action being maintained throughout. Following completion of the heating period, the solvent was removed by distillation at a pressure of 50 millimeters of mercury and the residue was subsequently stripped to a kettle temperature of 110° C. at a pressure of 1 millimeter of mercury affording 141 grams of crude, pale-yellow liquid product which represented 82.4 percent of the theoretical value. Evaporative distillation through a falling-film evaporator operating at 180° C.–195° C., at a pressure of 0.04 millimeter of mercury followed by a refining distillation through a simple still-head produced a water-white liquid in a yield of 75.2 percent. The product i.e., bis(2-isocyanatoethyl) 4-methylcyclohex-4-ene-1,2-dicarboxylate, had a boiling point of 150°–151° C. at a pressure of 0.08 millimeter of mercury and a refractive index, $n340/D$ 1.4856. Upon analysis the product has the following composition:

Calcd. for $C_{15}H_{18}N_2O_6$ (percent): C, 55.90; H, 5.59; N, 8.70. Found (percent): C, 56.57; H, 5.88; N, 8.63. Reaction of the product with n-butylamine produced a crystalline derivative which, following two recrystallizations from ethyl acetate, had a melting point of 101°–103° C. Upon analysis the derivative had the following composition:

Calcd. for $C_{23}H_{40}N_4O_6$ (percent): C, 58.80; H, 8.58; N, 12.02. Found (percent): C, 58.80; H, 8.52; N, 12.19.

(B) In an analogous manner as above, when bis(3-isocyanatocyclohexyl) fumarate is employed in lieu of bis-(2-isocyanatoethyl) fumarate, there is obtained bis(3-isocyanatocyclohexyl) 4 - methylcyclohex - 4 - ene - 1,2-dicarboxylate.

EXAMPLE 6

A mixture of 36 grams of bis(2-isocyanatoethyl) fumarate, 19 grams of 2,3-dimethylbutadiene and 250 milliliters of xylene was heated at 145° C. for 5 hours in a 1-liter stainless steel bomb of the rocker type. Following solvent stripping, the residue was evaporatively distilled at 200° C. and at a pressure of 0.1 millimeter of mercury to afford 38 grams (80.8 percent yield) of water-white mobile liquid. Subsequent refining by vacuum distillation through a gooseneck still head produced, after a small forerun, 26 grams of product boiling at 161° C. at a pressure of 0.07 millimeters of mercury and having a refractive index, $n30/D$ 1.4912. Upon analysis the product, i.e., bis(2-isocyanatoethyl) 4,5-dimethylcyclohex-4-ene-1,2-dicarboxylate, had the following composition:

Calcd. for $C_{16}H_{20}N_2O_6$ (percent): C, 57.14; H, 5.95; N, 8.33. Found (percent): C, 56.75; H, 6.02; N, 8.51. Reaction of this product with n-butylamine gave a crude crystalline solid derivative melting at 126°–130° C. Recrystallization from ethyl acetate raised the melting point to 132° C. Upon analysis the derivative had the following composition:

Calcd. for $C_{24}H_{42}N_4O_6$ (percent): C, 59.75; H, 8.71; N, 11.62. Found (percent): C, 59.72; H, 8.79; N, 11.90.

EXAMPLE 7

One hundred parts by weight of tung oil and 60 parts of bis(2-isocyanatoethyl) fumarate dissolved in 106 parts of dry xylene were mixed in a dry reaction vessel fitted with a stirrer, an inlet tube for dry nitrogen a thermometer and a variable take off distillations head. The mixture was heated under a dry nitrogen atmosphere to 140° C. and the xylene distilled. The temperature was raised to 150–160° C. and heating continued for an additional two hours. At the end of this period the mixture was cooled and 0.1 weight percent of dibutyl tin dilaurate catalyst added. A five mil wet film was cast on a glass plate and a hard, tough, wrinkled film resulted after 10–12 hours.

EXAMPLE 8

To 51 grams of pentaerythritol ester of rosin (Pentalyn A), there was added 100 grams of oiticica oil and 50 grams of xylene. The stirred reaction mixture was heated to 130° C. and 81 grams of bis(2-isocyanatoethyl) fumarate added over a ten minute period. The reaction temperature was increased to 155° C. and heating continued for two hours and fifteen minutes. The reaction solution was diluted with mineral spirits. The product at 70 percent non-volatiles had a viscosity of 300 centipoises. A 3 mil wet film cast with product containing 0.5 weight percent dibutyltin dilaurate and allowed to cure 7 days at room temperature and 50 percent relative humidity, gave a clear mar resistant coating having a Sward Hardness of 48 and a Gardner Impact of greater than 320 inch pounds.

EXAMPLE 9

To 75 grams of Pentalyn A was added 100 grams of oiticica oil. The stirred reaction mixture was heated to 150° C. and 81 grams of bis(2-isocyanatoethyl) fumarate added over a twenty-five minute period. The reaction solution was diluted with 110 grams of xylene and heating continued at 150° C. for an additional thirty minutes. A 4 mil wet film cast with product containing 0.1 weight percent dibutyltin dilaurate and allowed to cure seven days at room temperature and 50 percent relative humidity gave a clear, mar resistant coating having a Sward Hardness of 46 and a Gardner Impact of greater than 320 inch pounds.

EXAMPLE 10

To 100 grams of tung oil was added 50 grams of Pentalyn A. The reaction mixture was heated to 125° C. and 81 grams of bis(2-isocyanatoethyl) fumarate added over a twenty-minute period. The reaction solution was diluted with 50 grams of xylene and heating continued an additional hour and fifteen minutes at 120° C. A 3 mil wet film cast with product containing 0.1 weight percent dibutyltin dilaurate and allowed to cure 7 days at room temperature and 50 percent relative humidity gave a clear, mar resistant coating having a Sward Hardness of 50 and a Gardner Impact of greater than 320 inch pounds.

EXAMPLE 11

To 25 grams of the rosin acid ester of tricyclo-[5.2.1.0$^{2,6}$]decane-3,4,8-triol, there was added 50 grams of oiticica oil and 25 grams of xylene. The reaction mixture was heated to 135° C. and 40 grams of bis(2-isocyanatoethyl) fumarate added over a ten minute period. The reaction temperature was increased to 145° C. and heating continued for 1 hour and 45 minutes. Thereafter the reaction solution was diluted with 30 grams of xylene. A 4 mil wet film cast with product containing 0.5 weight percent dibutyltin dilaurate and allowed to cure seven days at room temperature and 50 percent relative humidity gave a clear mar resistant film having a Sward Hardness of 42 and a Gardner Impact of 7320 inch pounds.

EXAMPLES 12–15

Various drying oils and bis(2-isocyanatoethyl) fumarate dissolved in dry xylene were mixed in a dry reaction vessel and heated under conditions similar to those employed in Example 7. At the end of the heating period the mixture was cooled, 0.1 weight percent dibutyltin dilaurate added, and five mil wet films cast on glass plates and allowed to cure 7 days at room temperature. The drying oils employed, concentrations, and film properties are set forth in Table I below.

EXAMPLE 18

Bis[2′-(2-methyl-1,2,3,6-tetrahydrobenzyloxyformamido) ethyl] 4-cyclohexene-1,2-dicarboxylate To 284 grams of 2-methyl-1,2,3,6-tetrahydrobenzyl alcohol containing three drops of di-n-butyltin diacetate as catalyst is added 308 grams of bis(2-isocyanatoethyl) 4-cyclohexane-1,2-dicarboxylate over a period of 1 hour. The temperature is maintained at 45° C. during the addition, then raised to 60° C. and held for an additional 90 minutes. The residue is stripped of low boiling material and recrystallized from benzene and cyclohexane to give 395 grams of product which is 70.6 percent of the theoretical yield.

EXAMPLE 19

Bis[2′-(2-cyclopentenyloxyformamido) ethyl] 4-cyclohexene-1,2-dicarboxylate

To 261 grams of 2-cyclopentenol (3.1 mols) containing 1 gram of triethylamine as catalyst, is added 462 grams of bis(2-isocyanatoethyl) 4-cyclohexane-1,2-dicarboxylate (1.5 mols), over a period of one hour. The temperature is maintained at 25 to 36° C. during the addition, then is raised to 45° C. and held for an additional 2 hours. The residue is treated with activated charcoal and recrystallized from benzene and hexane to give 414 grams of product which was 58% of the theoretical yield.

EXAMPLE 20

Bis[2-(tricyclo[5.2.1.0$^{2,6}$]dec-4-en-8-yloxyformamido) ethyl] 4-cyclohexene-1,2-dicarboxylate To 315 grams of dicyclopentadiene hydrate (2.1 mols) and 1 gram of triethylamine in 100 milliliters of anhydrous toluene is added 308 grams of bis(2-isocyanatoethyl) 4-cyclohexene-1,2-dicarboxylate (1 mol) at a temperature of 45 to 60° C. over a period of 5 hours. The isolated residue product exhibits the amorphous characteristic of a low melting glass.

TABLE I.—FILM PROPERTIES OF MOISTURE CURED OIL MODIFIED URETHANE COATINGS

| Oil | Parts by weight | Parts by weight of isocyanate [1] | Sward Hardness | Water [2] | 1 percent $H_2SO_4$ [2] |
|---|---|---|---|---|---|
| Example: | | | | | |
| 12 ...... Dehydrated castor oil... | 79.1 | 38.1 | 2 | Fair..... | Excellent. |
| 13 ...... do ...... | 89.1 | 63.5 | 4 | ...do.... | Do. |
| 14 ...... Linseed oil ...... | 100 | 30 | 1.3 | ...do.... | Good. |
| 15 ...... Oiticica oil ...... | 100 | 60 | 21.2 | ...do.... | Excellent. |

[1] Bis(2-isocyanatoethyl) fumarte.
[2] 24 hour exposure.

EXAMPLE 16

Bis[2-(allylureido)ethyl] 4-cyclohexane-1,2-dicarboxylate

To 177 grams of allylamine in 700 milliliters of anhydrous toluene, there is added 462 grams of bis(2-isocyanatoethyl) 4-cyclohexene-1,2-dicarboxylate (1.5 mols) over a period of 3 hours at 25° to 35° C. The crystalline material obtained as product is filtered and recrystallized from isopropanol to give 575 grams of product which is 91 percent of the theoretical yield.

EXAMPLE 17

Bis[2-(allyloxyformamido)ethyl] 4-cyclohexene-1,2-dicarboxylate

To 180 grams of allyl alcohol (3.1 moles) containing 1 gram of triethylamine as catalyst, there is added 462 grams of bis(2-isocyanatoethyl) 4-cyclohexene-1,2-dicarboxylate (1.5 mols) over a period of 40 minutes at 40° C. The reaction mixture is maintained at 40° C. for an additional hour whereupon the product is filtered and recrystallized from ethyl ether to give 471 grams of product which is 74 percent of the theoretical yield.

EXAMPLE 21

Bis[2′-(2-propynyloxyformamido)ethyl] 4-cyclohexene-1,2-dicarboxylate

To 62.9 grams of proparyl alcohol (1.1 mols) and 3 drops of triethylamine in 100 milliliters of anhydrous benzene there is added 154 grams of bis(2-isocyanatoethyl) 4-cyclohexene-1,2-dicarboxylate (0.5 mol) over a period of one hour at a temperature of 25° C. The temperature is raised to 55° C. and held for 3 hours. The residue is stripped of low boiling material to give 140 grams of product which is 66.7 percent of the theoretical yield.

EXAMPLE 22

Bis[2-(n-butylmercaptoformamido)ethyl] 4-cyclohexene-1,2-dicarboxylate

To 77 grams of n-butyl mercaptan (0.854 mol) and 2 drops of triethylamine in 110 milliliters of anhydrous toluene there is added 116 grams of bis(2-isocyanatoethyl) 4-cyclohexene-1,2-dicarboxylate (0.377 mol) over a period of one hour at a temperature of from 25 to 40° C. The mixture is held for an additional 5 hours at 40 to 50° C. The residue is stripped of low boiling mate-

EXAMPLE 23

Bis[2'-(2-cyanoethoxyformamido)ethyl] 4-cyclohexene-1,2-dicarboxylate

To 78.2 grams of ethylene cyanohydrin (1.1 mols) containing a drop of di-n-butyltin diacetate is added 154 grams of bis(2-isocyanatoethyl) 4-cyclohexene-1,2-dicarboxylate (0.5 mole) over a 30 minute period at a temperature of 25 to 50° C. The temperature is maintained at 50° C. for an additional 30 minutes and at 80° C. for 90 minutes. The residue is recrystallized from ethylene dichloride and hexane to give product which is 91 percent of the theoretical yield.

EXAMPLE 24

Bis[2-(methallyloxyformamido)ethyl]-4-cyclohexene-1,2-dicarboxylate

To 151 grams of methallyl alcohol (2.1 mols) and 0.5 gram of triethylamine is added 308 grams of bis(2-isocyanatoethyl) 4-cyclohexene-1,2-dicarboxylate (1.0 mol) over a 30 minute period at a temperature of 40° C. After 5 hours the mixture is stripped of low boiling material under reduced pressure and recrystallized from ethyl ether to give 393 grams of product which is 87 percent of the theoretical yield.

EXAMPLE 25

Bis[2'-(2-chloroethoxyformamido)]4-cyclohexene-1,2-dicaorboxylate

To 177 grams of ethylene chlorohydrin (2.2 mols) containing 2 drops of triethylamine is added 308 grams of bis(2-isocyanatoethyl) 4-cyclohexene-1,2-dicarboxylate (1.0 mol). The reaction mixture is stirred at 50 to 60° C. for 6 hours and maintained at 75 to 85° C. for an additional 3 hours. The residue is recrystallized from benzene to give 362 grams of product which is 77 percent of the theoretical yield.

EXAMPLE 26

Bis[2-(3(3-diallylureido)ethyl]4-cyclohexene-1,2-dicarboxylate

To 216 grams of diallylamine (2.2 mols) in 500 milliliters of benzene was added 308 grams of bis(2-isocyanatoethyl)4-cyclohexene-1,2-dicarboxylate (1.0 mol) over a 2 hour period at 35° C. After an additional hour at 55° C. the residue is stripped and recrystallized.

EXAMPLE 27

Bis[2-(3-butylureido)ethyl]4-cyclohexene-1,2-dicarboxylate

To 102 grams of n-butylamine in 500 milliliters of benzene is added 154 grams of bis(2-isocyanatoethyl)4-cyclohexene-1,2-dicarboxylate (0.5 mol) at a temperature of 40° C. After 2 additional hours at 40° C. the residue is stripped and recrystallized from ethanol to give 162 grams of product which was 71.5 percent of the theoretical yield.

EXAMPLE 28

Bis[2-(6-aminohexylureido)ethyl]4-cyclohexene-1,2-dicarboxylate

To 11.6 grams of 1,6-hexanediamine (0.10 mol) in 40 grams of dry benzene there is added 15.4 grams of bis(2-isocyanatoethyl)4-cyclohexene-1,2-dicarboxylate (0.05 mol) at a temperature of 35° C. The solid material which formed is filtered, washed with anhydrous ether and dried. The infrared analysis of the solid product obtained is consistent with the proposed structure with maxima at 5.73$\mu$, ester C=O, 2.98$\mu$, NH plus NH$_2$; 6.13$\mu$, urea C=O plus NH$_2$.

EXAMPLE 29

Bis[2-(2-hydroxyeththioxyformamido)ethyl]4-cyclohexene-1,2-dicarboxylate

To 15.6 grams of 2-mercaptoethanol (0.2 mol), there is added 30.8 grams of bis(2-isocyanatoethyl)4-cyclohexene-1,2-dicarboxylate (0.1 mol). The reaction temperatures rises to 65° C. and stirring is continued until the reaction subsides. The infrared analysis of the clear liquid product is consistent with the proposed structure with maxima at 6.52$\mu$, carbamate NH; 5.78$\mu$, ester C=O; 3.03$\mu$, NH and OH; 6.08$\mu$, thiol-carbamate C=O (strong); 9.43$\mu$, C—OH.

EXAMPLE 30

To 22 grams of the propylene oxide adduct of sorbitol having a hydroxyl number of about 500 (0.2 equivalent) and 2 drops of di-n-butyltin diacetate there is added 15.4 grams of bis(2-isocyanatoethyl)4-cyclohexene-1,2-dicarboxylate (0.1 equivalent). The reaction temperature rises to 90° C. and stirring is continued until the reaction has subsided. The infrared analysis of the rubber-like product is consistent with the proposed structure with maxima at 6.53$\mu$, carbamate NH; 5.78$\mu$, ester C=O; 2.96$\mu$, —OH; 9.8$\mu$, C—OH.

EXAMPLE 31

Bis[2-(p-carboxyphenylureido)ethyl]4-cyclohexene-1,2-dicarboxylate

To 13.7 grams of p-aminobenzoic acid (0.1 mol) in 40 grams of dry acetone there is added 15.4 grams of bis(2-isocyanatoethyl)4-cyclohexene-1,2-dicarboxylate (0.05 mol) at a temperature of 40° C. The reaction temperature is maintained at 40° C. for an additional hour. The infrared analysis of the solid crystalline product is consistent with proposed structure with maxima at 5.73$\mu$, ester C=O; 2.96$\mu$, NH; 3.73 and 3.91$\mu$, acid OH; 5.95$\mu$, acid C=O, 6.26$\mu$, aromatic C=C; 10.8$\mu$, acid C—OH; 11.7$\mu$, 1,4-substituted aromatic.

EXAMPLE 32

Bis[2-(4-hydroxy-2-buteneoxyformamido)ethyl]4-cyclohexene-1,2-dicarboxylate

To 2-butene-1,4-diol containing 2 drops of di-n-butyltin diacetate is added 30.8 grams of bis(2-isocyanatoethyl)4-cyclohexene-1,2-dicarboxylate (0.1 mol). The reaction temperature rises to 140° C. and stirring is continued until the reaction subsides. The infrared analysis of the viscous product is consistent with the proposed structure with maxima at 6.52$\mu$, carbamate NH; 5.8$\mu$, ester C=O; 3.0$\mu$, NH and OH; 5.83$\mu$, carbamate C=O; 9.75$\mu$, C—OH.

EXAMPLE 33

Bis[2-(1-piperazinoformamido)ethyl]4-cyclohexene-1,2-dicarboxylate

To 17.2 grams of piperazine (0.2 mol) in 40 grams of dry benzene is added 30.8 grams of bis(2-isocyanatoethyl)4-cyclohexene-1,2-dicarboxylate (0.1 mol) at a temperature of 35° C. The infrared analysis of the white solid product is consistent with the proposed structure with maxima at 5.74$\mu$, ester C=O; 2.95$\mu$, NH; 6.15$\mu$, secondary amide C=O; 6.5$\mu$, secondary amide NH.

EXAMPLE 34

A solution of bis(2-isocyanatoethyl)4-cyclohexene-1,2-dicarboxylate (23.1 grams; .075 mol) in ethyl acetate (9.2 grams) is maintained at 60° C. while a mixture of 1,1,1-trimethylolpropane (3.4 grams; .025 mol) and toluene (9.2 grams) is added over a 35 minute period. The 50 percent solids mixture is stirred for 10 minutes, then the temperature is elevated to 75°–80° C. and maintained thereat for 5 hours. Analysis of the mixture for isocyanate equivalent gives 385. The calculated isocyanate equivalent is 353.

EXAMPLE 35

A mixture of bis(2-isocyanatoethyl)4-cyclohexene-1,2-dicarboxylate (30.8 grams; 0.1 mol), the glyceryl adduct of propylene oxide having a hydroxyl number of 406 (13.8 grams; 0.033 mol), and Cellosolve acetate (29.6 grams; 50% solids) is charged to a stirred reaction flask. The temperature is maintained at 75° C. for 5 hours then cooled. The isocyanate equivalent by analysis is 444 (calculated isocyanate equivalent—446). A sample of the material is stripped free of Cellosolve acetate solvent and analyzed by infrared spectrum which is in agreement with that expected for the subject compound with maxima at 2.96$\mu$, NH; 4.37$\mu$, NCO; 5.73$\mu$, C=O of ester; 5.84$\mu$, C=O of carbamate; 6.55$\mu$, NH of carbamate; 8.95$\mu$, ether C—O—C.

EXAMPLE 36

2,2'-(ethyleneoxythiodiformamido)diethyl bis(2-isocyanatoethyl)4-cyclohexene-1,2-dicarboxylate Bis(2-isocyanatoethyl)4-cyclohexene-1,2-dicarboxylate (30.8 grams; 0.1 mol) and 2-mercaptoethanol (3.9 grams; 0.05 mol) 30.8 is mixed and two drops of di-n-butyltin diacetate are added. The temperature rises rapidly to 150° C. and stirring is continued until the reaction subsides. The white solid product is analyzed by infrared analysis and the spectrum is in agreement with that expected for the desired product with maxima at 3.0$\mu$, —NH; 4.43$\mu$, NCO; 5.76$\mu$, ester C=O; 5.9$\mu$, carbamate C=O; 6.07$\mu$, thiol carbamate C=O.

EXAMPLE 37

2,2'-(hexamethylenediureylene)diethyl bis(2-isocyanatoethyl)4-cyclohexene-1,2-dicarboxylate 1,6 - hexamethylenediamine (5.8 grams; 0.05 mol) in benzene (60 grams) is fed to a solution of bis(2-isocyanatoethyl) 4-cyclohexene-1,2-dicarboxylate (30.8 grams; 0.1 mol) in benzene (140 grams) while the temperature is maintained at 40° C. A white solid forms immediately. The reaction mixture is stirred for one hour after the addition is completed and is then filtered, washed with anhydrous ethyl ether and dried. The white, powdery product is obtained in quantative yield. Infrared analysis is in agreement with that for the proposed structure with maxima at 2.98$\mu$, NH; 4.38$\mu$, NCO; 5.73$\mu$, ester C=O; 6.13$\mu$, urea C=O; 6.4$\mu$, urea NH.

EXAMPLE 38

2,2'-(4-methyl-m-phenylenediureylene)diethyl bis(2-isocyanatoethyl) 4-cyclohexene-1,2-dicarboxylate 2,4-tolylene (6.1 grams; 0.05 mol) slurried in benzene (60 grams) is fed slowly to bis(2-isocyanatoethyl) 4-cyclohexene (30.8 grams; 0.1 mol) in benzene (160 grams) at a temperature of 30° C. Solids form immediately and the mixture is stirred for one hour after the addition is completed. Subsequent filtration, washing with anhydrous ether, and drying gives a tan colored, powdery product. Infrared analysis is in agreement with the proposed structure with maxima at 2.98$\mu$, NH; 4.37$\mu$, NCO; 5.72$\mu$, ester C=O; 6.05$\mu$, urea C=O; 6.25 and 6.76, aromatic C=C; 12.3$\mu$, 1,2,4-trisubstituted aromatic ring.

EXAMPLE 39

2-(butoxyformamido)ethyl-2-isocyanatoethyl 4-cyclohexene-1,2-dicarboxylate

Bis(2-isocyanatoethyl) 4-cyclohexene-1,2-dicarboxylate (30.8 grams; 0.1 mol) and n-butyl alcohol are mixed and a drop of di-n-butyltin diacetate is added. The reaction temperature is maintained at about 65° C. by external cooling until the reaction subsides and then allowed to stand for one hour. The resultant product is a water-white liquid. Infrared analysis is in agreement with the proposed structure with maxima at 2.98$\mu$, NH; 4.37$\mu$, NCO; 5.71$\mu$, ester C=O; 5.83$\mu$, carbamate C=O.

EXAMPLE 40

Bis(2-isocyanatoethyl) 4-cyclohexene-1,2-dicarboxylate (30.8 grams; 0.1 mol) and the propylene oxide adduct of sucrose having a hydroxyl number of 481 (11.65 grams; 0.05 mol) are allowed to react as in Example 39. The temperature rises to 100° C. and a rubbery, solid product is formed. Infrared analysis is in agreement with the proposed structure with maxima at 2.96$\mu$, NH; 4.43$\mu$, NCO; 5.76$\mu$, ester C=O; 4.9$\mu$, carbamate C=O; 9.15$\mu$, ether C—O—C.

EXAMPLE 41

A mixture of bis(2-isocyanatoethyl) 4-cyclohexene-1,2-dicarboxylate (15.4 grams; 0.05 mol), the propylene oxide adduct of 1,2,6-hexanetriol having a hydroxyl number of 252 (11.1 grams; 0.017 mol), and Cellosolve acetate (21.1 grams; 50% solids) is charged to a stirred reaction flask protected from moisture and heated to 75° C. After a reaction period of 7½ hours at this temperature, the isocyanate equivalent by analysis is 508. The calculated isocyanate equivalent is 532.

EXAMPLE 42

A mixture of bis(2-isocyanatoethyl) 4-cyclohexene-1,2-dicarboxylate (154 grams; 0.5 mol) and polypropylene glycol having an average molecular weight of 2025 (498 grams; 0.25 mol) is agitated vigorously and maintained at 85° C. for 8 hours. The resulting material is a viscous, easily pourable, colorless liquid. The isocyanate equivalent by analysis was 1310. The calculated isocyanate equivalent is 1304.

EXAMPLE 43

A mixture of bis(2-isocyanatoethyl) 4-cyclohexene-1,2-dicarboxylate (115.5 grams; 0.375 mol) and polyethylene glycol having an average molecular weight of 400 (75 grams; 0.187 mol) is agitated vigorously and maintained at 80° C. for 3½ hours. The resulting material is free-flowing, colorless, clear, viscous liquid which has an isocyanate equivalent of 524 by analysis. The calculated isocyanate equivalent is 509.

EXAMPLE 44

A mixture of bis(2-isocyanatoethyl) 4-cyclohexene-1,2-dicarboxylate (12.32 grams; 0.04 mol) and poly(tetramethyleneoxy) glycol having an average molecular weight of 3000 (50 grams; 0.02 mol) is charged to a stirred flask and agitated vigorously while heating at 75° C. for three hours. The resulting material is a very viscous, straw colored liquid which cools to a light-tan solid.

EXAMPLE 45

A prepolymer is prepared by the reaction of bis(2-isocyanatoethyl) 4-cyclohexene-1,2-dicarboxylate (58.5 grams; 0.19 mol) with poly(epsilon-caprolactone) diol (200 grams; .097 mol) at an NCO/OH ratio of two. The reaction is conducted for a period of 3 hours at 75° C. The resulting material was a light brown solid. [The poly(epsilon-caprolactone)diol had an average molecular weight of about 2000 and was prepared via the reaction of epsilon-caprolactone with diethylene glycol as the initiator therefor.]

EXAMPLES 46–55

Various ester diisocyanate prepolymers are prepared from bis(2-isocyanatoethyl) 4-cyclohexene-1,2-dicarboxylate and various polyoxyalkylene glycols. The hydroxy/isocyanate ratio is at least two. The reactants are charged to a dry flask, heated to the desired temperature and held at this temperature for 3 hours. The material is analyzed for equivalent weight by the standard amine equivalent method. In those instances where 3 hours is not sufficient, analyses are run at periodic intervals until the equivalent weight reached the theoretical value. In all instances, the prepolymers prepared are non-lachrymatory and show excellent shelf stability. The results obtained are summarized in Table II.

Teflon. The dishes are covered loosely and placed in a 75° C. oven for 3 hours after which the castings are removed and permitted to post cure for a week at am-

TABLE II

| Example | Glycol | NCO/OH | Temp., °C. | Time, hrs. | Equivalent wt. (1) Theory | Equivalent wt. (1) Found | Description |
|---|---|---|---|---|---|---|---|
| 46 | (2) | 2/1 | 75 | 3 | 508 | 526 | Water white, clear, easily pourable. |
| 47 | (3) | 2/1 | 75 | 3 | 608 | 636 | Do. |
| 48 | (4) | 2/1 | 75 | 4 | 521 | 577 | Light straw, viscous but flows. |
| 49 | (5) | 2/1 | 85 | 4 | 821 | 832 | Water white, clear, easily pourable. |
| 50 | (6) | 2/1 | 85 | 8 | 1,321 | 1,328 | Do. |
| 51 | (7) | 2/1 | 75 | 3 | 1,808 | 1,781 | Tan, waxy solid. |
| 52 | (7) | 2.4/1 | 75 | 3 | 1,335 | 1,800 | Do. |
| 53 | (7) | 3.5/1 | 75 | 3 | 816 | 876 | Brown, thick viscous liquid. |
| 54 | (7) | 4.0/1 | 75 | 3 | 705 | 727 | Viscous liquid. |
| 55 | (7) | 4.7/1 | 75 | 3 | 602 | 622 | Do. |

(1) Equivalent weight determined by standard amine analysis.
(2) Polyethylene glycol having an average molecular weight of 400.
(3) Polyethylene glycol having an average molecular weight of 600.
(4) Polypropylene glycol having an average molecular weight of 425.
(5) Polypropylene glycol having an average molecular weight of 1,025.
(6) Polypropylene glycol having an average molecular weight of 2,025.
(7) Poly(tetramethyleneoxy) glycol having an average molecular weight of 3,000.

EXAMPLES 56–71

Various ester diisocyanate prepolymers made from bis(2-isocyanatoethyl) 4-cyclohexene-1,2-dicarboxylate in a manner similar to that employed in Examples 46–55 are cured with various polyfunctional amines or polyols. In all cases, the prepolymer was prepared from observing an NCO/OH ratio of 2:1.

The prepolymers are weighed into a vacuum flask and degassed under reduced pressure. The curing agent is added in the specified ratio. The amines are added as a melt; the polyols are warmed as necessary to effect solution in the prepolymer. The mixture is agitated and degassed, and cast in dry aluminum dishes coated with bient temperature prior to testing. In some instances removed from the casting with mercury amalgam. Results are summarized in Table III.

TABLE III

| Example | Prepolymer from— | Curing agent | NCO/active H | Curing Temp., °C. | Curing Time, hrs. | Description |
|---|---|---|---|---|---|---|
| 56 | (1) | Amine A (6) | 1.1/1.0 | 75 | 3 | Very high gloss. |
| 57 | (2) | Amine A | 1.3/1.0 | 75 | 3 | Very high gloss. Slightly flexible. Very tough. |
| 58 | (3) | do | 1.1/1.0 | 75 | 3 | Good gloss, tough, snappy, elastic. |
| 59 | (3) | do | 1.3/1.0 | 75 | 3 | Do. |
| 60 | (3) | do | 1.5/1.0 | 75 | 3 | Do. |
| 61 | (3) | Polyol H (7) | 1.0/1.0 | 75 | 3 | Clear, colorless, slightly tacky. |
| 62 | (3) | Polyol I (8) | 1.0/1.0 | 75 | 3 | Do. |
| 63 | (3) | Polyol G (9) | 1.0/1.0 | 75 | 3 | Clear, colorless, sticky. |
| 64 | (4) | Amine A | 1.1/1.0 | 75 | 3 | Tough, snappy, good gloss. |
| 65 | (4) | do | 1.1/1.0 | 75 | 3 | t-Butylperbenzoate added. |
| 66 | (4) | Polyol H | 1.0/1.0 | 75 | 3 | Colorless, clear, sticky, but does not adhere to the hand. |
| 67 | (4) | Polyol I | 1.0/1.0 | 75 | 3 | Colorless, clear, sticky. |
| 68 | (4) | Polyol G | 1.0/1.0 | 75 | 3 | Colorless, clear, very sticky. |
| 69 | (4) | Polyol H | 1.0/1.0 | 75 | 3 | t-Butylperbenzoate added. Very elastic, good memory. Adhesive. |
| 70 | (5) | Amine A | 1.3/1.0 | 75 | 3 | Tough, snappy, good memory. |
| 71 | (5) | do | 1.5/1.0 | 75 | 3 | Tough, snappy, excellent memory. |

(1) Polyethylene glycol having an average molecular weight of 400.
(2) Polypropylene glycol having an average molecular weight of 425.
(3) Polypropylene glycol having an average molecular weight of 1,025.
(4) Polypropylene glycol having an average molecular weight of 2,025.
(5) Poly(tetramethyleneoxy) glycol having an average molecular weight of 3,000.
(6) Amine A represents 4,4'-methylene-bis(2-chloroaniline).
(7) A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380.
(8) Polyol I represents the propylene oxide adduct of sorbitol having a hydroxyl number of 509.
(9) Polyol G represents the propylene oxide adduct of glycerol having a hydroxyl number of 633.

EXAMPLES 72–82

Elastomers were prepared in a manner similar to that employed in Examples 56 through 71. The prepolymer in all instances is prepared from bis(2-isocyanatoethyl) 4-cyclohexene-1,2-dicarboxylate and poly(tetramethyleneoxy) glycol having a molecular weight of 3000 in which the ratio of NCO/OH is maintained at 2:1, or increased as shown in Table IV so as to provide excess isocyanate. Results are shown in Table IV.

TABLE IV

| Example | Prepolymer, NCO/OH | Prepolymer, eq. wgt. | Curing agent (1) | NCO/active H | Temp., °C. | Time, hrs. | Description |
|---|---|---|---|---|---|---|---|
| 72 | 2/1 | 1,781 | Amine A(1) | 1.3/1.0 | 75 | 3 | Tough, snappy, good memory. |
| 73 | 2/1 | 1,781 | Amine A | 1.5/1.0 | 75 | 3 | Tough, snappy, excellent memory. |
| 74 | 2.4/1 | 1,514 | do | 1.1/1.0 | 75 | 3 | High gloss, flexible, rubbery, elastic. |
| 75 | 2.4/1 | 1,514 | do | 1.0/1.0 | 75 | 3 | Soft, rubbery, colored. |
| 76 | 2.4/1 | 1,514 | Polyol I(2) | 1.0/1.0 | 75 | 3 | Soft, rubbery, clear. |
| 77 | 2.4/1 | 1,514 | Polyol G(3) | 1.0/1.0 | 75 | 3 | Tough, flexible, opaque. |
| 78 | 3.5/1 | 850 | Amine A | 1.0/1.0 | 75 | 3 | High gloss, flexible. |
| 79 | 3.5/1 | 850 | Amine A(4), Polyol G | 1.1/1.0 | 75 | 3 | Quite flexible, soft. |
| 80 | 4.7/1 | 600 | Amine A | 1.1/1.0 | 75 | 3 | Good gloss, very hard and stiff. |
| 81 | 4.7/1 | 600 | do | 1.3/1.0 | 75 | 3 | Good gloss, hard and stiff, but slightly elastic and flexible. |
| 82 | 4.7/1 | 600 | Polyol H(5) | 1.0/1.0 | 75 | 3 | Soft, flexible, elastic. |

(1) 4,4'-methylene-bis(2-chloroaniline).
(2) Polyol I represents the propylene oxide adduct of sorbitol having a hydroxyl number of 509.
(3) Polyol G represents the propylene oxide adduct of glycerol having a hydroxyl number of 633.
(4) Curing agent is a blend of the polyol and amine.
(5) A blend of the propylene oxide adduct of the reaction product of acrolein and phenol which has a hydroxyl number of 255, and the propylene oxide adduct of glycerol which has a hydroxyl number of 653. The resulting blend has a hydroxyl number of 380.

EXAMPLES 83–84

Ester diisocyanate elastomers are prepared by a one step process by charging bis(2-isocyanatoethyl) 4-cyclohexene-1,2-dicarboxylate and poly(tetramethyleneoxy) glycol having an average molecular weight of 3000 in a ratio as to provide a NCO/OH ratio of slightly greater than 2:1. The resulting solution was degassed under reduced pressure and molten 4,4′-methylene-bis(2-chloroaniline) is stirred into the solution. The mixture is again degassed, and afterwards cast in Teflon coated aluminum dishes covered loosely and placed in a 75° C. oven for 3 to 6 hours. The castings are removed from the molds and permitted to post cure for one week at room temperature prior to testing.

Results are summarizd in Table V.

TABLE V

| Example | CEDI, eq. | Polyol (1), eq. | Amine A (2), eq. | Description |
|---|---|---|---|---|
| 83 | .042 | .02 | .02 | Tough, snappy, elastic. |
| 84 | .042 | .02 | .02 | Strong, flexible, elastic. |

(1) Poly(tetramethyleneoxy) glycol having an average molecular weight of 3,000.
(2) 4,4′-methylene bis(2-chloroaniline).

EXAMPLE 85

A polyisocyanate prepared as set forth in Example 41 supra is dissolved in a 50:50 mixture (by volume) of toluene-acetone. The resulting solution contained 50 weight percent of said polyisocyanate. A 5.0 mil film of the subject isocyanate is cast on a glass plate and allowed to react with the moisture in the air for about 24 hours at room temperature. The resultant film cured hard and clear.

EXAMPLES 86–90

In a manner similar to Example 85 supra, several films are prepared. The pertinent data are set forth in Table VI infra.

TABLE VI

| Example No. | Isocyanate | Solids, wt. percent (1) | Time, hrs. (2) | Description (3) |
|---|---|---|---|---|
| 86 | (4) | 50 | 168 | Very hard. Slightly colored. |
| 87 | (5) | 50 | 48 | Colorless. Clear, very hard. |
| 88 | (6) | 50 | 168 | Sl. colored, clear, very hard. |
| 89 | (7) | 50 | 114 | Excellent clarity. |
| 90 | (8) | 50 | 3 weeks | Tacky. Clear. |

(1) All films cast as 50 wt. percent isocyanate in Cellosolve acetate.
(2) Cure time at room temperature, i.e., about 23° C.
(3) 15 mil film on glass.
(4) Polyisocyanate prepared in accordance with Example 41 supra.
(5) Polyisocyanate prepared in accordance with Example 35 supra.
(6) Prepared by reacting 2 equivalents of bis(2-isocyanatoethyl) 4-cyclohexene-1,2-dicarboxylate and 1 equivalent of the propylene oxide adduct of sorbitol having a hydroxyl number of 509 in cellulose acetate (50 wt. percent solids) at 75° C. for 3 hours.
(7) Polyisocyanate prepared in accordance with Example 40 supra.
(8) Prepared by reacting 2 equivalents of bis(2-isocyanatoethyl) 4-cyclohexene-1,2-dicarboxylate and 1 equivalent of the propylene oxide adduct of 1,2,6-hexanetriol having a hydroxyl number of 240 at 75° C. for 3 hours

EXAMPLE 91

Dipropylene glycol (9.0 grams; 0.134 equivalent) and bis(2 - isocyanatoethyl) 4-cyclohexene-1,2-dicarboxylate (20.6 grams; 0.134 equivalent) are mixed in a vacuum flask and degassed under reduced pressure. About 20 grams of the mixture is poured into a previously cleaned and dried aluminum dish. The dish is covered and placed in a 70° C. oven for 16 hours. The resulting plaque is clear and colorless, with a few bubbles. After standing for 1 week at room temperature the material has a hardness about 76–Shore D.

EXAMPLES 92–104

In a manner similar to Example 91 supra, the following polyurethanes are prepared by the reaction of bis(2-isocyanatoethyl) 4-cyclohexene-1,2-dicarboxylate and polyols using a NCO/OH ratio of one. The pertinent data are set forth in Table VII below.

TABLE VII

| Example No. | Polyol system | Cure time, hrs. | Description of polymer |
|---|---|---|---|
| 92 | (1) | 16 | Clear, liquid. |
| 93 | (2) | 16 | Do. |
| 94 | (3) | 16 | Clear, colorless liquid. |
| 95 | (4) | 16 | Clear, sl; yellow. |
| 96 | (5) | 16 | Do. |
| 97 | (6) | 16 | Clear, colorless. |
| 98 | (7) | 16 | Clear, tan color. |
| 99 | (8) | 16 | Tan. |
| 100 | (9) | 3 | Slightly colored, clear. |
| 101 | (10) | 3 | Do. |
| 102 | (11) | 3 | Very clear, very slightly flexible. |
| 103 | (12) | 3 | Slightly colored, clear. |
| 104 | (13) | 3 | Clear, colorless, sticky. |

(1) Polypropylene glycol. Molecular weight=425.
(2) Polypropylene glycol. Molecular weight=1,025.
(3) Hyprose- hydroxypropyl sucrose (Dow Chem. Co.).
(4) Propylene oxide adduct to triphenylolpropane blended with propylene oxide adduct to glycerine to make OH number of 380.
(5) Propylene oxide adduct to sorbitol to hydroxyl number of 509.
(6) Propylene oxide adduct to glycerine to hydroxyl number of 633.
(7) Propylene oxide adduct to triphenylolpropane to hydroxyl number of 249.
(8) Propylene oxide adduct to triisopropanolamine to hydroxyl number of 707.
(9) Propylene oxide adduct to sucrose to hydroxyl number of 481.
(10) Propylene oxide plus 10 weight percent ethylene oxide adduct to sucrose to hydroxyl number of 465.
(11) TP-440, Wyandotte Chem. Co. propylene oxide adduct to trimethylolpropane.
(12) G-2410, Atlas Chem. Co. propylene oxide adduct to sorbitol.
(13) Polyethylene glycol, molecular weight=200.

EXAMPLE 105

A mixture of 6-methyl-3,4-epoxycyclohexylmethyl 6-methyl-3,4-epoxycyclohexanecarboxylate (15.6 grams; 0.1 equivalent), polypropylene gylcol of 425 molecular weight (22 grams; 0.1 equivalent), bis(2-isocyanatoethyl) 4-cyclohexene-1,2-dicarboxylate (15.4 grams; .1 equivalent), and $BF_3$-MEA (0.2 gram) catalyst are degassed under reduced pressure and 20 grams of the mixture is poured into a previously cleaned and dried aluminum dish. The dish is covered loosely and placed in a 75° C. oven for 3 hours. The resultant polymer is clear, colorless, flexible, and very slightly tacky.

EXAMPLE 106

The polyisocyanate prepared in accordance with Example 42 supra, (10.5 grams; .008 equivalent) and MOCA (1.0 gram; .007 equivalent) ($NCO:NH_2$ ratio=1.1:1.0) are mixed by adding molten MOCA to the isocyanate. The mixture is subsequently degassed and poured into aluminum molds, covered lightly and heated for 3 hours in a 75° C. oven. The resultant polymer is tough, snappy, elastic and has a high gloss.

EXAMPLE 107

The polyisocyanate prepared in accordance with Example 42 supra (10.5 grams; 0.008 equivalent) and a blend of the propylene oxide adduct of the reaction product of acrolein and phenol which has a hydroxyl number of 255, and the propylene oxide adduct of glycerol which has a hydroxyl number of 653, said blend having a hydroxyl number of 380 (1.2 grams; 0.008 equivalent)

(NCO/OH=1:1)

are mixed well and the mixture degassed under reduced pressure. The degassed material is poured into aluminum molds and cured in a circulating oven at 75° C. for 3 hours. The resulting plaque is colorless, transparent, and sticky.

EXAMPLES 108–117

In a manner similar to Example 107 supra, the following products described in Table VIII below are obtained.

EXAMPLE VIII

| Example No.: | Isocyanate | Active H compound | NCO/ active H | Description |
|---|---|---|---|---|
| 108 | (1) | MOCA | 1.3/1.0 | Clear, elastic, good memory, strength and gloss. |
| 109 | (1) | MOCA | 1.5/1.0 | Snappy, rubber-like. |
| 110 | (1) | (4) | 1.0/1.0 | Clear, colorless. |
| 111 | (1) | (5) | 1.0/1.0 | Sticky, clear, colorless. |
| 112 | (1) | MOCA | 1.1/1.0 | High gloss, tough, flexible. |
| 113 | (2) | MOCA | 1.3/1.0 | Tough, snappy, rubber. Flexible. |
| 114 | (2) | (6) | 1.0/1.0 | Soft, tacky, colored. |
| 115 | (2) | (4) | 1.0/1.0 | Slightly tacky. |
| 116 | (2) | (5) | 1.0/1.0 | Soft, elastic, tough. |
| 117 | (3) | MOCA | 1.3/1.0 | Could be cold drawn. Did not return. Hard. |

(1) Polyisocyanate prepared in accordance with Example 43 supra.
(2) Polyisocyanate prepared in accordance with Example 44 supra.
(3) Polyisocyanate prepared in accordance with Example 45 supra.
(4) Propylene oxide adduct of sorbitol having a hydroxyl number of 509.
(5) Propylene oxide adduct of glycerol having a hydroxyl number of 633.
(6) A blend of the propylene oxide adduct of the reaction product of acrolein and phenol which has a hydroxyl number of 255, and the propylene oxide adduct of glycerol which has a hydroxyl number of 380, said blend having a hydroxyl number of 380.

EXAMPLE 118

Bis(2-isocyanatoethyl) 4-cyclohexene-1,2-dicarboxylate (15.4 grams; 0.1 equivalent) and 18.5 grams (0.1 equivalent) of a polyol (prepared by reacting 1.0 equivalent of the propylene oxide adduct of glycerol having a hydroxyl number of 623 with 0.5 equivalent of bis (2-isocyanatoethyl) 4-cyclohexene-1,2-dicarboxylate in neat at 80° C. for 2 hours) are mixed and dissolved gases removed under reduced pressure. The material is poured into a previously cleansed and dried aluminum dish covered loosely, and heated for 4 hours at a 75° oven. The resultant polyurethane is clear, hard and slightly flexible.

EXAMPLES 119–122

In a manner similar to Example 118 supra, the following products described in Table IX below are prepared.

bis(isocyanatoalkenyl) 4-cyclohexene-1,2-dicarboxylates, etc. for example, bis(2-isocyanato-1-methylethyl) 4-cyclohexene-1,2-dicarboxylate, bis(3 - isocyanato-n-propyl) 4-cyclohexene-1,2-dicarboxylate, the bis(isocyanatophenyl) 4-cyclohexene-1,2-dicarboxylates, the bis(isocyanatocyclohexenyl) 4-cyclohexene-1,2-dicarboxylates, and other isocyanates encompassed and exemplified within the scope and discussion re. Formula I supra, can be homopolymerized to solid polymeric products useful in the potting, casting, laminating, encapsulating, etc., fields. Moreover, solid copolymeric products can be prepared by following the teachings of Example 123 supra by polymerizing a mixture of polyisocyanates comprising at least one of the diisocyanates of Formula I supra with/without various polyisocyanates disclosed in the literature, for example, the polyisocyanates in the publication by Siefken [Annalen, 562, pages 122–135 (1949)].

TABLE IX

| Example No. | Active hydrogen compound | Isocyanate | NCO/OH | Description |
|---|---|---|---|---|
| 119 | (1) | CEDI (50 mol percent) | 1.0/1.0 | Hard, white. |
| 120 | (2) | CEDI | 1/1 | Very viscous, clear, colorless, liquid. |
| 121 | (2) | TDI | 1/1 | Yellow, soft, tacky. |
| 122 | (2) | TDI (50 mol percent) CEDI (50 mol percent) | 1/1 | Very viscous, clear, colorless, liquid. |

(1) Polyol prepared by reacting 1.0 equivalent of the propylene oxide adduct of glycerol having a hydroxyl number of 623 with 0.5 equivalent of CEDI in neat at 80° C. for 2 hours.
(2) Polyol prepared by reacting 0.5 mol of polypropylene glycol having an average molecular weight of 425 and 0.25 mol of CEDI in neat at 84° C. for 5.5 hours.

EXAMPLE 123

Bis(2-isocyanatoethyl) 4-cyclohexene-1,2-dicarboxylate homopolymer (A) A few drops, approximately 10, of tributylphosphine are mixed into 10 grams of bis(2-isocyanatoethyl) 4-cyclohexene-1,2-dicarboxylate. In less than 30 seconds the mixture reached a temperature of about 100° C. After cooling to room temperature a clear cross-linked polymeric plaque is obtained.

(B) In an analogous manner as above, other bis(isocyanatoalkyl) 4-cyclohexane-1,2-dicarboxylates as well as bis(isocyanatoaryl) 4-cyclohexene-1,2-dicarboxylates, bis-(isocyanatocycloalkyl) 4-cyclohexene-1,2-dicarboxylates,

EXAMPLES 124–126

Bis(2-isocyanatoethyl) 4 - cyclohexene-1,2-dicarboxylates and copolycaprolactone (80/20) diol (a hydroxyl terminated diol having an average molecular weight of about 2000 and obtained by reacting 80 parts by weight of epsilon-caprolactone and 20 parts by weight of methyl-epsilon-caprolactone using diethylene glycol as the initiator—designated as "Polycap 80/20" in Table X infra) are reacted at a NCO/OH of 2.2. The resulting quasi-prepolymer then is extended with a diamine. The poly(urethane/urea) reaction product, in DMF, is cast as a film or converted into elastic fibers by conventional spinning techniques.

TABLE X

| | Preparation and properties of quasi-prepolymers | | | | | | | Casting and curing (5) of elastomers | | | | Physical properties of film | | | |
|---|---|---|---|---|---|---|---|---|---|---|---|---|---|---|---|---|
| | | | | Reaction | | Quasi | | | | | | | | | | |
| Ex. No. | Polyol | Eq. wt. (1) | NCO OH | Time, hrs. | Temp., °C. | Eq. wt. (2) | Age days (3) | Percent (4) solids | Amine extender | $NH^2$ NCO | Tensile strength, p.s.i. | Elong., percent | Modulus, 300% | Stress decay, percent |
| 124 | Polycap 80/20 | 1,055 | 2.2 | 1 | 80 | 1,289 | 14 | 15 | EDA(6) | 0.8 | 1,540 | 864 | 180 | 31.3 |
| 125 | do | 1,055 | 2.2 | 1 | 80 | 1,289 | 14 | 15 | EDA | 0.7 | 1,240 | 745 | 170 | 32 |
| 126 | do | 1,055 | 2.2 | 1 | 80 | 1,289 | 14 | 15 | MDA(7) | 0.7 | 405 | 739 | 109 | 28.9 |

(1) Eq. wt., determined by acetic anhydride-pyridine method for hydroxyl number.
(2) Quasi eq. wt., determined by standard amine analysis for isocyanate.
(3) Age, length of time quasi prepolymer stood prior to extending and casting.
(4) All films were cast as N,N-dimethylformamide solutions.
(5) Curing was accomplished at 80° C. for 16 hours in forced air oven.
(6) EDA, ethylenediamine.
(7) MDA, 4,4′-methylenedianiline.

EXAMPLE 127

Bis[2'-di(beta-hydroxyethyl)aminoethoxy-2-formamidoethyl] 4-cyclohexene-1,2-dicarboxylate A solution of bis(2-isocyanatoethyl) 4-cyclohexene-1,2-dicarboxylate (308 grams, 1 mol) in 100 cc. of chloroform is added to a stirred solution of triethanolamine (298 grams, 2 mols) in 100 cc. of chloroform. During the addition, which took 30 minutes, the reaction mixture is maintained at 40°–50° C. The resulting viscous mixture is stirred for an additional 30 minutes at about the same reaction temperature, after which the temperature is lowered to 30° C. The chloroform is removed by vacuum distillation, and a syrupy product is obtained which had the following elemental analysis:

Infrared spectrum is in agreement with that of the assigned structure, with maxima at 3.0 microns (OH); 5.75 microns (ester C=O); 5.9 microns (carbamate C=O); 6.5 microns (carbamate NH); 8.0 microns (ester and carbamate C—O); and 9.7 microns (OH).

EXAMPLE 128

Bis[N,N'-di(beta-hydroxyethyl)-ureylene-2-ethyl] 4-cyclohexene-1,2-dicarboxylate Bis(2-isocyanatoethyl) 4-cyclohexene-1,2-dicarboxylate (616 grams, 2 mols) is added to a stirred solution of diethanolamine (420 grams, 4 mols) in 750 milliliters to tetrahydrofuran. The addition takes 90 minutes, during which time the temperature is maintained at 35° C. The solvent is removed by vacuum distillation, leaving a quantitative yield of viscous product. The product is basic in that it requires 2.7 milliliters of 0.1 N HCl to neutralize one gram of alcohol. The basicity indicated that significant quantities of the carbamate derivative, i.e., bis[2'-(beta-hydroxyethyl)aminoethoxy-2-formamidoethyl] 4 - cyclohexene-1,2-dicarboxylate, was produced along with the principal urea derivative product.

Using the same general procedure, but with the isocyanate being added as a 35 weight percent solution in tetrahydrofuran over a period of 4 hours, the same two materials were reacted. The kettle temperature was maintained at a temperature of 0.5° C. during the addition. The product required 1.04 milliliters of 0.1 N HCl per gram to neutralize, which indicated that the polyol product was the urea derivative with little or no carbamate being produced.

The infrared spectrum is in agreement with the assigned structure with maxima at 3.03 microns (OH), 5.77 microns (carbonate C=O), 6.5 microns (secondary amide C=O), 6.47 microns (secondary amide NH), 7.95 microns (ester C—O) and 9.55 microns (alcohol C—OH).

Illustrative of the amino alcohols which can be employed in Examples 127–128 supra include the alkanolamines, i.e., the monoalkanolamines, the dialkanolamines, the trialkanolamines, and the N-alkyl and N-aryl derivatives thereof, for example, triethanolamine, tripropanolamine, triisopropanolamine, the tributanolamines, the tripentanolamines, the trihexanolamines, the triheptanolamines, the trioctanolamines, the trinonanolamines, the tridecanolamines, mixed trialkanolamines, diethanolamine, diisopropanolamine, dibutanolamine, dihexanolamine, dioctanolamine, didecanolamine, ethanolamine, isopropanolamine, n-butanolamine, hexanolamine, octanolamine, decanolamine, N-phenyldiethanolamine, N-methylmonoethanolamine, N-tolyldiisopropanolamine, N-isopropylmonobutanolamine, N - phenyldiisopropanolamine, and the like. The alkanolamines contemplated are those wherein the alkanol moieties have from 2 to 10 carbon atoms, preferably from 2 to 4 carbon atoms. The N-alkyl or N-aryl substituents preferably have not more than 10 carbon atoms.

What is claimed is:

1. A compound of the formula:

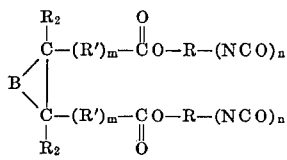

wherein B is a divalent ethylenically unsaturated aliphatic group which together with the vicinal carbon atoms in the above formula forms a monoethylenically unsaturated cyclohexene nucleus; wherein R is a divalent hydrocarbon having up to 24 carbon atoms; R' is methylene; wherein $R_2$ is hydrogen; wherein $m$ is an integer having a value of zero or one; and wherein $n$ is an integer having a value of from one to three exclusive.

2. A compound of the formula:

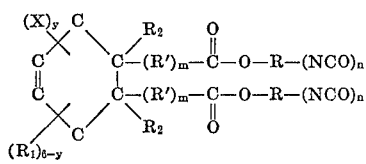

wherein R is a divalent hydrocarbon radical having up to 24 carbon atoms; wherein R' is methylene; wherein $R_1$ is hydrogen or $C_1$–$C_4$ alkyl; wherein X is hydrogen, halogen or $C_1$–$C_4$ alkyl; wherein $R_2$ is hydrogen; wherein $m$ is an integer having a value of zero to one; wherein $n$ is an integer having a value of from one to three inclusive; and wherein $y$ is an integer having a value of zero to two inclusive.

3. Isocyanato-containing products obtained via the reaction of an admixture containing a drying oil composed largely of triglycerides of the long-chain unsaturated fatty acids which contain from 18 to 22 carbon atoms and 2 or more double bonds per chain and a compound of the formula

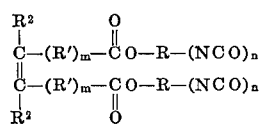

wherein at least one pair of vinylene groups of said drying oil undergoes a Diels-Alder reaction with said compound to give a unit as follows:

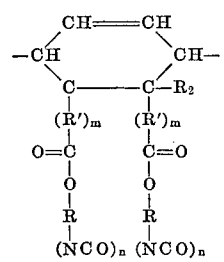

wherein R represents a divalent hydrocarbon radical having up to 24 carbon atoms, wherein R' is methylene, wherein $R_2$ is hydrogen, wherein $m$ is an integer having a value of zero or one, and wherein $n$ is an integer having a value of one to three inclusive.

4. Bis(isocyanatoalkyl)cyclohex - 4 - ene - 1,2 - dicarboxylate wherein each alkyl moiety contains up to 24 carbon atoms.

5. Bis(isocyanatoalkyl)halocyclohex-4-ene-1,2-dicarboxylate wherein each alkyl moiety contains up to 24 carbon atoms.

6. Bis(isocyanatoalkenyl)cyclohex-4-ene-1,2-dicarboxylate wherein each alkenylene moiety contains up to 24 carbon atoms.

7. Bis(2-isocyanatoethyl)cyclohex-4-ene-1,2-dicarboxylate.

8. Bis(2-isocyanato-1-methylethyl)cyclohex-4-ene-1,2-dicarboxylate.

9. Bis(2-isocyanatoethyl)4-chlorocyclohex-4-ene-1,2-dicarboxylate.

10. Bis(2-isocyanato-1-methylethyl)4-chlorocyclohex-4-ene-1,2-dicarboxylate.

References Cited
UNITED STATES PATENTS

| | | | |
|---|---|---|---|
| 2,601,075 | 2/1952 | Wicklatz et al. | 260—666 |
| 2,797,232 | 2/1957 | Blinge | 260—471 |

LORRAINE A. WEINBERGER, Primary Examiner

P. J. KILLOS, Assistant Examiner

U.S. Cl. X.R.

106—252, 264, 265; 161—190; 260—2.5, 18, 29.2, 30.4, 30.8, 32.6, 31.8, 32.8, 37, 40, 75, 77.5, 404.5